United States Patent
Park et al.

(10) Patent No.: US 12,028,514 B2
(45) Date of Patent: Jul. 2, 2024

(54) DEVICE AND METHOD FOR ENCODING AND DECODING MOTION INFORMATION BY MEANS OF NEIGHBORING MOTION INFORMATION

(71) Applicant: SAMSUNG ELECTRONICS CO., LTD., Suwon-si (KR)

(72) Inventors: Minwoo Park, Suwon-si (KR); Seungsoo Jeong, Suwon-si (KR); Minsoo Park, Suwon-si (KR); Kiho Choi, Suwon-si (KR); Woongil Choi, Suwon-si (KR); Yinji Piao, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 226 days.

(21) Appl. No.: 17/566,389

(22) Filed: Dec. 30, 2021

(65) Prior Publication Data
US 2022/0124316 A1    Apr. 21, 2022

Related U.S. Application Data

(63) Continuation of application No. PCT/KR2020/008596, filed on Jul. 1, 2020.
(Continued)

(51) Int. Cl.
*H04N 19/105* (2014.01)
*H04N 19/139* (2014.01)
(Continued)

(52) U.S. Cl.
CPC ......... *H04N 19/105* (2014.11); *H04N 19/139* (2014.11); *H04N 19/174* (2014.11);
(Continued)

(58) Field of Classification Search
CPC .. H04N 19/105; H04N 19/139; H04N 19/174; H04N 19/176; H04N 19/52;
(Continued)

(56) References Cited

U.S. PATENT DOCUMENTS

| | | |
|---|---|---|
| 9,648,329 B2 | 5/2017 | Lim et al. |
| 10,075,690 B2 | 9/2018 | Lin et al. |

(Continued)

FOREIGN PATENT DOCUMENTS

| | | |
|---|---|---|
| KR | 1020160045100 A | 4/2016 |
| KR | 1020180048736 A | 5/2018 |

(Continued)

OTHER PUBLICATIONS

International Search Report (PCT/ISA/210) and Written Opinion (PCT/ISA/237) issued by the International Searching. Authority dated Sep. 28, 2020 in application No. PCT/KR2020/008596.
(Continued)

*Primary Examiner* — Dramos Kalapodas
(74) *Attorney, Agent, or Firm* — Sughrue Mion, PLLC

(57) ABSTRACT

A method, performed by a decoding apparatus, of decoding motion information, including: obtaining change information indicating whether to change motion information of a neighboring block of a current block; based on the change information indicating to change the motion information, determining a prediction direction of the current block by changing a prediction direction of the neighboring block; based on the prediction direction of the neighboring block being a first uni-direction and the prediction direction of the current block being a second uni-direction or a bi-direction, selecting a reference picture of the second uni-direction of the current block from a second reference picture list; obtaining a motion vector of the second uni-direction of the current block; and reconstructing the current block using a
(Continued)

reference block indicated by the motion vector of the second uni-direction of the current block.

4 Claims, 38 Drawing Sheets

Related U.S. Application Data

(60) Provisional application No. 62/956,689, filed on Jan. 3, 2020, provisional application No. 62/869,097, filed on Jul. 1, 2019.

(51) Int. Cl.
*H04N 19/174* (2014.01)
*H04N 19/176* (2014.01)
*H04N 19/52* (2014.01)
*H04N 19/573* (2014.01)
*H04N 19/119* (2014.01)

(52) U.S. Cl.
CPC ........... *H04N 19/176* (2014.11); *H04N 19/52* (2014.11); *H04N 19/573* (2014.11); *H04N 19/119* (2014.11)

(58) Field of Classification Search
CPC .. H04N 19/573; H04N 19/119; H04N 19/159; H04N 19/70; H04N 19/186; H04N 19/513
See application file for complete search history.

(56) References Cited

U.S. PATENT DOCUMENTS

| | | | | |
|---|---|---|---|---|
| 10,536,704 | B2* | 1/2020 | Kim | H04N 19/124 |
| 10,575,011 | B2 | 2/2020 | Park et al. | |
| 10,999,598 | B2 | 5/2021 | Park et al. | |
| 11,172,204 | B2 | 11/2021 | Jeong | |
| 2004/0001546 | A1* | 1/2004 | Tourapis | H04N 19/513 |
| | | | | 375/E7.262 |
| 2005/0129120 | A1* | 6/2005 | Jeon | H04N 19/51 |
| | | | | 375/E7.211 |
| 2013/0272409 | A1 | 10/2013 | Seregin et al. | |
| 2017/0339425 | A1 | 11/2017 | Jeong et al. | |
| 2018/0352247 | A1* | 12/2018 | Park | H04N 19/513 |
| 2020/0099937 | A1* | 3/2020 | Kim | H04N 19/117 |
| 2022/0345719 | A1* | 10/2022 | Kim | H04N 19/159 |

FOREIGN PATENT DOCUMENTS

| | | |
|---|---|---|
| KR | 1020180097773 A | 8/2018 |
| KR | 101932735 B1 | 12/2018 |
| KR | 101960761 B1 | 3/2019 |
| KR | 102220230 B1 | 2/2021 |

OTHER PUBLICATIONS

Communication dated Dec. 15, 2020 issued by the Korean Intellectual Property Office in application No. 10-2020-0081064.
Communication dated Aug. 12, 2020 issued by the Korean Intellectual Property Office in application No. 10-2020-0081064.
Communication dated Nov. 4, 2021 issued by the Korean Intellectual Property Office in application No. 102021033632.
Communication dated Nov. 5, 2021 issued by the Korean Intellectual Property Office in application No. 102021033633.
Choi, K., et al., "Working Draft 2 of Essential Video Coding", ISO/IEC JTC 1/SC 29/WG 11 N18448, Mar. 2019, pp. 1-233 (235 pages).
Choi, K., et al., "Information technology—General Video Coding—Part 1: Essential Video Coding", ISO/IEC JTC 1/SC 29/WG 11 N18568, Jul. 2019, pp. 1-284 (292 pages).
Communication dated Sep. 13, 2022 issued by the Korean Patent Office in application No. 10-2022-0092044.
Choi et al., "Working Draft 1 of Essential Video Coding", ISO/IEC JTC1/SC29/WG11, Feb. 2019, 209 total pages.
Extended European Search Report dated Jun. 29, 2023, issued by European Patent Office in European Patent Application No. 20835603.0.

\* cited by examiner

FIG. 13

| BLOCK SHAPE / DEPTH | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 17

| SQUARE BLOCK | |
|---|---|
| (00)b | |
| (01)b | |
| (10)b | |
| (11)b | |

| NON-SQUARE BLOCK | |
|---|---|
| (0)b | |
| (10)b | |
| (11)b | |

FIG. 18

| SQUARE BLOCK | |
|---|---|
| (00)b | □ |
| (10)b | ▭ |
| (11)b | ▯ |

| NON-SQUARE BLOCK | | |
|---|---|---|
| (0)b | ▭ | ▯ |
| (10)b | ▭▭ | ▯▯ |
| (11)b | ▭▭▭ | ▯▯▯ |

FIG. 22

| PREDICTION DIRECTION OF NEIGHBORING BLOCK | L0 | L1 | Bi |
|---|---|---|---|
| mmvd_group_idx == 0 | L0 | L1 | Bi |
| mmvd_group_idx == 1 | Bi | Bi | L0 |
| mmvd_group_idx == 2 | L1 | L0 | L1 |

FIG. 23

| REFERENCE PICTURE LIST 0 | |
|---|---|
| Index 0 | POC 3 |
| Index 1 | POC 6 |

| REFERENCE PICTURE LIST 1 | |
|---|---|
| Index 0 | POC 2 |
| Index 1 | POC 7 |

FIG. 27

| mmvd_distance_idx[x0][y0] | MmvdDistance[x0][y0] |
|---|---|
| 0 | 1 |
| 1 | 2 |
| 2 | 4 |
| 3 | 8 |
| 4 | 16 |
| 5 | 32 |
| 6 | 64 |
| 7 | 128 |

FIG. 28

| mmvd_direction_idx[x0][y0] | MmvdSign[x0][y0][0] | MmvdSign[x0][y0][1] |
|---|---|---|
| 0 | +1 | 0 |
| 1 | −1 | 0 |
| 2 | 0 | +1 |
| 3 | 0 | −1 |

FIG. 29

| mmvd_group_idx == 0 | ref_idx=ref_idx_curr |
|---|---|
| mmvd_group_idx == 1 | ref_idx=Active reference number == 1? ref_idx_curr : !ref_idx_curr |
| mmvd_group_idx == 2 | ref_idx=Active reference number < 3 ? ref_idx_curr : ref_idx_curr < 2? 2:1 |

FIG. 35

```
The MMVD motion vectors are set as follows:                          ─S3510
     mMvL0 = mvL0
     mMvL1 = mvL1

If the value of mmvd_group_idx is equal to 1, the following applies:
-If both predFlagL0[ 0 ][ 0 ] and  predFlagL1[ 0 ][ 0 ] are equal to 1, the following applies:
     refIdxL1 = -1
     predFlagL1[ 0 ][ 0 ] = 0                                         ─S3520
     mMvL1[ 0 ] = 0
     mMvL1[ 1 ] = 0 if the value of mmvd_group_idx is equal to 2, the following applies:
 - If both predFlagL0[ 0 ][ 0 ] and predFlagL1[ 0 ][ 0 ] are equal to 1, the following applies:
     refIdxL0 = -1
     predFlagL0[ 0 ][ 0 ] = 0                                         ─S3530
     mMvL0[ 0 ] = 0
     mMvL0[ 1 ] = 0
```

FIG. 36

| | |
|---|---|
| If the value of mmvd_group_idx is equal to 1, slice_type is equal to B and predFlagL0[ 0 ][ 0 ] is equal to 1, the following applies:<br>    predFlagL1[ 0 ][ 0 ] = 1 | S3610 |
| – If NumRefIdxActive[ 1 ] is greater than 1 and DiffPicOrderCnt( RefPicList1[ 1 ], currPic ) is equal to DiffPicOrderCnt( currPic, RefPicList0[ refIdxL0 ] ), the following applies:<br>    refIdxL1 = 1<br>– Otherwise, the following applies:<br>    refIdxL1 = 0 | S3620 |
| – mMvL1 is set as follows:<br>    currPocDiffL0 = DiffPicOrderCnt( currPic, RefPicList0[ refIdxL0 ] )<br>    currPocDiffL1 = DiffPicOrderCnt( currPic, RefPicList1[ refIdxL1 ] )<br>    distScaleFactor = ( currPocDiffL1 << 5 ) / currPocDiffL0<br>    mMvL1[ 0 ] = Clip3( −32768, 32767, Sign( distScaleFactor * mMvL0[ 0 ] ) *<br>    ( ( Abs( distScaleFactor * mMvL0[ 0 ] ) + 16 ) >> 5 ) )<br>    mMvL1[ 1 ] = Clip3( −32768, 32767, Sign( distScaleFactor * mMvL0[ 1 ] ) *<br>    ( ( Abs( distScaleFactor * mMvL0[ 1 ] ) + 16 ) >> 5 ) ) | S3630 |
| Otherwise, if slice_type is equal to P, the following applies:<br>– If NumRefIdxActive[ 0 ] is equal to 1, the following applies:<br>    targetrefIdxL0 = refIdxL0<br>– Otherwise, the following applies:<br>    targetrefIdxL0 = !refIdxL0 | S3640 |
| – mMvL0 is set as follows:<br>  – If targetrefIdxL0 is equal to refIdxL0, the following applies:<br>    mMvL0[ 0 ] = mMvL0[ 0 ] + 3<br>    mMvL0[ 1 ] = mMvL0[ 1 ]<br>  – Otherwise, the following applies:<br>    currPocDiffL0 = DiffPicOrderCnt( currPic, RefPicList0[ refIdxL0 ] )<br>    currPocDiffL1 = DiffPicOrderCnt( currPic, RefPicList0[ targetrefIdxL0 ] )<br>    distScaleFactor = ( currPocDiffL1 << 5 ) / currPocDiffL0<br>    mMvL0[ 0 ] = Clip3( −32768, 32767, Sign( distScaleFactor * mMvL0[ 0 ] ) *<br>    ( ( Abs( distScaleFactor * mMvL0[ 0 ] ) + 16 ) >> 5 ) )<br>    mMvL0[ 1 ] = Clip3( −32768, 32767, Sign( distScaleFactor * mMvL0[ 1 ] ) *<br>    ( ( Abs( distScaleFactor * mMvL0[ 1 ] ) + 16 ) >> 5 ) ) | S3650 |
| – refIdxL0 is set equal to targetrefIdxL0. | S3660 |
| Otherwise, if predFlagL1[ 0 ][ 0 ] are equal to 1, the following applies:<br>    predFlagL0[ 0 ][ 0 ] = 1 | S3670 |
| – If NumRefIdxActive[ 0 ] is greater than 1 and DiffPicOrderCnt( RefList0[ 1 ], currPic ) is equal to DiffPicOrderCnt( currPic, RefPicList1[ refIdxL1 ] ), the following applies:<br>    refIdxL0 = 1<br>– Otherwise, the following applies:<br>    refIdxL0 = 0 | S3680 |
| – mMvL0 is set as follows:<br>    currPocDiffL0 = DiffPicOrderCnt( currPic, RefPicList0[ refIdxL0 ] )<br>    currPocDiffL1 = DiffPicOrderCnt( currPic, RefPicList1[ refIdxL1 ] )<br>    distScaleFactor = ( currPocDiffL0 << 5 ) / currPocDiffL1<br>    mMvL0[ 0 ] = Clip3( −32768, 32767, Sign( distScaleFactor * mMvL1[ 0 ] ) *<br>            ( ( Abs( distScaleFactor * mMvL1[ 0 ] ) + 16 ) >> 5 ) )<br>    mMvL0[ 1 ] = Clip3( −32768, 32767, Sign( distScaleFactor * mMvL1[ 1 ] ) *<br>            ( ( Abs( distScaleFactor * mMvL1[ 1 ] ) + 16 ) >> 5 ) ) | S3690 |

FIG. 37 if the value of mmvd_group_idx is equal to 2, slice_type is equal to B and predFlagL0[ 0 ][ 0 ] is equal to 1, the following applies:
    predFlagL1[ 0 ][ 0 ] = 1 — S3710

- If NumRefIdxActive[ 1 ] is greater than 1 and DiffPicOrderCnt( RefPicList1[ 1 ], currPic ) is equal to DiffPicOrderCnt( currPic, RefPicList0[ refIdxL0 ] ), the following applies:
    refIdxL1 = 1
- Otherwise, the following applies:
    refIdxL1 = 0 — S3720

- mMvL1 is set as follows:
    currPocDiffL0 = DiffPicOrderCnt( currPic, RefPicList0[ refIdxL0 ] )
    currPocDiffL1 = DiffPicOrderCnt( currPic, RefPicList1[ refIdxL1 ] )
    distScaleFactor = ( currPocDiffL1 << 5 ) / currPocDiffL0
    mMvL1[ 0 ] = Clip3( −32768, 32767, Sign( distScaleFactor * mMvL0[ 0 ] ) *
             ( ( Abs( distScaleFactor * mMvL0[ 0 ] ) + 16 ) >> 5 ) )
    mMvL1[ 1 ] = Clip3( −32768, 32767, Sign( distScaleFactor * mMvL0[ 1 ] ) *
             ( ( Abs( distScaleFactor * mMvL0[ 1 ] ) + 16 ) >> 5 ) ) — S3730

- refIdxL0 is set equal to −1, and predFlagL0[ 0 ][ 0 ], mMvL0[ 0 ] and mMvL0[ 1 ] are set equal to 0. — S3740

Otherwise, if slice_type is equal to P, the following applies:
- If NumRefIdxActive[ 0 ] is less than 3, the following applies:
    targetrefIdxL0 = refIdxL0
- Otherwise, the following applies:
    targetrefIdxL0 = refIdxL0 < 2 ? 2 : 1 — S3750

- mMvL0 is set as follows:
  - If targetrefIdxL0 is equal to refIdxL0, the following applies:
    mMvL0[ 0 ] = mMvL0[ 0 ] − 3
    mMvL0[ 1 ] = mMvL0[ 1 ]
  - Otherwise, the following applies:
    currPocDiffL0 = DiffPicOrderCnt( currPic, RefPicList0[ refIdxL0 ] )
    currPocDiffL1 = DiffPicOrderCnt( currPic, RefPicList0[ targetrefIdxL0 ] )
    distScaleFactor = ( currPocDiffL1 << 5 ) / currPocDiffL0
    mMvL0[ 0 ] = Clip3( −32768, 32767, Sign( distScaleFactor * mMvL0[ 0 ] ) *
             ( ( Abs( distScaleFactor * mMvL0[ 0 ] ) + 16 ) >> 5 ) )
    mMvL0[ 1 ] = Clip3( −32768, 32767, Sign( distScaleFactor * mMvL0[ 1 ] ) *
             ( ( Abs( distScaleFactor * mMvL0[ 1 ] ) + 16 ) >> 5 ) ) — S3760

- refIdxL0 is set equal to targetrefIdxL0. — S3770

Otherwise, if predFlagL1[ 0 ][ 0 ] is equal to 1, the following applies:
    predFlagL0[ 0 ][ 0 ] = 1 — S3780

- If NumRefIdxActive[ 0 ] is greater than 1 and DiffPicOrderCnt( RefPicList0[ 1 ], currPic ) is equal to DiffPicOrderCnt( currPic, RefPicList1[ refIdxL1 ] ), the following applies:
    refIdxL0 = 1
- Otherwise, the following applies:
    refIdxL0 = 0 — S3790

- mMvL0 is set as follows:
    currPocDiffL0 = DiffPicOrderCnt( currPic, RefPicList0[ refIdxL0 ] )
    currPocDiffL1 = DiffPicOrderCnt( currPic, RefPicList1[ refIdxL1 ] )
    distScaleFactor = ( currPocDiffL0 << 5 ) / currPocDiffL1
    mMvL0[ 0 ] = Clip3( −32768, 32767, Sign( distScaleFactor * mMvL1[ 0 ] ) *
             ( ( Abs( distScaleFactor * mMvL1[ 0 ] ) + 16 ) >> 5 ) )
    mMvL0[ 1 ] = Clip3( −32768, 32767, Sign( distScaleFactor * mMvL1[ 1 ] ) *
             ( ( Abs( distScaleFactor * mMvL1[ 1 ] ) + 16 ) >> 5 ) )
- refIdxL1 is set equal to −1, and predFlagL1[ 0 ][ 0 ], mMvL1[ 0 ] and mMvL1[ 1 ] are set equal to 0. — S3795

FIG. 38

If both predFlagL0[ 0 ][ 0 ] and predFlagL1[ 0 ][ 0 ] are equal to 1, the following applies:
    currPocDiffL0 = DiffPicOrderCnt( currPic, RefPicList0[ refIdxL0 ] )
    currPocDiffL1 = DiffPicOrderCnt( currPic, RefPicList1[ refIdxL1 ] )
 - If Abs( currPocDiffL0 ) is equal to Abs( currPocDiffL1 ), the following applies:
    mMvdL0[ 0 ] = MmvdOffset[ 0 ]
    mMvdL0[ 1 ] = MmvdOffset[ 1 ]
    mMvdL1[ 0 ] = MmvdOffset[ 0 ]
    mMvdL1[ 1 ] = MmvdOffset[ 1 ]
              — S3810

- Otherwise, if Abs( currPocDiffL0 ) is greater than Abs( currPocDiffL1 ), the following applies:
    mMvdL1[ 0 ] = MmvdOffset[ 0 ]
    mMvdL1[ 1 ] = MmvdOffset[ 1 ]
    distScaleFactor = ( Abs( currPocDiffL1 ) << 5 ) / Abs( currPocDiffL0 )
    mMvdL0[ 0 ] = Clip3( −32768, 32767, ( distScaleFactor * mMvdL1[ 0 ] + 16 ) >> 5 )
    mMvdL0[ 1 ] = Clip3( −32768, 32767, ( distScaleFactor * mMvdL1[ 1 ] + 16 ) >> 5 )
              — S3820

- Otherwise, if Abs( currPocDiffL0 ) is less than Abs( currPocDiffL1 ), the following applies:
    mMvdL0[ 0 ] = MmvdOffset[ 0 ]
    mMvdL0[ 1 ] = MmvdOffset[ 1 ]
    distScaleFactor = ( Abs( currPocDiffL0 ) << 5 ) / Abs( currPocDiffL1 )
    mMvdL1[ 0 ] = Clip3( −32768, 32767, ( distScaleFactor * mMvdL0[ 0 ] + 16 ) >> 5 )
    mMvdL1[ 1 ] = Clip3( −32768, 32767, ( distScaleFactor * mMvdL0[ 1 ] + 16 ) >> 5 )
              — S3830

- If currPocDiffL0 * currPocDiffL1 is smaller than 0, the following applies:
    mMvdL0[ 0 ] = mMvdL0[ 0 ]
    mMvdL0[ 1 ] = mMvdL0[ 1 ]
    mMvdL1[ 0 ] = −mMvdL1[ 0 ]
    mMvdL1[ 1 ] = −mMvdL1[ 1 ]
              — S3840

Otherwise ( predFlagL0[ 0 ][ 0 ] or predFlagL1[ 0 ][ 0 ] are equal to 1 ), the following applies for X being 0 and 1:
    mMvdLX[ 0 ] = ( predFlagLX[ 0 ][ 0 ] = = 1 ) ? MmvdOffset[ 0 ] : 0
    mMvdLX[ 1 ] = ( predFlagLX[ 0 ][ 0 ] = = 1 ) ? MmvdOffset[ 1 ] : 0
              — S3850

The MMVD motion vectors are updated as follows:
    mMvL0[ 0 ] += mMvdL0[ 0 ]
    mMvL0[ 1 ] += mMvdL0[ 1 ]
    mMvL1[ 0 ] += mMvdL1[ 0 ]
    mMvL1[ 1 ] += mMvdL1[ 1 ]
              — S3860

DEVICE AND METHOD FOR ENCODING AND DECODING MOTION INFORMATION BY MEANS OF NEIGHBORING MOTION INFORMATION

CROSS-REFERENCE TO RELATED APPLICATION(S)

This application is a Continuation Application of International Application No. PCT/KR2020/008596, filed on Jul. 1, 2020, which claims benefit of U.S. Provisional Application No. 62/869,097 filed on Jul. 1, 2019, and U.S. Provisional Application No. 62/956,689 filed on Jan. 3, 2020, in the United States Patent and Trademark Office, the disclosures of which are incorporated by reference herein in their entireties.

1. Field

The disclosure relates to an image encoding and decoding field. More specifically, the disclosure relates to an apparatus and method for encoding and decoding current motion information by using neighboring motion information.

2. Description of Related Art

In image encoding and decoding, an image is split into blocks, and each block is prediction-encoded and prediction-decoded through inter prediction or intra prediction.

Inter prediction is a method of compressing images by removing temporal redundancy between the images. A representative example of inter prediction is motion estimation coding. Motion estimation coding predicts blocks of a current image by using at least one reference image. A reference block that is most similar to a current block is searched within a preset search range by using a preset evaluation function. The current block is predicted based on the reference block, and a prediction block generated as the predicted result is subtracted from the current block to generate a residual block. The residual block is then encoded. To more accurately perform the prediction, interpolation is performed on the reference image to generate pixels in a sub pel unit that is smaller than an integer pel unit, and inter prediction is performed based on the pixels in the sub pel unit.

In a codec, such as H.264 Advanced Video Coding (AVC) and High Efficiency Video Coding (HEVC), motion vectors of previously encoded blocks being adjacent to a current block or blocks included in previously encoded images are used in order to predict a motion vector of the current block. A differential motion vector, which is a difference between the motion vector of the current block and the motion vector of the previously encoded block, is signaled to a decoder side through a preset method.

SUMMARY

Provided are an apparatus and method for encoding motion information and an apparatus and method for decoding motion information, according to an embodiment, may encode and decode current motion information with a small number of bits by changing neighboring motion information.

Additional aspects will be set forth in part in the description which follows and, in part, will be apparent from the description, or may be learned by practice of the presented embodiments.

In accordance with an aspect of the disclosure, a method, performed by a decoding apparatus, of decoding motion information, includes: obtaining, from a bitstream, change information indicating whether to change motion information of a neighboring block related to a current block; based on the change information indicating to change the motion information, determining a prediction direction of the current block by changing a prediction direction of the neighboring block; based on the prediction direction of the neighboring block being a first uni-direction and the prediction direction of the current block being a second uni-direction or a bi-direction, selecting a reference picture of the second uni-direction of the current block from a second reference picture list, by considering a distance between a current picture and a reference picture of the first uni-direction of the neighboring block, included in a first reference picture list; obtaining a motion vector of the second uni-direction of the current block by applying a differential motion vector to a motion vector scaled from a motion vector of the first uni-direction of the neighboring block; and reconstructing the current block using a reference block indicated by the motion vector of the second uni-direction of the current block in the reference picture of the second uni-direction of the current block.

The selecting of the reference picture of the second uni-direction of the current block may further include, based on a number of pictures included in the second reference picture list is greater than n, where n is a natural number, and the distance between the current picture and the reference picture of the first uni-direction of the neighboring block is equal to a distance between the current picture and a picture having an index of n and which is included in the second reference picture list, selecting the picture having the index of n as the reference picture of the second uni-direction of the current block.

The selecting of the reference picture of the second uni-direction of the current block may further include, based on the number of the pictures included in the second reference picture list being smaller than or equal to n, selecting a picture having an index of 0 and which is included in the second reference picture list, as the reference picture of the second uni-direction of the current block.

The selecting of the reference picture of the second uni-direction of the current block may further include, based on the distance between the current picture and the reference picture of the first uni-direction of the neighboring block being not equal to the distance between the current picture and the picture having the index of n, selecting a picture having an index of 0 and which is included in the second reference picture list, as the reference picture of the second uni-direction of the current block.

Based on the prediction direction of the current block is the bi-direction, the obtaining of the motion vector of the second uni-direction of the current block may further include: obtaining a motion vector of the first uni-direction of the current block by applying the differential motion vector to the motion vector of the first uni-direction of the neighboring block, and the reconstructing of the current block may further include reconstructing the current block by further using a reference block indicated by the motion vector of the first uni-direction of the current block in a reference picture of the first uni-direction of the current block.

Based on a result of comparison between a distance between the current picture and the reference picture of the first uni-direction of the current block and a distance between the current picture and the reference picture of the second uni-direction of the current block, a scaled differential motion vector may be applied to the motion vector of the first uni-direction of the neighboring block or the motion vector scaled from the motion vector of the first uni-direction of the neighboring block.

Based on a picture order count (POC) of the current picture having a value between a POC of the reference picture of the first uni-direction of the current block and a POC of the reference picture of the second uni-direction of the current block, a sign of the scaled differential motion vector may be determined to be different from a sign of a non-scaled differential motion vector.

The method may further include, based on the prediction direction of the neighboring block being the bi-direction, and the prediction direction of the current block being the first uni-direction, obtaining a motion vector of the first uni-direction of the current block by applying the differential motion vector to the motion vector of the first uni-direction of the neighboring block, and reconstructing the current block by using a reference block indicated by the motion vector of the first uni-direction of the current block in the reference picture of the first uni-direction of the neighboring block.

Based on the change information indicating not to change the motion information, the current block may be reconstructed by using a reference block indicated in the reference picture of the neighboring block by the motion vector of the current block obtained by applying the differential motion vector to the motion vector of the neighboring block.

In accordance with an aspect of the disclosure, an apparatus of decoding motion information, includes: a bitstream obtainer configured to obtain, from a bitstream, change information indicating whether to change motion information of a neighboring block related to a current block; a motion information obtainer configured to: based on the change information indicating to change of the motion information, a prediction direction of the current block by changing a prediction direction of the neighboring block, based on the prediction direction of the neighboring block being a first uni-direction and the prediction direction of the current block being a second uni-direction or a bi-direction, selecting a reference picture of the second uni-direction of the current block from a second reference picture list by considering a distance between a current picture and a reference picture of the first uni-direction of the neighboring block included in a first reference picture list, and obtain a motion vector of the second uni-direction of the current block by applying a differential motion vector to a motion vector scaled from a motion vector of the first uni-direction of the neighboring block; and a prediction decoder configured to reconstruct the current block using a reference block indicated by the motion vector of the second uni-direction of the current block in the reference picture of the second uni-direction of the current block.

In accordance with an aspect of the disclosure, a method of encoding motion information, includes: determining whether to change motion information of a neighboring block related to a current block; and generating a bitstream including information indicating the neighboring block, change information indicating whether to change the motion information, and information indicating a differential motion vector, wherein, based on a prediction direction of the neighboring block being a first uni-direction, and a prediction direction of the current block being a second uni-direction or a bi-direction, a reference picture of the second uni-direction of the current block is selected as a picture in a second reference picture list, spaced from a current picture by a distance between the current picture and a reference picture of the first uni-direction of the neighboring block, included in a first reference picture list, and wherein the differential motion vector corresponds to a difference between a motion vector scaled from a motion vector of the first uni-direction of the neighboring block and a motion vector of the current block.

An apparatus and method for encoding motion information and an apparatus and method for decoding motion information, according to an embodiment, may encode and decode current motion information with a small number of bits by changing neighboring motion information.

It should be noted that effects that can be achieved by the apparatus and method for encoding motion information and the apparatus and method for decoding motion information, according to the embodiment, are not limited to those described above, and other effects not mentioned will be apparent to one of ordinary skill in the art from the following descriptions.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 13 illustrates a process of determining a depth of a coding unit as a shape and size of the coding unit change, when the coding unit is recursively split such that a plurality of coding units are determined, according to an embodiment.

FIG. 17 illustrates various shapes of coding units that may be determined based on split shape mode information that is expressed with a binary code, according to an embodiment.

FIG. 18 illustrates other shapes of coding units that may be determined based on split shape mode information that is expressed with a binary code, according to an embodiment.

FIG. 22 is an exemplary table representing which directions prediction directions of neighboring blocks change to according to values indicated by change information.

FIG. 23 is an exemplary table representing pictures included in a reference picture list 0 and a reference picture list 1.

FIG. 27 is an exemplary table representing variation distances corresponding to values of variation distance information.

FIG. 28 is an exemplary table representing variation directions corresponding to values of variation direction information.

FIG. 29 is a table representing a method of selecting a reference picture of a current block according to a value indicated by change information and the number of pictures included in a reference picture list.

FIG. 35 is a view illustrating a process of obtaining motion information of a current block, according to an embodiment.

FIG. 36 is a view illustrating a process of obtaining motion information of a current block, according to an embodiment.

FIG. 37 is a view illustrating a process of obtaining motion information of a current block, according to an embodiment.

FIG. 38 is a view illustrating a process of obtaining motion information of a current block, according to an embodiment.

DETAILED DESCRIPTION

Figure 1:
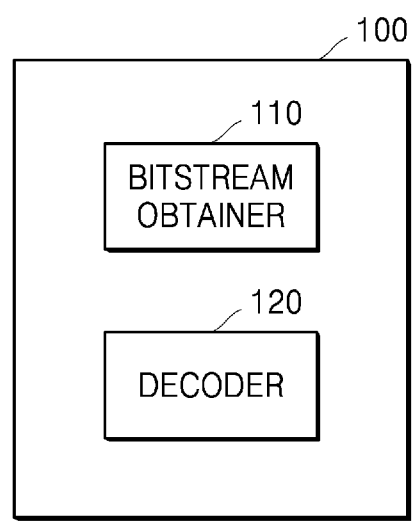
FIG. 1 is a block diagram of an image decoding apparatus according to an embodiment.

A method of decoding motion information, according to an embodiment, includes: obtaining, from a bitstream, change information indicating whether to change motion information of a neighboring block related to a current block; determining, when the change information indicates the change of the motion information, a prediction direction of the current block by changing a prediction direction of the neighboring block; selecting, when the prediction direction of the neighboring block is a first uni-direction and the prediction direction of the current block is a second uni-direction or a bi-direction, a reference picture of the second uni-direction of the current block from a second reference picture list, by considering a distance between a current picture and a reference picture of the first uni-direction of the neighboring block, included in a first reference picture list; obtaining a motion vector of the second uni-direction of the current block by applying a differential motion vector to a motion vector scaled from a motion vector of the first uni-direction of the neighboring block; and reconstructing the current block by using a reference block indicated by the motion vector of the second uni-direction of the current block in the reference picture of the second uni-direction of the current block.

The selecting of the reference picture of the second uni-direction of the current block may include, when a number of pictures included in the second reference picture list is greater than n (n is a natural number), and the distance between the current picture and the reference picture of the first uni-direction of the neighboring block is equal to a distance between the current picture and a picture having an index of n and included in the second reference picture list, selecting the picture having the index of n as the reference picture of the second uni-direction of the current block.

The selecting of the reference picture of the second uni-direction of the current block may include, when a number of pictures included in the second reference picture list is smaller than or equal to n, selecting a picture having an index of 0 and included in the second reference picture list, as the reference picture of the second uni-direction of the current block.

The selecting of the reference picture of the second uni-direction of the current block may include, when the distance between the current picture and the reference picture of the first uni-direction of the neighboring block is not equal to the distance between the current picture and the picture having the index of n, selecting a picture having an index of 0 and included in the second reference picture list, as the reference picture of the second uni-direction of the current block.

When the prediction direction of the current block is the bi-direction, the obtaining of the motion vector of the second uni-direction of the current block may include obtaining a motion vector of the first uni-direction of the current block by applying a differential motion vector to the motion vector of the first uni-direction of the neighboring block, and the reconstructing of the current block may include reconstructing the current block by further using a reference block indicated by the motion vector of the first uni-direction of the current block in a reference picture of the first uni-direction of the current block.

A scaled differential motion vector may be applied to the motion vector of the first uni-direction of the neighboring block or the motion vector scaled from the motion vector of the first uni-direction of the neighboring block, according to a result of comparison between a distance between the current picture and the reference picture of the first uni-direction of the current block and a distance between the current picture and the reference picture of the second uni-direction of the current block.

When a POC of the current picture has a value between a POC of the reference picture of the first uni-direction of the current block and a POC of the reference picture of the second uni-direction of the current block, a sign of the scaled differential motion vector may be determined to be different from a sign of a non-scaled differential motion vector.

The method of decoding the motion information may further include, when the prediction direction of the neighboring block is the bi-direction, and the prediction direction of the current block is the first uni-direction, obtaining a motion vector of the first uni-direction of the current block by applying the differential motion vector to the motion vector of the first uni-direction of the neighboring block, and reconstructing the current block by using a reference block indicated by the motion vector of the first uni-direction of the current block in the reference picture of the first uni-direction of the neighboring block.

When the change information indicates an unchange of the motion information, the current block may be reconstructed by using a reference block indicated in the reference picture of the neighboring block by the motion vector of the current block obtained by applying the differential motion vector to the motion vector of the neighboring block.

An apparatus of decoding motion information, according to an embodiment, includes: a bitstream obtainer configured to obtain, from a bitstream, change information indicating whether to change motion information of a neighboring block related to a current block; a motion information obtainer configured to determine, when the change information indicates the change of the motion information, a prediction direction of the current block by changing a prediction direction of the neighboring block, select, when the prediction direction of the neighboring block is a first uni-direction and the prediction direction of the current block is a second uni-direction or a bi-direction, a reference picture of the second uni-direction of the current block from a second reference picture list by considering a distance between the current picture and a reference picture of the first uni-direction of the neighboring block included in a first reference picture list, and obtain a motion vector of the second uni-direction of the current block by applying a differential motion vector to a motion vector scaled from a motion vector of the first uni-direction of the neighboring block; and a prediction decoder configured to reconstruct the current block by using a reference block indicated by the motion vector of the second uni-direction of the current block in the reference picture of the second uni-direction of the current block.

A method of encoding motion information, according to an embodiment, includes: determining whether to change motion information of a neighboring block related to a current block; and generating a bitstream including information indicating the neighboring block, change information indicating whether to change motion information, and information indicating a differential motion vector, wherein, when a prediction direction of the neighboring block is a first uni-direction, and a prediction direction of the current block is a second uni-direction or a bi-direction, a reference picture of a second uni-direction of the current block is selected as a picture in a second reference picture list, spaced from a current picture by a distance between the current picture and a reference picture of the first uni-direction of the neighboring block, included in a first reference picture list, and the differential motion vector corresponds to a difference between a motion vector scaled from a motion vector of the first uni-direction of the neighboring block and a motion vector of the current block.

As the disclosure allows for various changes and numerous embodiments, specific embodiments will be illustrated in the drawings and described in detail in the written description. However, this is not intended to limit embodiments to particular modes of practice, and it is to be appreciated that the disclosure includes all changes, equivalents, and substitutes that do not depart from the spirit and technical scope of embodiments.

In the description of embodiments, certain detailed explanations of related art are omitted when it is deemed that they may unnecessarily obscure the essence of the disclosure. Also, numbers (for example, a first, a second, and the like) used in the description of the specification are merely identifier codes for distinguishing one component from another.

Also, in the present specification, it will be understood that when components are "connected" or "coupled" to each other, the components may be directly connected or coupled to each other, but may alternatively be connected or coupled to each other with an intervening component therebetween, unless specified otherwise.

Also, in the present specification regarding a component represented as a "portion (unit)" or a "module", two or more components may be combined into one component or one component may be divided into two or more components according to subdivided functions. In addition, each component described hereinafter may additionally perform some or all of functions performed by another component, in addition to main functions of itself, and some of the main functions of each component may be performed entirely by another component.

Also, in the present specification, an 'image' or a 'picture' may denote a still image of video, or a moving picture, that is, video itself.

Also, in the present specification, a 'sample' or 'signal' means, as data assigned to a sampling location of an image, data to be processed. For example, pixel values on a spatial-domain image and transform coefficients on a transform domain may be samples. A unit including such at least one sample may be defined as a block.

Hereinafter, an image encoding method and apparatus and an image decoding method and apparatus, based on a coding unit and a transform unit of a tree structure according to an embodiment will be disclosed with reference to FIGS. 1 to 19.

FIG. 1 is a block diagram of an image decoding apparatus 100 according to an embodiment.

The image decoding apparatus 100 may include a bitstream obtainer 110 and a decoder 120. The bitstream obtainer 110 and the decoder 120 may include at least one processor. Also, the bitstream obtainer 110 and the decoder 120 may include a memory storing instructions that are executed by the at least one processor.

The bitstream obtainer 110 may receive a bitstream. The bitstream may include information resulting from image encoding by an image encoding apparatus 200 which will be described later. Also, the bitstream may be transmitted from the image encoding apparatus 200. The image decoding apparatus 100 may be connected to the image encoding apparatus 200 in a wired or wireless manner, and the bitstream obtainer 110 may receive a bitstream in a wired or wireless manner. The bitstream obtainer 110 may receive a bitstream from a storage medium, such as optical media, a hard disk, etc. The decoder 120 may reconstruct an image based on information obtained from the received bitstream. The decoder 120 may obtain a syntax element for reconstructing an image from the bitstream. The decoder 120 may reconstruct the image based on the syntax element.

The operation of the image decoding apparatus 100 will be described in detail below. The bitstream obtainer 110 may receive a bitstream.

The image decoding apparatus 100 may perform an operation of obtaining a bin string corresponding to a split shape mode of a coding unit from the bitstream. Then, the image decoding apparatus 100 may perform an operation of determining a split rule of a coding unit. Also, the image decoding apparatus 100 may perform an operation of splitting a coding unit into a plurality of coding units, based on at least one of the bin string corresponding to the split shape mode and the split rule. The image decoding apparatus 100 may determine a first range which is an allowable size range of a coding unit, according to a ratio of a height to a width of the coding unit, in order to determine the split rule. The image decoding apparatus 100 may determine a second range which is an allowable size range of a coding unit, according to a split shape mode of the coding unit, in order to determine the split rule.

Hereinafter, splitting of a coding unit will be described in detail according to an embodiment of the disclosure.

First, one picture may be split into one or more slices or one or more tiles. One slice or one tile may be a sequence of one or more largest coding units (coding tree units (CTUs)). According to an implementation example, a slice may include one or more tiles, and a slice may include one or more largest coding units. A slice including one or plurality of tiles may be determined in a picture.

There is a largest coding block (Coding Tree Block (CTB)) conceptually compared to a largest coding unit (CTU). The largest coding block (CTB) denotes an N×N block including N×N samples (where N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture encoded in color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture encoded in color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a preset size including a preset number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the embodiment is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-picture may be 32×32, and the maximum size of the luma coding block that is ternary splittable in a P-picture or a B-picture may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain, from the bitstream, the split shape mode information from one bin string. A form of the bitstream received by the image decoding apparatus 100 may include fixed length binary code, unary code, truncated unary code, predetermined binary code, or the like. The bin string is information in a binary number. The bin string may include at least one bit. The image decoding apparatus 100 may obtain the split shape mode information corresponding to the bin string, based on the split rule. The image decoding apparatus 100 may determine whether to quad split a coding unit, whether not to split a coding unit, a split direction, and a split type, based on one bin string.

The coding unit may be smaller than or the same as the largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape mode information about a largest coding unit indicates that splitting is performed, the largest coding unit may be split into coding units. Also, when split shape mode information about a coding unit indicates that splitting is performed, the coding unit may be split into smaller coding units. However, the splitting of the image is not limited thereto, and the largest coding unit and the coding unit may not be distinguished. The splitting of the coding unit will be described in detail with reference to FIGS. 3 to 16.

Also, one or more prediction blocks for prediction may be determined from a coding unit. The prediction block may be the same as or smaller than the coding unit. Also, one or more transform blocks for transformation may be determined from a coding unit. The transform block may be equal to or smaller than the coding unit.

The shapes and sizes of the transform block and prediction block may not be related to each other.

In another embodiment, prediction may be performed by using a coding unit as a prediction unit. Also, transformation may be performed by using a coding unit as a transform block.

The splitting of the coding unit will be described in detail with reference to FIGS. 3 to 16. A current block and an adjacent block of the disclosure may indicate one of the largest coding unit, the coding unit, the prediction block, and the transform block. Also, the current block of the current coding unit is a block that is currently being decoded or encoded or a block that is currently being split. The adjacent block may be a block reconstructed before the current block. The adjacent block may be adjacent to the current block spatially or temporally. The adjacent block may be located at one of the lower left, left, upper left, top, upper right, right, lower right of the current block.

Figure 3:
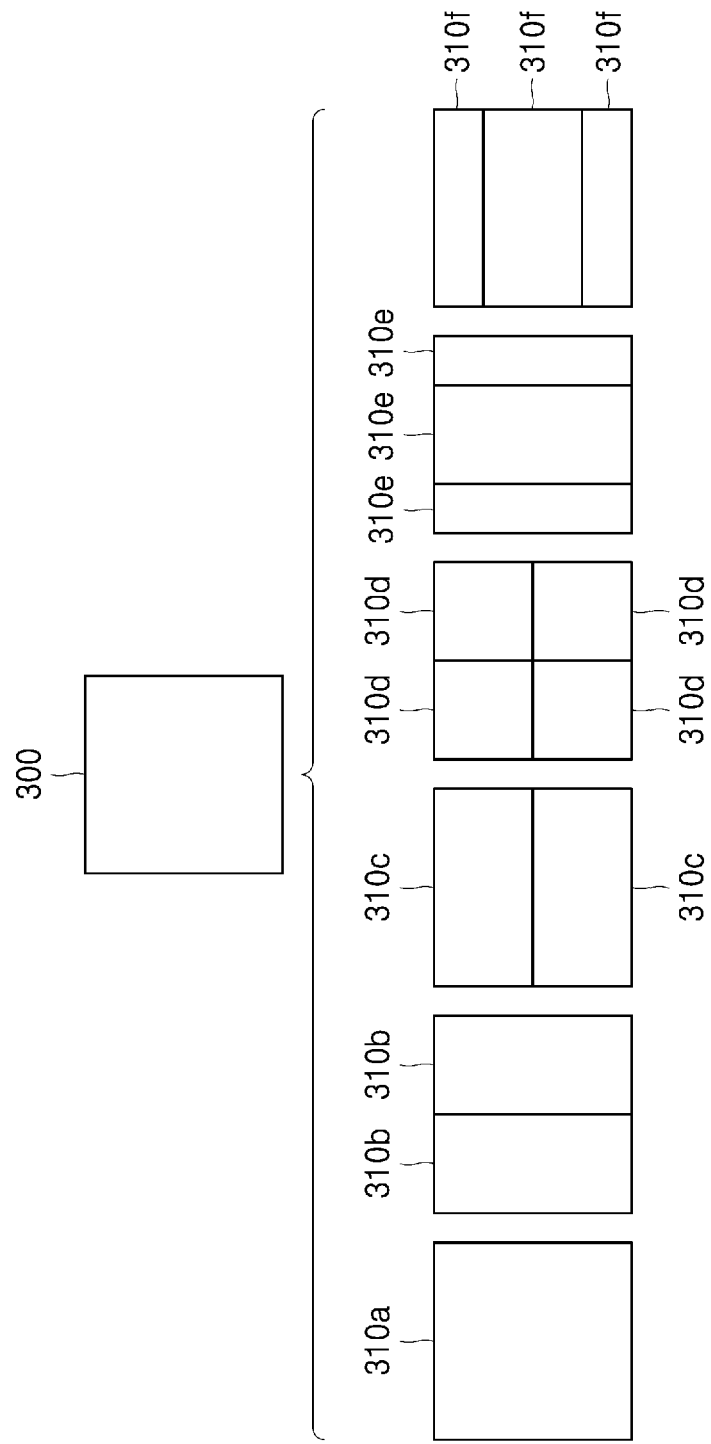
FIG. 3 illustrates a process of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. Here, N may be a positive integer. Block shape information is information indicating at least one of a shape, a direction, a ratio of width and height, or size of a coding unit.

The shape of the coding unit may include a square and a non-square. When the lengths of the width and height of the coding unit are the same (i.e., when the block shape of the coding unit is 4N×4N), the image decoding apparatus 100 may determine the block shape information of the coding unit as a square. The image decoding apparatus 100 may determine the shape of the coding unit to be a non-square.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is non-square, the image decoding apparatus 100 may determine the ratio of the width and height among the block shape information of the coding unit to be at least one of 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on the length of the width and the length of the height of the coding unit. Also, the image decoding apparatus 100 may determine the size of the coding unit, based on at least one of the length of the width, the length of the height, or the area of the coding unit.

According to an embodiment, the image decoding apparatus 100 may determine the shape of the coding unit by using the block shape information, and may determine a splitting method of the coding unit by using the split shape mode information. That is, a coding unit splitting method indicated by the split shape mode information may be determined based on a block shape indicated by the block shape information used by the image decoding apparatus 100.

The image decoding apparatus 100 may obtain the split shape mode information from a bitstream. However, an embodiment is not limited thereto, and the image decoding apparatus 100 and the image encoding apparatus 200 may determine pre-agreed split shape mode information, based on the block shape information. The image decoding apparatus 100 may determine the pre-agreed split shape mode information with respect to a largest coding unit or a minimum coding unit. For example, the image decoding apparatus 100 may determine split shape mode information with respect to the largest coding unit to be a quad split. Also, the image decoding apparatus 100 may determine split shape mode information regarding the smallest coding unit to be "not to perform splitting". In particular, the image decoding apparatus 100 may determine the size of the largest coding unit to be 256×256. The image decoding apparatus 100 may determine the pre-agreed split shape mode information to be a quad split. The quad split is a split shape mode in which the width and the height of the coding unit are both bisected. The image decoding apparatus 100 may obtain a coding unit of a 128×128 size from the largest coding unit of a 256×256 size, based on the split shape mode information. Also, the image decoding apparatus 100 may determine the size of the smallest coding unit to be 4×4. The image decoding apparatus 100 may obtain split shape mode information indicating "not to perform splitting" with respect to the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may not split a coding unit 310a having the same size as the current coding unit 300, based on the split shape mode information indicating not to perform splitting, or may determine coding units 310b, 310c, 310d, 310e, or 310f split based on the split shape mode information indicating a preset splitting method.

Referring to FIG. 3, according to an embodiment, the image decoding apparatus 100 may determine two coding units 310b obtained by splitting the current coding unit 300 in a vertical direction, based on the split shape mode information indicating to perform splitting in a vertical direction. The image decoding apparatus 100 may determine two coding units 310c obtained by splitting the current coding unit 300 in a horizontal direction, based on the split shape mode information indicating to perform splitting in a horizontal direction. The image decoding apparatus 100 may determine four coding units 310d obtained by splitting the current coding unit 300 in vertical and horizontal directions, based on the split shape mode information indicating to perform splitting in vertical and horizontal directions. According to an embodiment, the image decoding apparatus 100 may determine three coding units 310e obtained by splitting the current coding unit 300 in a vertical direction, based on the split shape mode information indicating to perform ternary splitting in a vertical direction. The image decoding apparatus 100 may determine three coding units 310f obtained by splitting the current coding unit 300 in a horizontal direction, based on the split shape mode information indicating to perform ternary splitting in a horizontal direction. However, splitting methods of the square coding unit are not limited to the above-described methods, and the split shape mode information may indicate various methods. Preset splitting methods of splitting the square coding unit will be described in detail below in relation to various embodiments.

Figure 4:
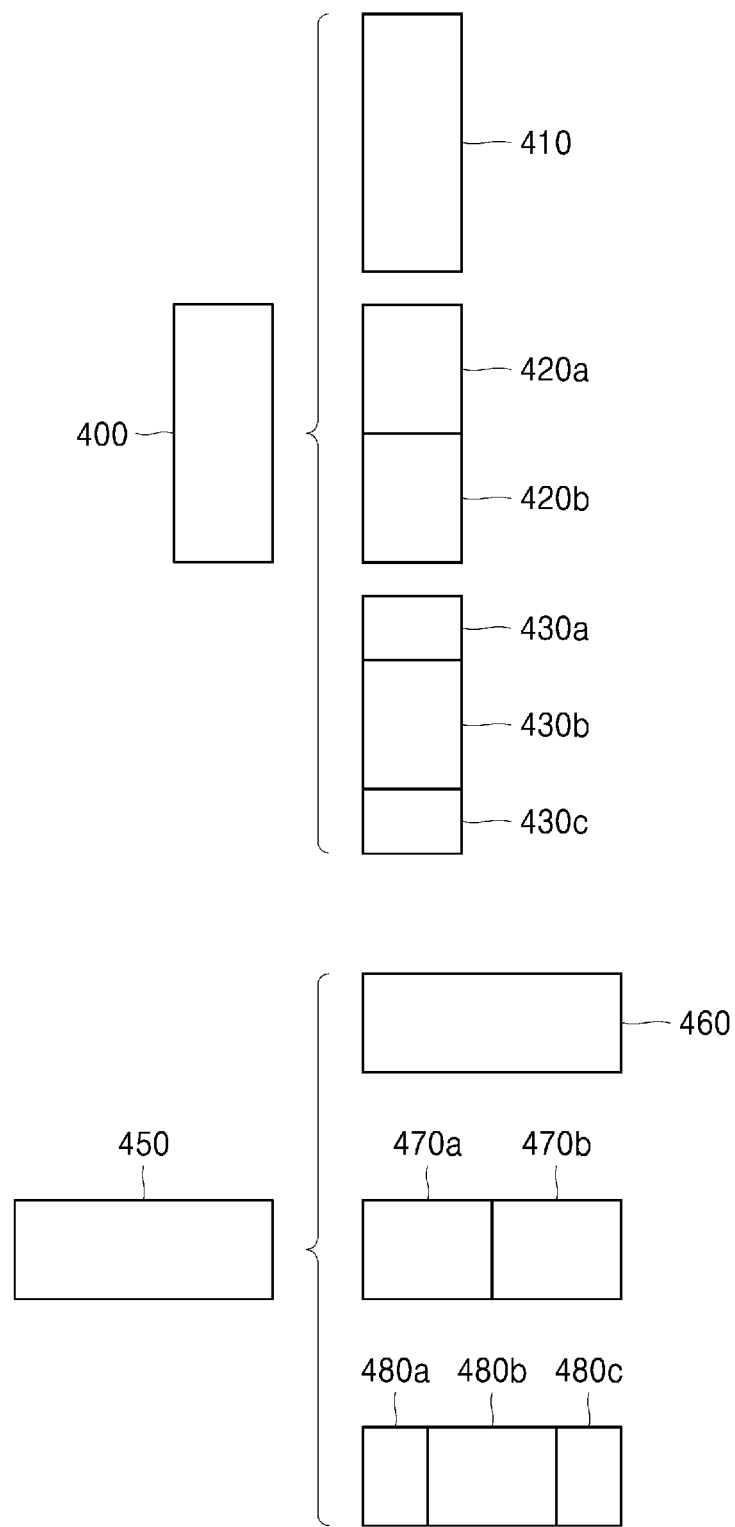
FIG. 4 illustrates a process of determining at least one coding unit by splitting a non-square coding unit, according to an embodiment.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine whether not to split the non-square current coding unit or whether to split the non-square current coding unit by using a preset splitting method, based on split shape mode information. Referring to FIG. 4, when the block shape information of a current coding unit 400 or 450 indicates a non-square shape, the image decoding apparatus 100 may determine a coding unit 410 or 460 having the same size as the current coding unit 400 or 450, based on the split shape mode information indicating not to perform splitting, or may determine coding units 420a and 420b, 430a to 430c, 470a and 470b, or 480a to 480c split based on the split shape mode information indicating a preset splitting method. Preset splitting methods of splitting a non-square coding unit will be described in detail below in relation to various embodiments.

According to an embodiment, the image decoding apparatus 100 may determine a splitting method of a coding unit by using the split shape mode information and, in this case, the split shape mode information may indicate the number of one or more coding units generated by splitting a coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450, by splitting the current coding unit 400 or 450 based on the split shape mode information.

According to an embodiment, when the image decoding apparatus 100 splits the non-square current coding unit 400 or 450 based on the split shape mode information, the image decoding apparatus 100 may consider the location of a long side of the non-square current coding unit 400 or 450 to split a current coding unit. For example, the image decoding apparatus 100 may determine a plurality of coding units by splitting the current coding unit 400 or 450 in a direction of splitting a long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio of the width and height of the current coding unit 400 or 450 may be 4:1 or 1:4. When the ratio of the width and height is 4:1, the block shape information may indicate a horizontal direction because the length of the width is longer than the length of the height. When the ratio of the width and height is 1:4, the block shape information may indicate a vertical direction because the length of the width is shorter than the length of the height. The image decoding apparatus 100 may determine to split a current coding unit into an odd number of blocks, based on the split shape mode information. Also, the image decoding apparatus 100 may determine a split direction of the current coding unit 400 or 450, based on the block shape information of the current coding unit 400 or 450. For example, when the current coding unit 400 is in the vertical direction, the image decoding apparatus 100 may determine the coding units 430a, 430b, and 430c by splitting the current coding unit 400 in the horizontal direction. Also, when the current coding unit 450 is in the horizontal direction, the image decoding apparatus 100 may determine the coding units 480a, 480b, and 480c by splitting the current coding unit 450 in the vertical direction.

According to an embodiment, the image decoding apparatus 100 may determine an odd number of coding units included in the current coding unit 400 or 450, and not all the determined coding units may have the same size. For example, a preset coding unit 430b or 480b from among the determined odd number of coding units 430a, 430b, and 430c, or 480a, 480b, and 480c may have a size different from the size of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into the odd number of blocks, the image decoding apparatus 100 may determine the odd number of coding units included in the current coding unit 400 or 450, and moreover, may put a preset restriction on at least one coding unit from among the odd number of coding units generated by splitting the current coding unit 400 or 450. Referring to FIG. 4, the image decoding apparatus 100 may set a decoding process regarding the coding unit 430b or 480b located at the center among the three coding units 430a, 430b, and 430c, or 480a, 480b, and 480c generated as the current coding unit 400 or 450 is split to be different from that of the other coding units 430a and 430c, or 480a and 480c. For example, the image decoding apparatus 100 may restrict the coding unit 430b or 480b at the center location to be no longer split or to be split only a preset number of times, unlike the other coding units 430a and 430c, or 480a and 480c.

Figure 5:
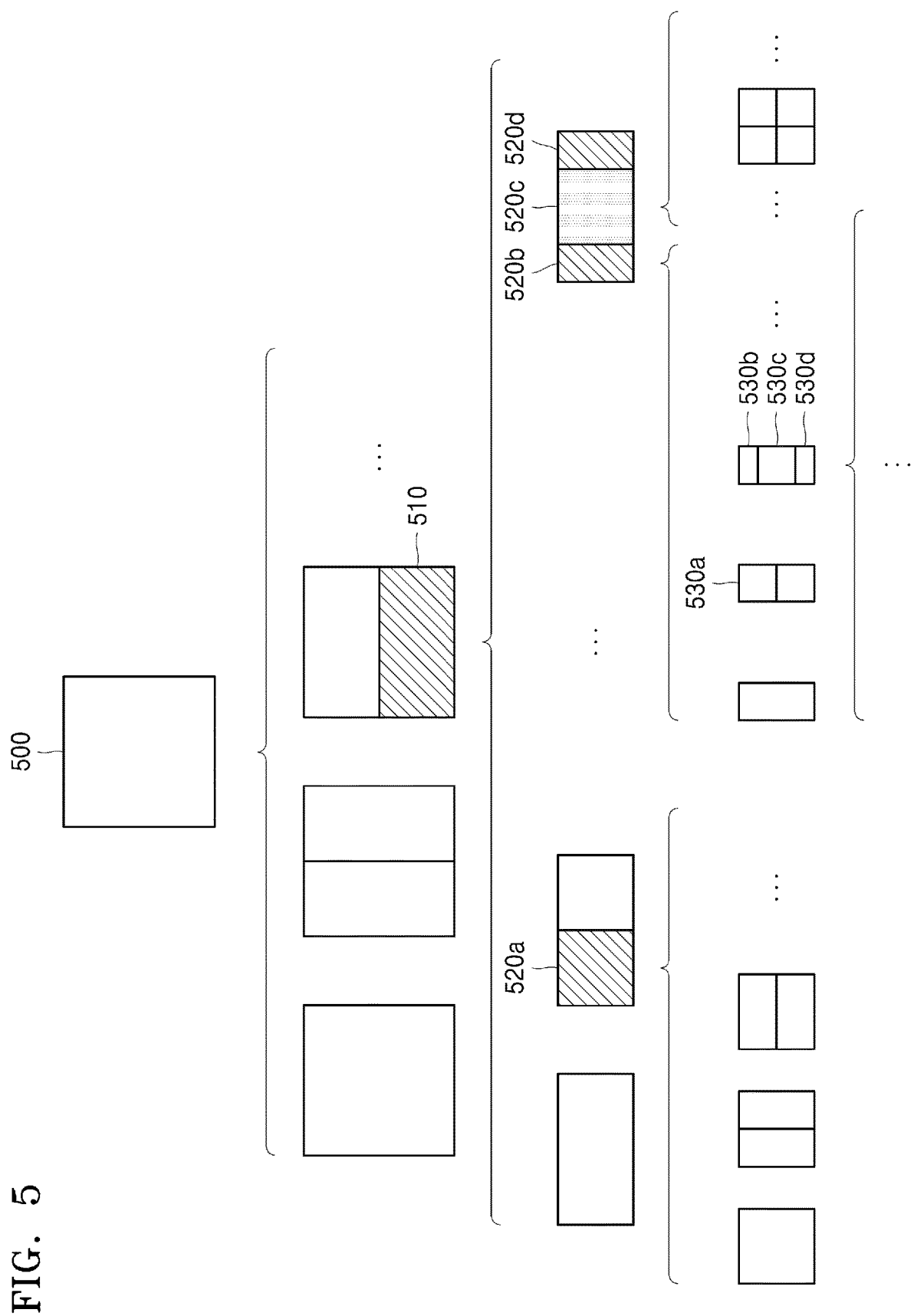
FIG. 5 illustrates a process of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units, based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, a second coding unit may be determined by splitting a first coding unit, and a third coding unit may be determined by splitting the second coding unit. It will be understood that the relation of the first coding unit, the second coding unit, and the third coding unit follows the above descriptions.

According to an embodiment, the image decoding apparatus 100 may determine to split or not to split the determined second coding unit 510 into coding units, based on the split shape mode information. Referring to FIG. 5, the image decoding apparatus 100 may split the non-square second coding unit 510, which is determined by splitting the first coding unit 500, into one or more third coding units 520a, 520b, 520c, and 520d based on at least one of the split shape mode information and the split shape mode information, or may not split the non-square second coding unit 510. The image decoding apparatus 100 may obtain the split shape mode information, and may obtain a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units (e.g., 520a, or 520b, 520c, and 520d) based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a preset coding unit (e.g., a coding unit located at a center location, or a square coding unit) from among an odd number of third coding units 520b, 520c, and 520d determined by splitting the non-square second coding unit 510 may be recursively split. According to an embodiment, the non-square third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be re-split into a plurality of coding units. For example, the non-square fourth coding unit 530b or 530d may be re-split into an odd number of coding units. A method that may be used to recursively split a coding unit will be described below in relation to various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a preset restriction on a preset third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a preset splitting method (e.g., split into only four coding units or split by using a splitting method of the second coding unit 510), or to be split only a preset number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a preset location in the current coding unit.

Figure 6:
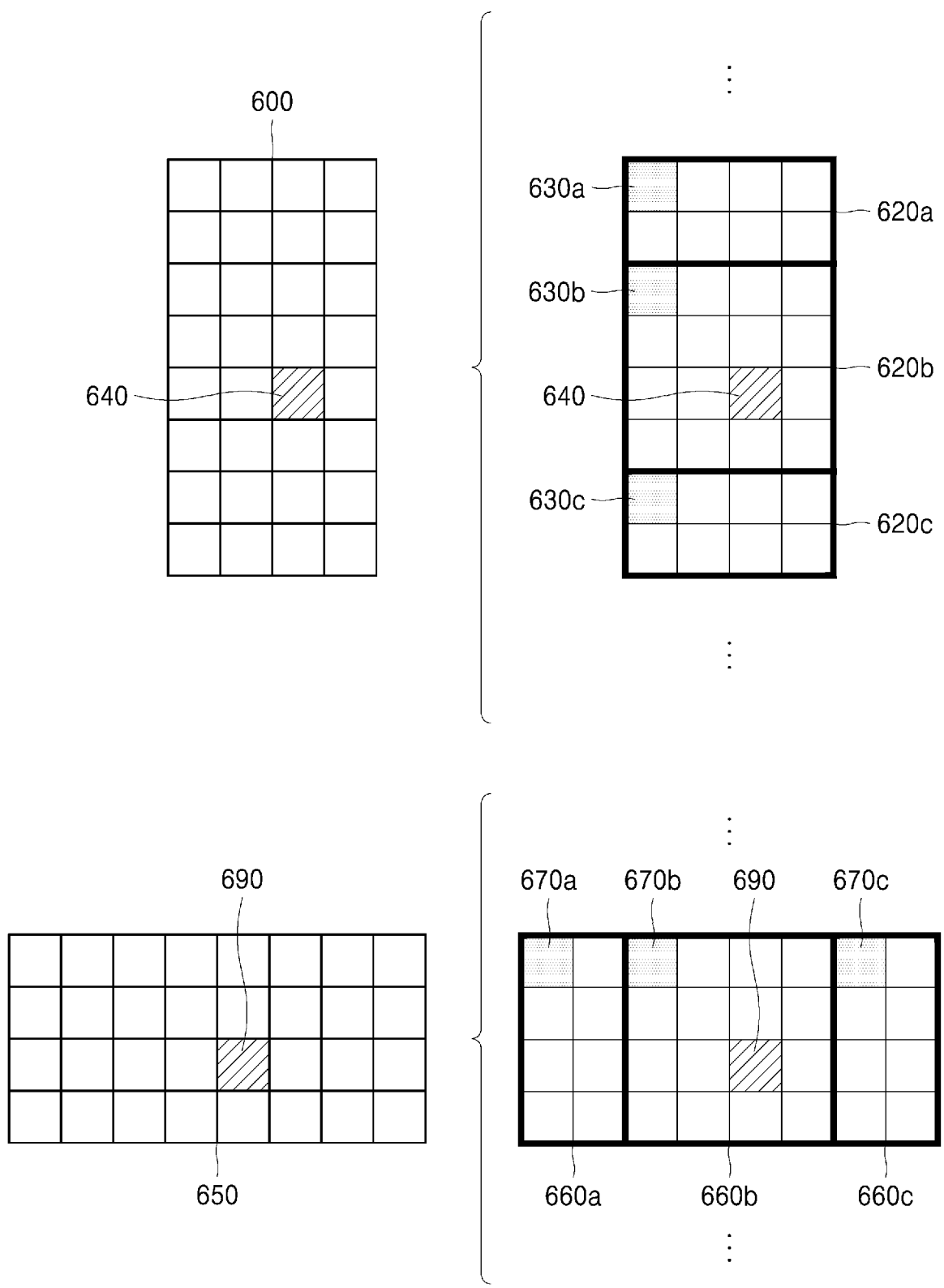
FIG. 6 illustrates a method of determining a preset coding unit from among an odd number of coding units, according to an embodiment.

FIG. 6 illustrates a method, performed by the image decoding apparatus 100, of determining a preset coding unit from among an odd number of coding units, according to an embodiment.

Referring to FIG. 6, split shape mode information of a current coding unit 600 or 650 may be obtained from a sample of a preset location (e.g., a sample 640 or 690 of a center location) from among a plurality of samples included in the current coding unit 600 or 650. However, the preset location in the current coding unit 600, from which at least one piece of the split shape mode information may be obtained, is not limited to the center location in FIG. 6, and may include various locations included in the current coding unit 600 (e.g., top, bottom, left, right, upper left, lower left, upper right, lower right locations, or the like). The image decoding apparatus 100 may obtain the split shape mode information from the preset location and may determine to split or not to split the current coding unit into various-shaped and various-sized coding units.

According to an embodiment, when the current coding unit is split into a preset number of coding units, the image decoding apparatus 100 may select one of the coding units. Various methods may be used to select one of a plurality of coding units, as will be described below in relation to various embodiments.

According to an embodiment, the image decoding apparatus 100 may split the current coding unit into a plurality of coding units, and may determine a coding unit at a preset location.

According to an embodiment, image decoding apparatus 100 may use information indicating locations of the odd number of coding units, to determine a coding unit at a center location from among the odd number of coding units. Referring to FIG. 6, the image decoding apparatus 100 may determine the odd number of coding units 620a, 620b, and 620c or the odd number of coding units 660a, 660b, and 660c by splitting the current coding unit 600 or the current coding unit 650. The image decoding apparatus 100 may determine the middle coding unit 620b or the middle coding unit 660b by using information about the locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of preset samples included in the coding units 620a, 620b, and 620c. In detail, the image decoding apparatus 100 may determine the coding unit 620b at the center location by determining the locations of the coding units 620a, 620b, and 620c based on information indicating locations of upper-left samples 630a, 630b, and 630c of the coding units 620a, 620b, and 620c.

According to an embodiment, the information indicating the locations of the upper-left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the upper-left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the upper-left sample 630a of the upper coding unit 620a may include coordinates (xa, ya), information indicating the location of the upper-left sample 630b of the center coding unit 620b may include coordinates (xb, yb), and information indicating the location of the upper-left sample 630c of the lower coding unit 620c may include coordinates (xc, yc). The image decoding apparatus 100 may determine the middle coding unit 620b by using the coordinates of the upper-left samples 630a, 630b, and 630c which are included in the coding units 620a, 620b, and 620c, respectively. For example, when the coordinates of the upper-left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the upper-left samples 630a, 630b, and 630c may include coordinates indicating absolute locations in the picture, or may use coordinates (dxb, dyb) indicating a relative location of the upper-left sample 630b of the middle coding unit 620b and coordinates (dxc, dyc) indicating a relative location of the upper-left sample 630c of the lower coding unit 620c with reference to the location of the upper-left sample 630a of the upper coding unit 620a. A method of determining a coding unit at a preset location by using coordinates of a sample included in the coding unit, as information indicating a location of the sample, is not limited to the above-described method, and may include various arithmetic methods capable of using the coordinates of the sample.

According to an embodiment, the image decoding apparatus 100 may split the current coding unit 600 into a plurality of coding units 620a, 620b, and 620c, and may select one of the coding units 620a, 620b, and 620c based on a preset criterion. For example, the image decoding apparatus 100 may select the coding unit 620b, which has a size different from that of the others, from among the coding units 620a, 620b, and 620c.

According to an embodiment, the image decoding apparatus 100 may determine the width or height of each of the coding units 620a, 620b, and 620c by using the coordinates (xa, ya) that is the information indicating the location of the upper-left sample 630a of the upper coding unit 620a, the coordinates (xb, yb) that is the information indicating the location of the upper-left sample 630b of the middle coding unit 620b, and the coordinates (xc, yc) that are the information indicating the location of the upper-left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be the width of the current coding unit 600. The image decoding apparatus 100 may determine the height of the upper coding unit 620a to be yb-ya. According to an embodiment, the image decoding apparatus 100 may determine the width of the middle coding unit 620b to be the width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 or the widths or heights of the upper and middle coding units 620a and 620b. The image decoding apparatus 100 may determine a coding unit, which has a size different from that of the others, based on the determined widths and heights of the coding units 620a, 620b, and 620c. Referring to FIG. 6, the image decoding apparatus 100 may determine the middle coding unit 620b, which has a size different from the size of the upper and lower coding units 620a and 620c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

The image decoding apparatus 100 may determine the width or height of each of the coding units 660a, 660b, and 660c by using the coordinates (xd, yd) that are information indicating the location of an upper-left sample 670a of the left coding unit 660a, the coordinates (xe, ye) that are information indicating the location of an upper-left sample 670b of the middle coding unit 660b, and the coordinates (xf, yf) that are information indicating a location of the upper-left sample 670c of the right coding unit 660c. The image decoding apparatus 100 may determine the respective sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a to be the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 650. According to an embodiment, the image decoding apparatus 100 may determine the width or height of the right coding unit 660c by using the width or height of the current coding unit 650 or the widths or heights of the left and middle coding units 660a and 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the sizes of the left and right coding units 660a and 660c, as the coding unit of the preset location. However, the above-described method, performed by the image decoding apparatus 100, of determining a coding unit having a size different from the size of the other coding units merely corresponds to an example of determining a coding unit at a preset location by using the sizes of coding units, which are determined based on coordinates of samples, and thus various methods of determining a coding unit at a preset location by comparing the sizes of coding units, which are determined based on coordinates of preset samples, may be used.

However, locations of samples considered to determine locations of coding units are not limited to the above-described upper left locations, and information about arbitrary locations of samples included in the coding units may be used.

According to an embodiment, the image decoding apparatus 100 may select a coding unit at a preset location from among an odd number of coding units determined by splitting the current coding unit, considering the shape of the current coding unit. For example, when the current coding unit has a non-square shape, a width of which is longer than a height, the image decoding apparatus 100 may determine the coding unit at the preset location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the preset location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the preset location from among the even number of coding units. The image decoding apparatus 100 may determine an even number of coding units by splitting (binary splitting) the current coding unit, and may determine the coding unit at the preset location by using the information about the locations of the even number of coding units. An operation related thereto may correspond to the operation of determining a coding unit at a preset location (e.g., a center location) from among an odd number of coding units, which has been described in detail above in relation to FIG. 6, and thus detailed descriptions thereof are not provided here.

According to an embodiment, when a non-square current coding unit is split into a plurality of coding units, preset information about a coding unit at a preset location may be used in a splitting operation to determine the coding unit at the preset location from among the plurality of coding units. For example, the image decoding apparatus 100 may use at least one of block shape information and split shape mode information, which is stored in a sample included in a middle coding unit, in a splitting operation to determine a coding unit at a center location from among the plurality of coding units determined by splitting the current coding unit.

Referring to FIG. 6, the image decoding apparatus 100 may split the current coding unit 600 into the plurality of coding units 620a, 620b, and 620c based on the split shape mode information, and may determine the coding unit 620b at a center location from among the plurality of the coding units 620a, 620b, and 620c. Furthermore, the image decoding apparatus 100 may determine the coding unit 620b at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620a, 620b, and 620c based on the split shape mode information, the coding unit 620b including the sample 640 may be determined as the coding unit at the center location. However, information used to determine the coding unit at the center location is not limited to the split shape mode information, and various types of information may be used to determine the coding unit at the center location.

According to an embodiment, preset information for identifying the coding unit at the preset location may be obtained from a preset sample included in a coding unit to be determined. Referring to FIG. 6, the image decoding apparatus 100 may use the split shape mode information, which is obtained from a sample at a preset location in the current coding unit 600 (e.g., a sample at a center location of the current coding unit 600) to determine a coding unit at a preset location from among the plurality of the coding units 620a, 620b, and 620c determined by splitting the current coding unit 600 (e.g., a coding unit at a center location from among a plurality of split coding units). That is, the image decoding apparatus 100 may determine the sample at the preset location by considering a block shape of the current coding unit 600, may determine the coding unit 620b including a sample, from which preset information (e.g., the split shape mode information) can be obtained, from among the plurality of coding units 620a, 620b, and 620c determined by splitting the current coding unit 600, and may put a preset restriction on the coding unit 620b. Referring to FIG. 6, according to an embodiment, the image decoding apparatus 100 may determine the sample 640 at the center location of the current coding unit 600 as the sample from which the preset information may be obtained, and may put a preset restriction on the coding unit 620b including the sample 640, in a decoding operation. However, the location of the sample from which the preset information can be obtained is not limited to the above-described location, and may include arbitrary locations of samples included in the coding unit 620b to be determined for a restriction.

According to an embodiment, the location of the sample from which the preset information may be obtained may be determined based on the shape of the current coding unit 600. According to an embodiment, the block shape information may indicate whether the current coding unit has a square or non-square shape, and the location of the sample from which the preset information may be obtained may be determined based on the shape. For example, the image decoding apparatus 100 may determine a sample located on a boundary for splitting at least one of a width and height of the current coding unit in half, as the sample from which the preset information can be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for splitting a long side of the current coding unit in half, as the sample from which the preset information can be obtained.

According to an embodiment, when the current coding unit is split into a plurality of coding units, the image decoding apparatus 100 may use the split shape mode information to determine a coding unit at a preset location from among the plurality of coding units. According to an embodiment, the image decoding apparatus 100 may obtain the split shape mode information from a sample at a preset location in a coding unit, and may split the plurality of coding units, which are generated by splitting the current coding unit, by using the split shape mode information, which is obtained from the sample of the preset location in each of the plurality of coding units. That is, a coding unit may be recursively split based on the split shape mode information, which is obtained from the sample at the preset location in each coding unit. An operation of recursively splitting a coding unit has been described above in relation to FIG. 5, and thus detailed descriptions thereof will not be provided here.

According to an embodiment, the image decoding apparatus 100 may determine one or more coding units by splitting the current coding unit, and may determine an order of decoding the one or more coding units, based on a preset block (e.g., the current coding unit).

Figure 7:
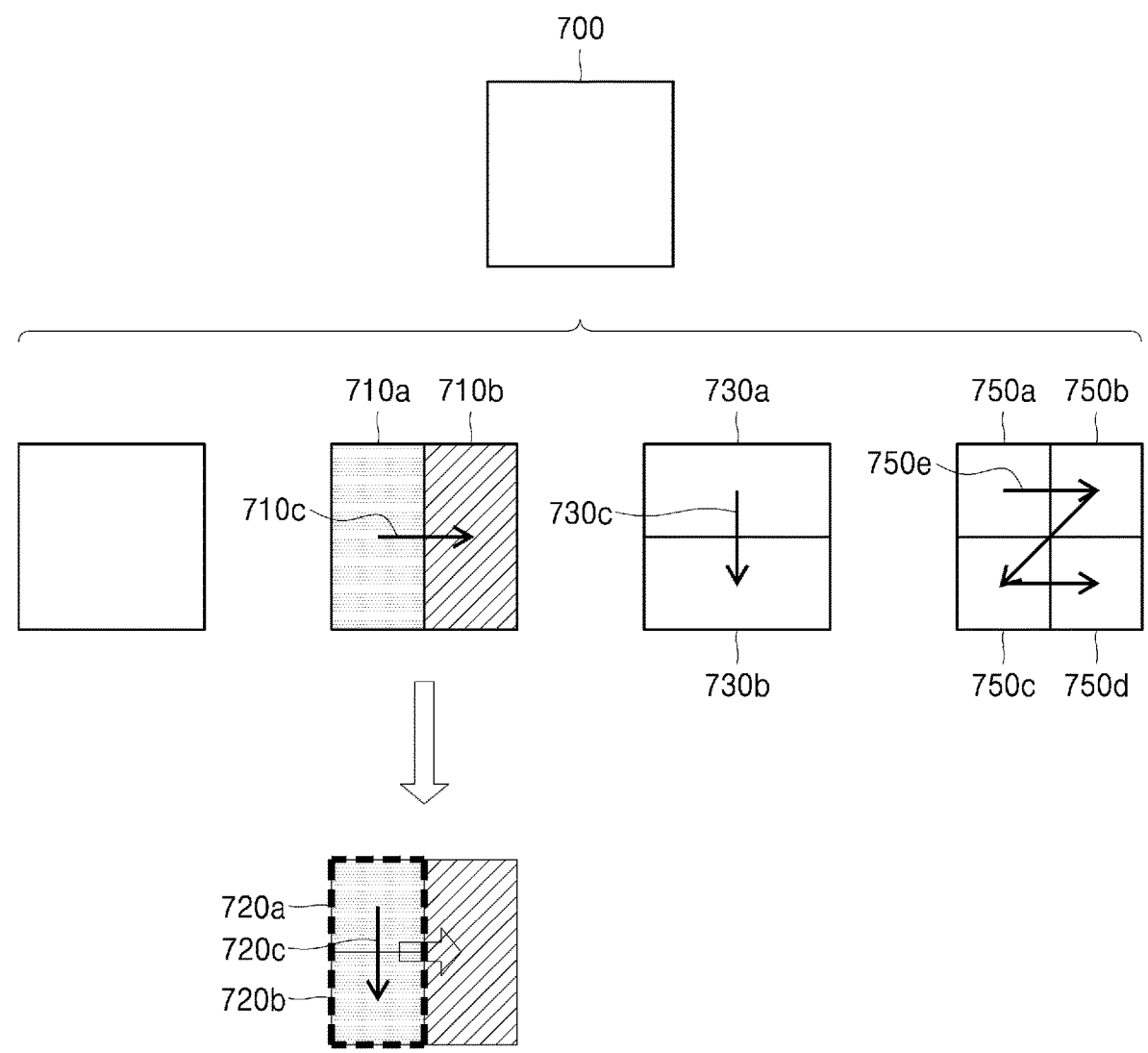
FIG. 7 illustrates an order of processing a plurality of coding units when the plurality of coding units are determined by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a, 750b, 750c, and 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine the second coding units 750a, 750b, 750c, and 750d, which are determined by splitting the first coding unit 700 in vertical and horizontal directions, according to a preset order (e.g., a raster scan order or Z-scan order 750e) by which coding units in a row are processed and then coding units in a next row are processed.

According to an embodiment, the image decoding apparatus 100 may recursively split coding units. Referring to FIG. 7, the image decoding apparatus 100 may determine the plurality of coding units 710a and 710b, 730a and 730b, or 750a, 750b, 750c, and 750d by splitting the first coding unit 700, and may recursively split each of the determined plurality of coding units 710a, 710b, 730a, 730b, 750a, 750b, 750c, and 750d. A splitting method of the plurality of coding units 710a and 710b, 730a and 730b, or 750a, 750b, 750c, and 750d may correspond to a splitting method of the first coding unit 700. Accordingly, each of the plurality of coding units 710a and 710b, 730a and 730b, or 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a preset order.

Figure 8:
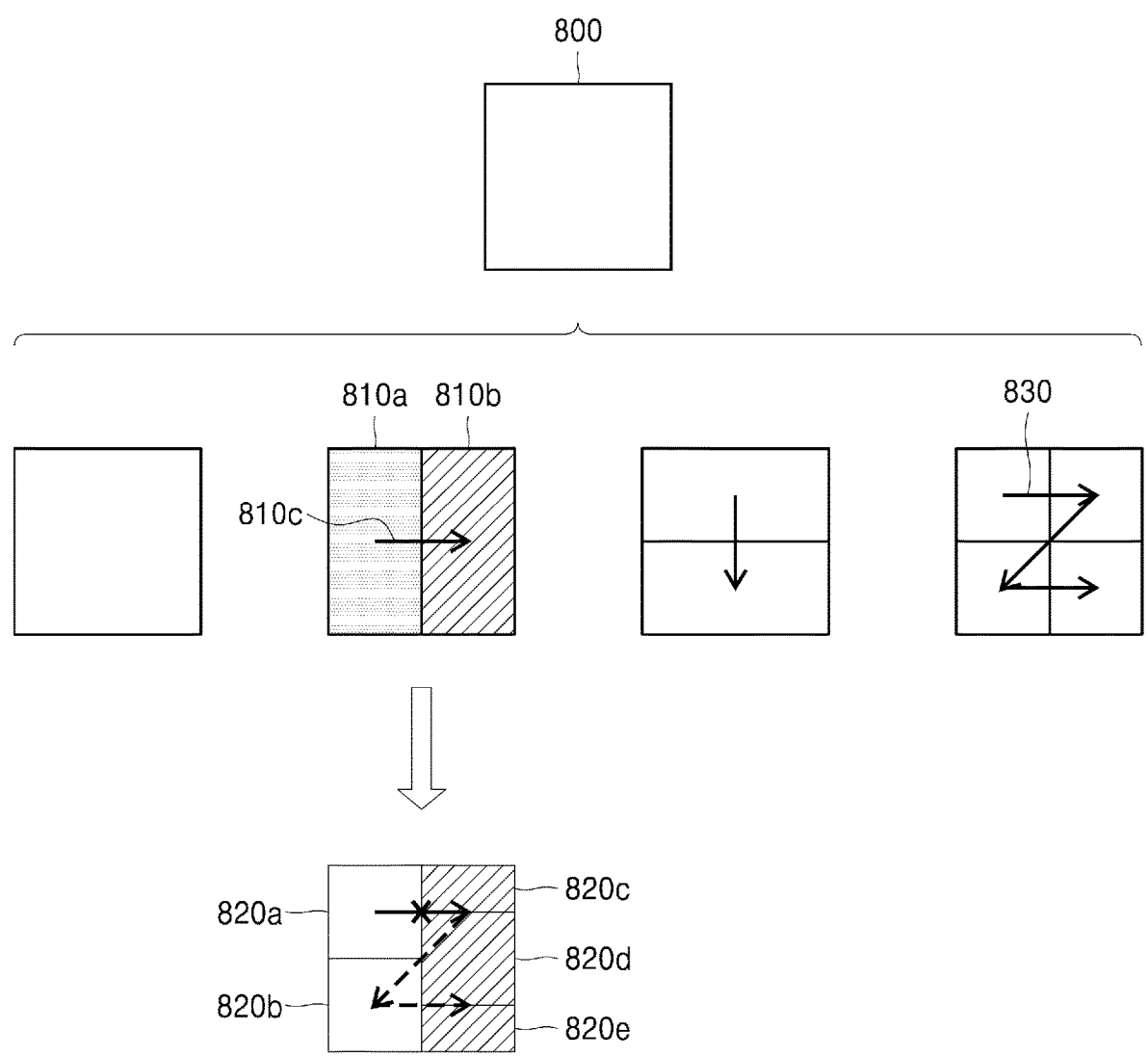
FIG. 8 illustrates a process of determining that a current coding unit is to be split into an odd number of coding units, when the coding units are not processable in a preset order, according to an embodiment.

FIG. 8 illustrates a process, performed by the image decoding apparatus 100, of determining that a current coding unit is to be split into an odd number of coding units, when the coding units are not processable in a preset order, according to an embodiment.

According to an embodiment, the image decoding apparatus 100 may determine that the current coding unit is to be split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c, 820d, and 820e. According to an embodiment, the image decoding apparatus 100 may determine the plurality of third coding units 820a and 820b by splitting the left second coding unit 810a in a horizontal direction, and may split the right second coding unit 810b into the odd number of third coding units 820c, 820d, and 820e.

According to an embodiment, the image decoding apparatus 100 may determine whether any coding unit is split into an odd number of coding units, by determining whether the third coding units 820a and 820b, and 820c, 820d, and 820e are processable in a preset order. Referring to FIG. 8, the image decoding apparatus 100 may determine the third coding units 820a and 820b, and 820c, 820d, and 820e by recursively splitting the first coding unit 800. The image decoding apparatus 100 may determine whether any of the first coding unit 800, the second coding units 810a and 810b, or the third coding units 820a and 820b, and 820c, 820d, and 820e are split into an odd number of coding units, based on at least one of the block shape information and the split shape mode information. For example, a coding unit located in the right from among the second coding units 810a and 810b may be split into an odd number of third coding units 820c, 820d, and 820e. A processing order of a plurality of coding units included in the first coding unit 800 may be a preset order (e.g., a Z-scan order 830), and the image decoding apparatus 100 may determine whether the third coding units 820c, 820d, and 820e, which are determined by splitting the right second coding unit 810b into an odd number of coding units, satisfy a condition for processing in the preset order.

According to an embodiment, the image decoding apparatus 100 may determine whether the third coding units 820a and 820b, and 820c, 820d, and 820e included in the first coding unit 800 satisfy the condition for processing in the preset order, and the condition relates to whether at least one of a width and height of the second coding units 810a and 810b is to be split in half along a boundary of the third coding units 820a and 820b, and 820c, 820d, and 820e. For example, the third coding units 820a and 820b determined when the height of the left second coding unit 810a of the non-square shape is split in half may satisfy the condition. It may be determined that the third coding units 820c, 820d, and 820e do not satisfy the condition because the boundaries of the third coding units 820c, 820d, and 820e determined when the right second coding unit 810b is split into three coding units are unable to split the width or height of the right second coding unit 810b in half. When the condition is not satisfied as described above, the image decoding apparatus 100 may determine disconnection of a scan order, and may determine that the right second coding unit 810b is to be split into an odd number of coding units, based on a result of the determination. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

Figure 9:
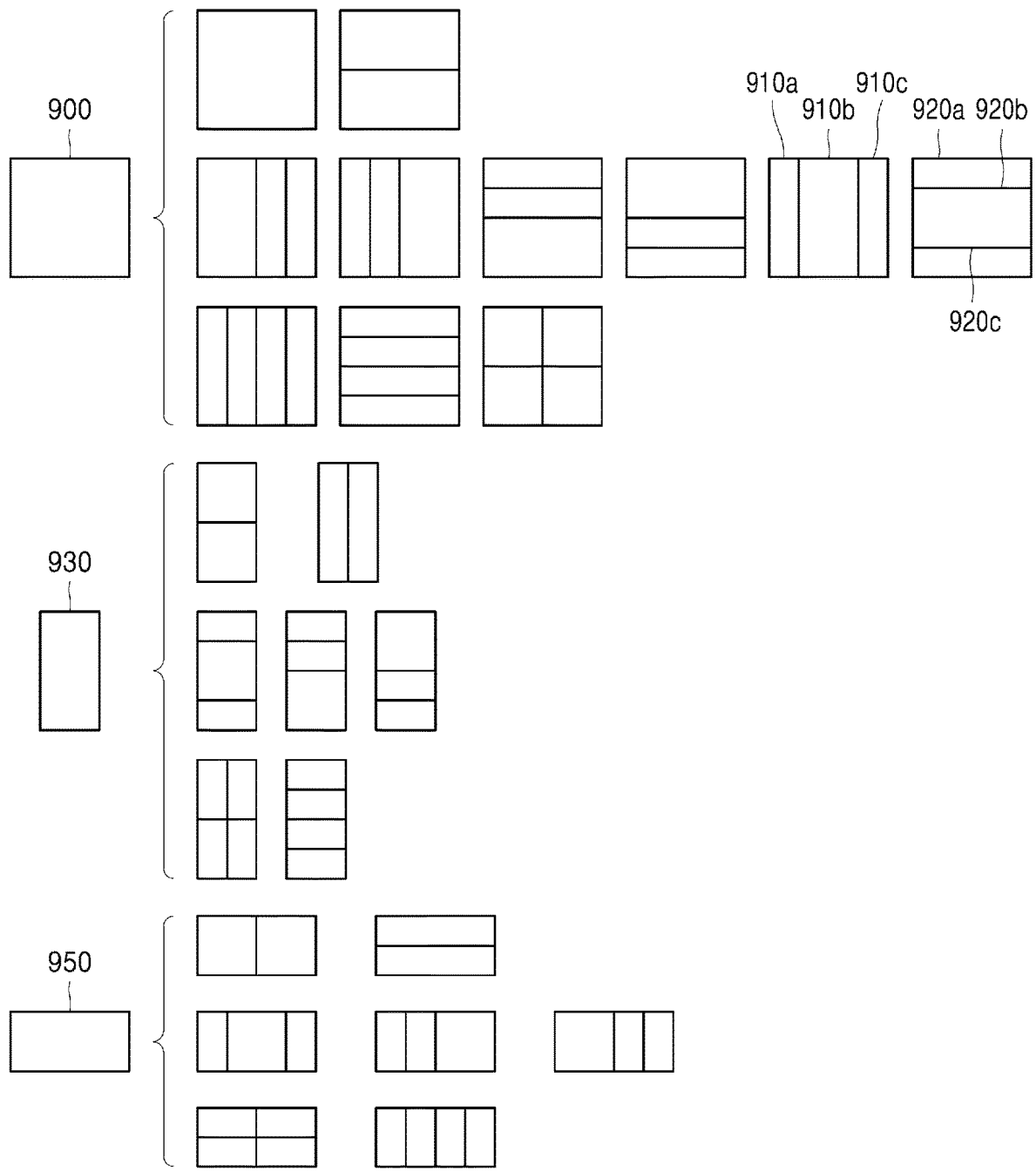
FIG. 9 illustrates a process of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained through the bitstream obtainer 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a preset order, and the condition relates to whether at least one of a width and height of the first coding unit 900 is to be split in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not split the width of the first coding unit 900 in half, it may be determined that the first coding unit 900 does not satisfy the condition for processing in the preset order. Also, because boundaries of the second coding units 920a, 920b, and 920c determined by splitting the square first coding unit 900 in a horizontal direction do not split the height of the first coding unit 900 in half, it may be determined that the first coding unit 900 does not satisfy the condition for processing in the preset order. When the condition is not satisfied as described above, the image decoding apparatus 100 may decide disconnection of a scan order, and may determine that the first coding unit 900 is to be split into an odd number of coding units, based on a result of the decision. According to an embodiment, when a coding unit is split into an odd number of coding units, the image decoding apparatus 100 may put a preset restriction on a coding unit at a preset location from among the split coding units. The restriction or the preset location has been described above in relation to various embodiments, and thus detailed descriptions thereof will not be provided herein.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
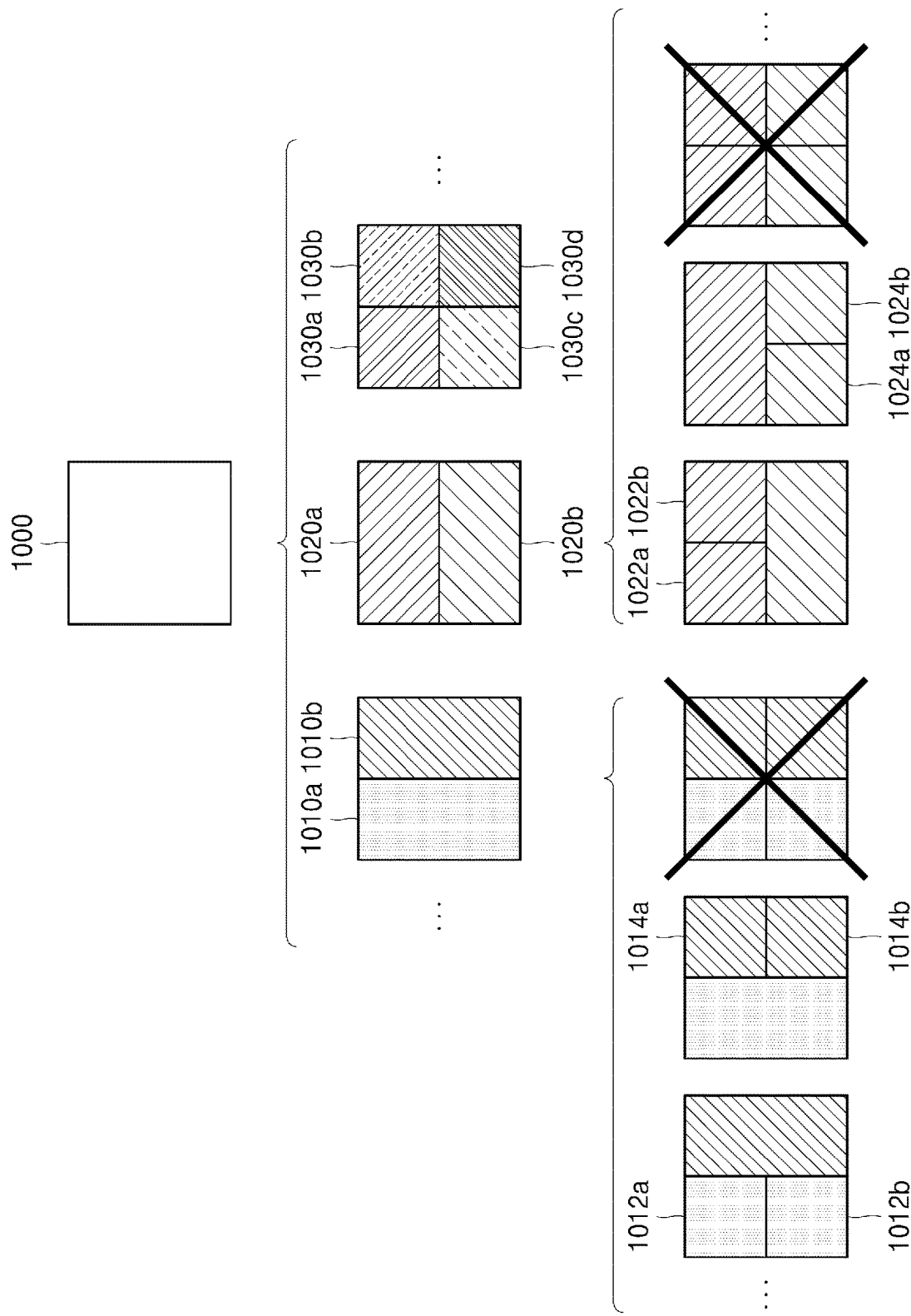
FIG. 10 illustrates that shapes into which second coding units having non-square shapes, determined by splitting a first coding unit, are splittable are restricted when the second coding units satisfy a preset condition, according to an embodiment.

FIG. 10 illustrates that a shape into which a second coding unit is splittable is restricted when the second coding unit having a non-square shape, which is determined when the image decoding apparatus 100 splits a first coding unit 1000, satisfies a preset condition, according to an embodiment.

According to an embodiment, the image decoding apparatus 100 may determine to split the square first coding unit 1000 into non-square second coding units 1010a, and 1010b or 1020a and 1020b, based on split shape mode information, which is obtained by the bitstream obtainer 110. The second coding units 1010a and 1010b, or 1020a and 1020b may be independently split. As such, the image decoding apparatus 100 may determine to split or not to split each of the second coding units 1010a and 1010b, or 1020a and 1020b into a plurality of coding units, based on the split shape mode information of each of the second coding units 1010a and 1010b, or 1020a and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b not to be split in a horizontal direction in which the left second coding unit 1010a is split. When third coding units 1014a and 1014b are determined by splitting the right second coding unit 1010b in a same direction, because the left and right second coding units 1010a and 1010b are independently split in a horizontal direction, the third coding units 1012a and 1012b, or 1014a and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a and 1022b, or 1024a and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) not to be split in a vertical direction in which the upper second coding unit 1020a is split.

Figure 11:
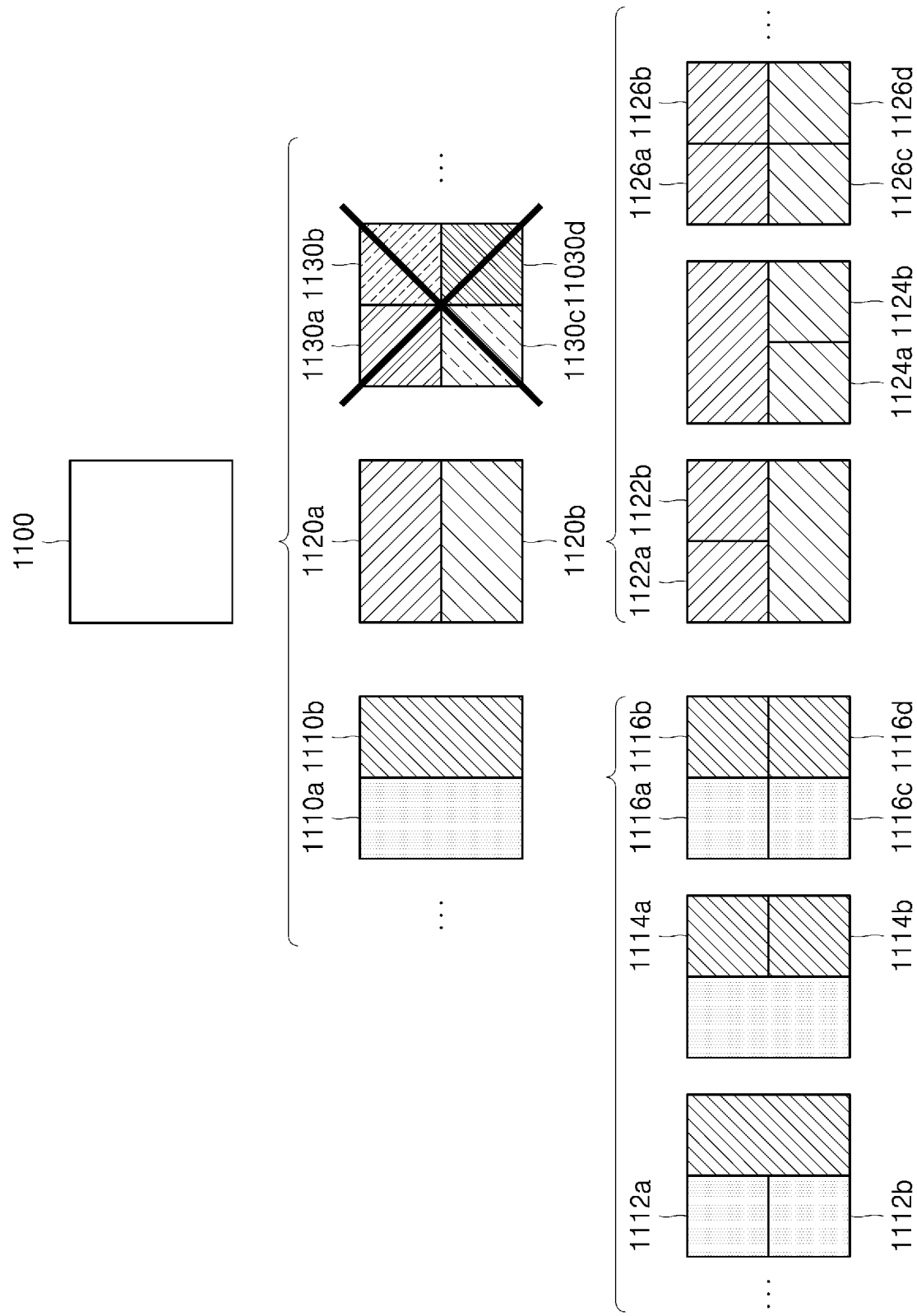
FIG. 11 illustrates a process of splitting a square coding unit when split shape mode information indicates that the square coding unit is not to be split into four square coding units, according to an embodiment.

FIG. 11 illustrates a process, performed by the image decoding apparatus 100, of splitting a square coding unit when split shape mode information indicates that the square coding unit is not to be split into four square coding units, according to an embodiment.

According to an embodiment, the image decoding apparatus 100 may determine second coding units 1110a and 1110b, or 1120a and 1120b, etc. by splitting a first coding unit 1100, based on split shape mode information. The split shape mode information may include information about various methods of splitting a coding unit but, the information about various splitting methods may not include information for splitting a coding unit into four square coding units. According to such split shape mode information, the image decoding apparatus 100 may not split the square first coding unit 1100 into four square second coding units 1130a, 1130b, 1130c, and 1130d. The image decoding apparatus 100 may determine the non-square second coding units 1110a and 1110b, or 1120a and 1120b, etc., based on the split shape mode information.

According to an embodiment, the image decoding apparatus 100 may independently split the non-square second coding units 1110a and 1110b, or 1120a and 1120b, etc. Each of the second coding units 1110a and 1110b, or 1120a and 1120b, etc. may be recursively split in a preset order, and this splitting method may correspond to a method of splitting the first coding unit 1100, based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
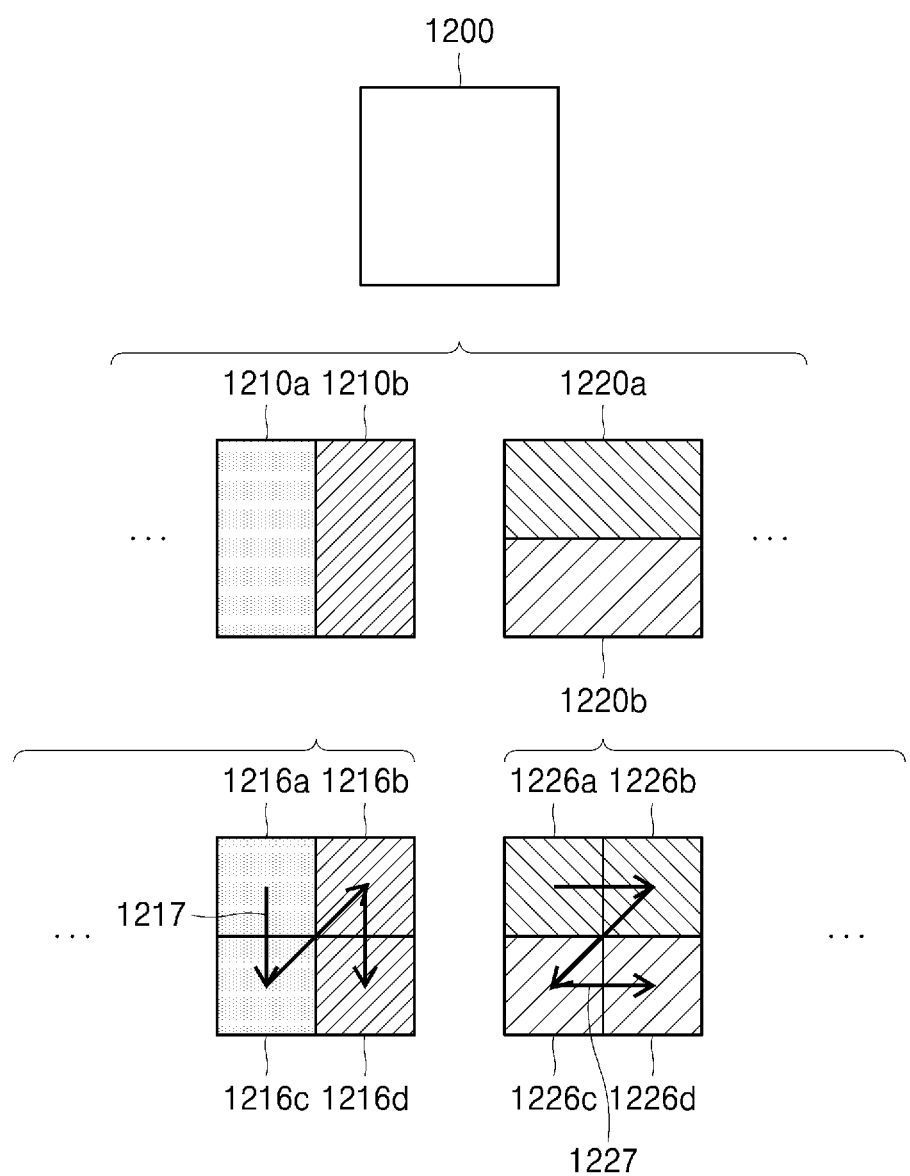
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape indicates a square shape and the split shape mode information indicates to split the first coding unit 1200 in at least one of horizontal and vertical directions, the image decoding apparatus 100 may determine second coding units 1210a and 1210b, or 1220a and 1220b, etc. by splitting the first coding unit 1200. Referring to FIG. 12, the non-square second coding units 1210a and 1210b, or 1220a and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a vertical direction. An operation of splitting the second coding units 1210a and 1210b, or 1220a and 1220b has been described above in relation to FIG. 11, and thus detailed descriptions thereof will not be provided herein.

According to an embodiment, the image decoding apparatus 100 may process coding units in a preset order. An operation of processing coding units in a preset order has been described above in relation to FIG. 7, and thus detailed descriptions thereof will not be provided herein. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a split shape by which the first coding unit 1200 is split.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a and 1210b, and 1220a and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split such that a plurality of coding units are determined, according to an embodiment.

According to an embodiment, the image decoding apparatus 100 may determine the depth of the coding unit, based on a preset criterion. For example, the preset criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following descriptions, a coding unit having an increased depth is expressed as a coding unit of a lower depth.

Referring to FIG. 13, according to an embodiment, the image decoding apparatus 100 may determine a second coding unit 1302 and a third coding unit 1304 of lower depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by splitting a width and height of the first coding unit 1300 in ½ may have a size of N×N. Furthermore, the third coding unit 1304 determined by splitting a width and height of the second coding unit 1302 in ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322 and a third coding unit 1314 or 1324 of lower depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine a second coding unit 1302, 1312, or 1322 by splitting at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by splitting at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine a third coding unit 1304, 1314, or 1324 by splitting at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by splitting at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by splitting at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
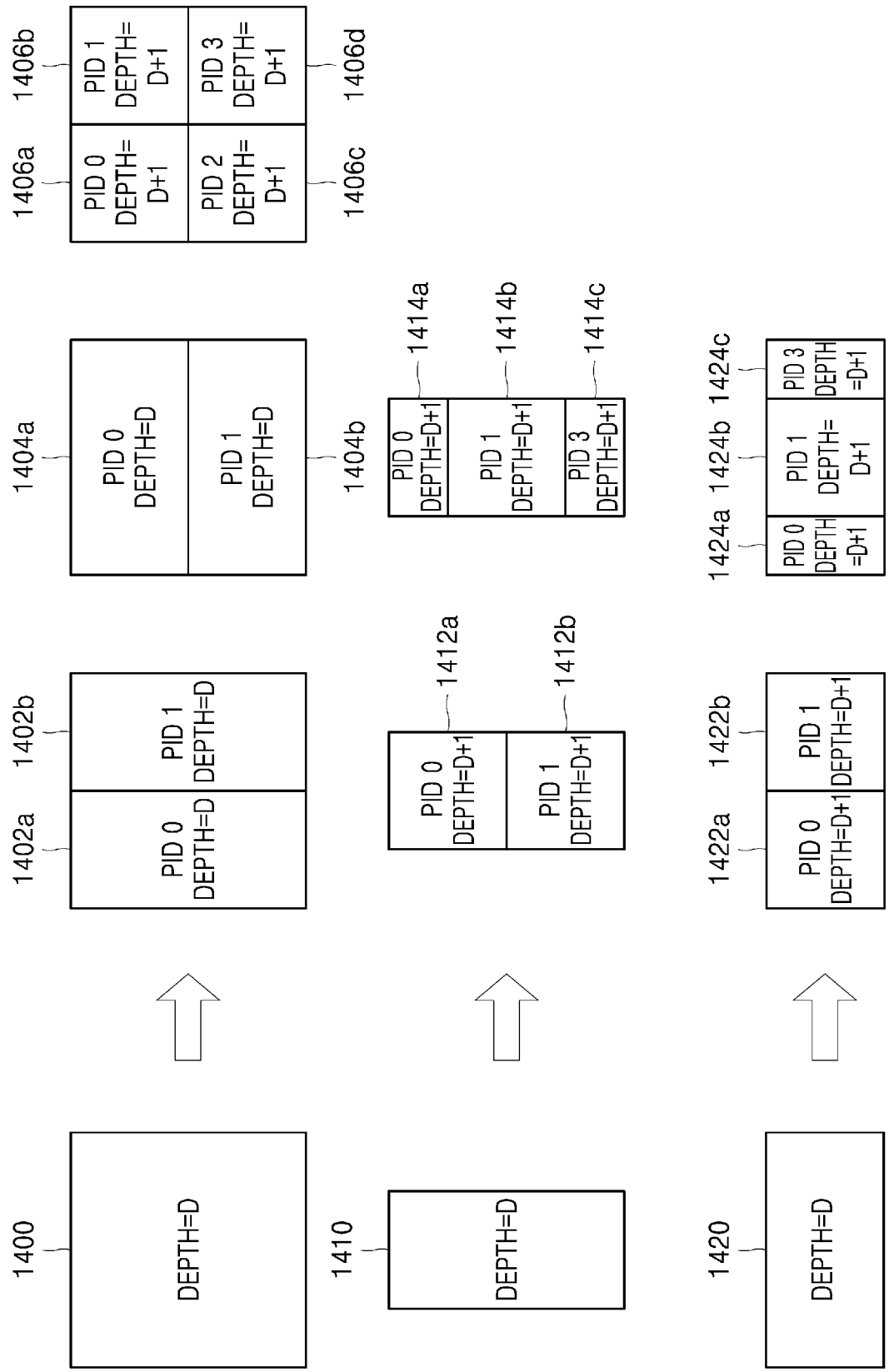
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shape second coding units by splitting a square first coding unit 1400. Referring to FIG. 14, the image decoding apparatus 100 may determine second coding units 1402*a* and 1402*b*, 1404*a* and 1404*b*, and 1406*a*, 1406*b*, 1406*c*, and 1406*d* by splitting the first coding unit 1400 in at least one of vertical and horizontal directions based on split shape mode information. That is, the image decoding apparatus 100 may determine the second coding units 1402*a* and 1402*b*, 1404*a* and 1404*b*, and 1406*a*, 1406*b*, 1406*c*, and 1406*d*, based on the split shape mode information of the first coding unit 1400.

According to an embodiment, depths of the second coding units 1402*a* and 1402*b*, 1404*a* and 1404*b*, and 1406*a*, 1406*b*, 1406*c*, and 1406*d* that are determined based on the split shape mode information of the square first coding unit 1400 may be determined based on the length of a long side thereof. For example, because the length of a side of the square first coding unit 1400 equals the length of a long side of the non-square second coding units 1402*a* and 1402*b*, and 1404*a* and 1404*b*, the first coding unit 1400 and the non-square second coding units 1402*a* and 1402*b*, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding apparatus 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an embodiment, the image decoding apparatus 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an embodiment, a depth of the second coding units 1412*a* and 1412*b*, and 1414*a*, 1414*b*, and 1414*c*, or 1422*a* and 1422*b*, and 1424*a*, 1424*b*, and 1424*c*, which are determined based on the split shape mode information of the non-square first coding unit 1410 or 1420, may be determined based on the length of a long side thereof. For example, because the length of a side of the square second coding units 1412*a* and 1412*b* is ½ times the length of a long side of the first coding unit 1410 having a non-square shape, a height of which is longer than a width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, a coding unit 1414b of a center location among an odd number of split coding units 1414a, 1414b, and 1414c may have a width equal to that of the other coding units 1414a and 1414c and a height which is two times that of the other coding units 1414a and 1414c. That is, in this case, the coding unit 1414b at the center location may include two of the other coding unit 1414a or 1414c. Therefore, when a PID of the coding unit 1414b at the center location is 1 based on a scan order, a PID of the coding unit 1414c located next to the coding unit 1414b may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412a and 1412b or an odd number of coding units 1414a, 1414b, and 1414c by splitting the first coding unit 1410 having a rectangular shape, a height of which is longer than a width. The image decoding apparatus 100 may use PIDs indicating respective coding units so as to identify the respective coding units. According to an embodiment, the PID may be obtained from a sample at a preset location of each coding unit (e.g., an upper-left sample).

According to an embodiment, the image decoding apparatus 100 may determine a coding unit at a preset location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414a, 1414b, and 1414c. The image decoding apparatus 100 may assign a PID to each of the three coding units 1414a, 1414b, and 1414c. The image decoding apparatus 100 may compare PIDs of an odd number of split coding units to determine a coding unit at a center location from among the coding units. The image decoding apparatus 100 may determine the coding unit 1414b having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414b generated by splitting the first coding unit 1410 may have a width equal to that of the other coding units 1414a and 1414c and a height which is two times that of the other coding units 1414a and 1414c. In this case, when the PID of the coding unit 1414b at the center location is 1, the PID of the coding unit 1414c located next to the coding unit 1414b may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a preset location among an odd number of coding units (e.g., a coding unit of a center location) has a size different from that of the other coding units. In this case, the image decoding apparatus 100 may determine the coding unit of the center location, which has a different size, by using PIDs of the coding units. However, the PIDs and the size or location of the coding unit of the preset location are not limited to the above-described examples, and various PIDs and various locations and sizes of coding units may be used.

According to an embodiment, the image decoding apparatus 100 may use a preset data unit where a coding unit starts to be recursively split.

Figure 15:
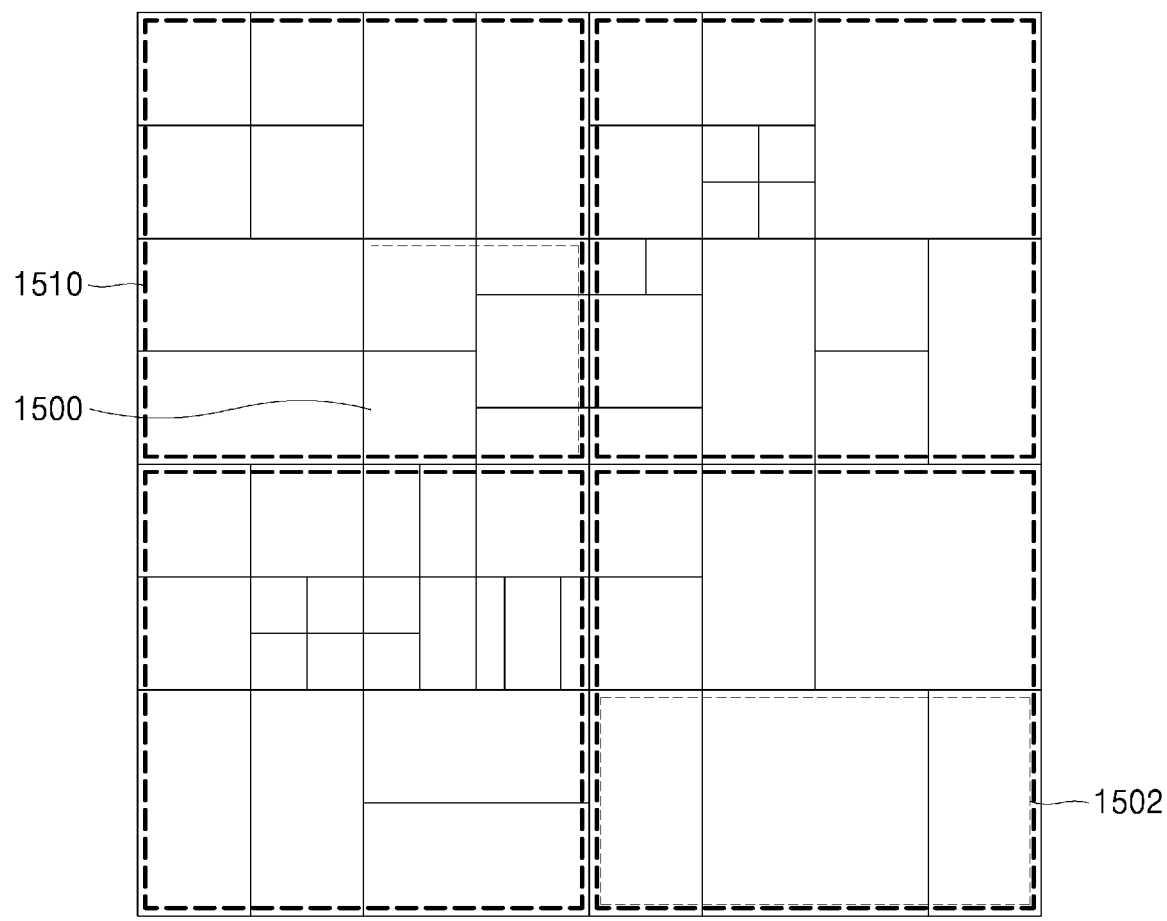
FIG. 15 illustrates that a plurality of coding units are determined based on a plurality of preset data units included in a picture, according to an embodiment.

FIG. 15 illustrates that a plurality of coding units are determined based on a plurality of preset data units included in a picture, according to an embodiment.

According to an embodiment, a preset data unit may be defined as a data unit where a coding unit starts to be recursively split by using split shape mode information. That is, the preset data unit may correspond to a coding unit of an uppermost depth, which is used to determine a plurality of coding units split from a current picture. In the following descriptions, for convenience of explanation, the preset data unit is referred to as a reference data unit.

According to an embodiment, the reference data unit may have a preset size and a preset shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using the split shape mode information of each reference data unit. The operation of splitting the reference data unit may correspond to a splitting operation using a quadtree structure.

According to an embodiment, the image decoding apparatus 100 may predetermine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1510 or 1500 or a non-square reference coding unit 1502. According to an embodiment, the shape and size of reference coding units may be determined based on various data units capable of including one or more reference coding units (e.g., sequences, pictures, slices, slice segments, tiles, tile groups, largest coding units, or the like).

According to an embodiment, the bitstream obtainer 110 of the image decoding apparatus 100 may obtain, from a bitstream, at least one of reference coding unit shape information and reference coding unit size information with respect to each of the various data units. An operation of splitting the square reference coding unit 1500 into one or more coding units has been described above in relation to the operation of splitting the current coding unit 300 of FIG. 3, and an operation of splitting the non-square reference coding unit 1502 into one or more coding units has been described above in relation to the operation of splitting the current coding unit 400 or 450 of FIG. 4. Thus, detailed descriptions thereof will not be provided herein.

According to an embodiment, the image decoding apparatus 100 may use a PID for identifying the size and shape of reference coding units, to determine the size and shape of reference coding units according to some data units predetermined based on a preset condition. That is, the bitstream obtainer 110 may obtain, from the bitstream, only the PID for identifying the size and shape of reference coding units with respect to each slice, slice segment, tile, tile group, or largest coding unit which is a data unit satisfying a preset condition (e.g., a data unit having a size equal to or smaller than a slice) among the various data units (e.g., sequences, pictures, slices, slice segments, tiles, tile groups, largest coding units, or the like). The image decoding apparatus 100 may determine the size and shape of reference data units with respect to each data unit, which satisfies the preset condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be predetermined. That is, the image decoding apparatus 100 may determine at least one of the size and shape of reference coding units included in a data unit serving as a unit for obtaining the PID, by selecting the predetermined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, a slice segment header, a tile header, or a tile group header. Further, the image decoding apparatus 100 may obtain a syntax element corresponding to block shape information or split shape mode information from a bitstream for each largest coding unit or each reference coding unit, and use the syntax element.

Hereinafter, a method of determining a split rule, according to an embodiment of the disclosure will be described in detail.

The image decoding apparatus 100 may determine a split rule of an image. The split rule may be predetermined between the image decoding apparatus 100 and the image encoding apparatus 200. The image decoding apparatus 100 may determine the split rule of the image, based on information obtained from a bitstream. The image decoding apparatus 100 may determine the split rule based on the information obtained from at least one of a sequence parameter set, a picture parameter set, a video parameter set, a slice header, a slice segment header, a tile header, and a tile group header. The image decoding apparatus 100 may determine the split rule differently according to frames, slices, tiles, temporal layers, largest coding units, or coding units.

The image decoding apparatus 100 may determine the split rule based on a block shape of a coding unit. The block shape may include a size, shape, a ratio of width and height, and a direction of the coding unit. The image encoding apparatus 200 and the image decoding apparatus 100 may predetermine to determine the split rule based on the block shape of the coding unit. However, the embodiment is not limited thereto. The image decoding apparatus 100 may determine the split rule based on the information obtained from the bitstream received from the image encoding apparatus 200.

The shape of the coding unit may include a square and a non-square. When the lengths of the width and height of the coding unit are the same, the image decoding apparatus 100 may determine the shape of the coding unit to be a square. Also, when the lengths of the width and height of the coding unit are not the same, the image decoding apparatus 100 may determine the shape of the coding unit to be a non-square.

The size of the coding unit may include various sizes, such as 4×4, 8×4, 4×8, 8×8, 16×4, 16×8, and to 256×256. The size of the coding unit may be classified based on the length of a long side of the coding unit, the length of a short side, or the area. The image decoding apparatus 100 may apply the same split rule to coding units classified as the same group. For example, the image decoding apparatus 100 may classify coding units having the same lengths of the long sides as having the same size. Also, the image decoding apparatus 100 may apply the same split rule to coding units having the same lengths of long sides.

The ratio of the width and height of the coding unit may include 1:2, 2:1, 1:4, 4:1, 1:8, 8:1, 1:16, 16:1, 32:1, 1:32, or the like. Also, a direction of the coding unit may include a horizontal direction and a vertical direction. The horizontal direction may indicate a case in which the length of the width of the coding unit is longer than the length of the height thereof. The vertical direction may indicate a case in which the length of the width of the coding unit is shorter than the length of the height thereof.

The image decoding apparatus 100 may adaptively determine the split rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

The split rule determined based on the size of the coding unit may be a split rule predetermined between the image encoding apparatus 200 and the image decoding apparatus 100. Also, the image decoding apparatus 100 may determine the split rule based on the information obtained from the bitstream.

The image decoding apparatus 100 may adaptively determine the split rule based on a location of the coding unit. The image decoding apparatus 100 may adaptively determine the split rule based on the location of the coding unit in the image.

Also, the image decoding apparatus 100 may determine the split rule such that coding units generated via different splitting paths do not have the same block shape. However, an embodiment is not limited thereto, and the coding units generated via different splitting paths have the same block shape. The coding units generated via the different splitting paths may have different decoding processing orders. Because the decoding processing orders is described above with reference to FIG. 12, details thereof are not provided again.

Figure 16:
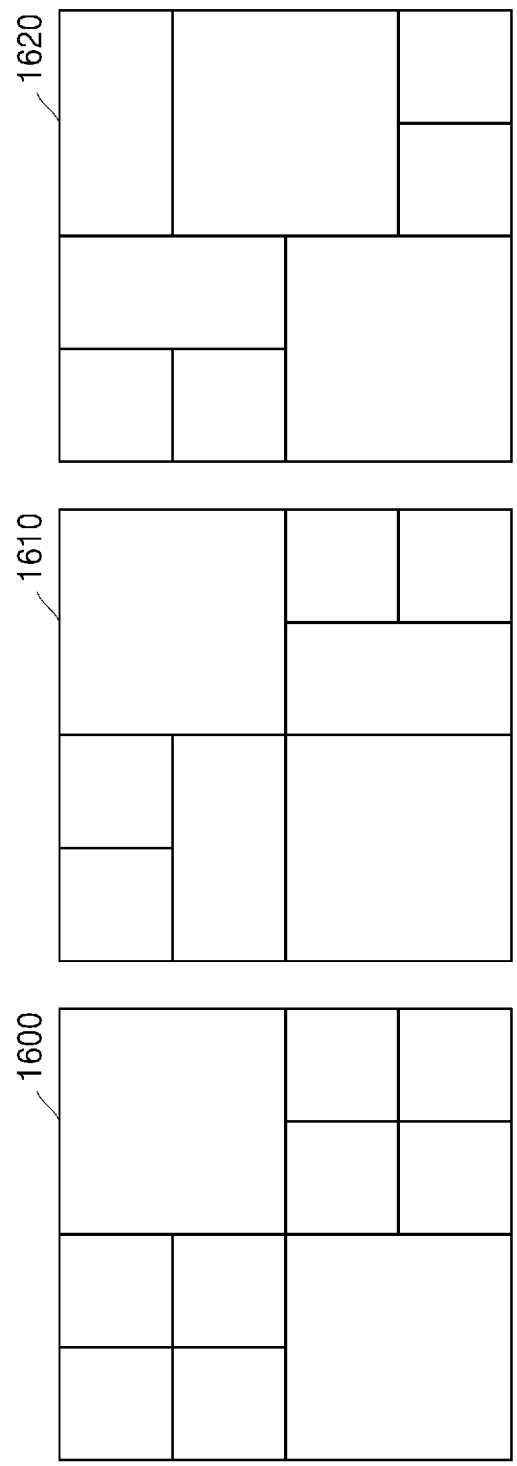
FIG. 16 illustrates coding units which may be determined for individual pictures, when the pictures have different combinations of shapes into which the coding units are splittable, according to an embodiment.

FIG. 16 illustrates coding units of individual pictures, when the individual pictures have different split shape combinations of coding units, according to an embodiment.

Referring to FIG. 16, the image decoding apparatus 100 may determine different split shape combinations of coding units for individual pictures. For example, the image decoding apparatus 100 may decode an image by using a picture 1600 that can be split into four coding units, a picture 1610 that can be split into two or four coding units, and a picture 1620 that can be split into two, three, or four coding units, among at least one picture included in the image. The image decoding apparatus 100 may use only split shape information indicating splitting into four square coding units, in order to split the picture 1600 into a plurality of coding units. The image decoding apparatus 100 may use only split shape information indicating splitting into two or four coding units, in order to split the picture 1610. The image decoding apparatus 100 may use only split shape information indicating splitting into two, three, or four coding units, in order to split the picture 1620. The above-described split shape combinations are embodiments for describing operations of the image decoding apparatus 100, and therefore, the above-described split shape combinations should not be interpreted to be limited to the above-described embodiments. It should be interpreted that various split shape combinations can be used for each preset data unit.

According to an embodiment, the bitstream obtainer 110 of the image decoding apparatus 100 may obtain a bitstream including an index representing a combination of split shape information for each preset data unit (for example, a sequence, a picture, a slice, a slice segment, a tile, a tile group, etc.). For example, the bitstream obtainer 110 may obtain an index representing a combination of split shape information from a sequence parameter set, a picture parameter set, a slice header, a tile header, or a tile group header. The bitstream obtainer 110 of the image decoding apparatus 100 may use the obtained index to determine a split shape combination into which coding units can be split for each preset data unit, and accordingly, the bitstream obtainer 110 may use different split shape combinations for individual preset data units.

FIG. 17 illustrates various shapes of coding units that can be determined based on split shape mode information that can be expressed with a binary code, according to an embodiment.

According to an embodiment, the image decoding apparatus 100 may split coding units into various shapes by using block shape information and split shape mode information obtained through the bitstream obtainer 110. Shapes into which coding units can be split may be various shapes including shapes described above through the embodiments.

Referring to FIG. 17, the image decoding apparatus 100 may split a coding unit having a square shape in at least one direction of a horizontal direction and a vertical direction, and a coding unit having a non-square shape in the horizontal direction or the vertical direction, based on split shape mode information.

According to an embodiment, when the image decoding apparatus 100 can split a coding unit having a square shape in the horizontal direction and the vertical direction to determine four square coding units, split shape mode information for a square coding unit may represent four split shapes. According to an embodiment, the split shape mode information may be expressed with a binary code of 2 digits, and each split shape may be assigned a binary code. For example, when a coding unit is not split, split shape mode information may be expressed as (00)b, when a coding unit is split in the horizontal direction and the vertical direction, split shape mode information may be expressed as (01)b, when a coding unit is split in the horizontal direction, split shape mode information may be expressed as (10)b, and when a coding unit is split in the vertical direction, split shape mode information may be expressed as (11)b.

According to an embodiment, when the image decoding apparatus 100 splits a coding unit having a non-square shape in the horizontal direction or the vertical direction, kinds of split shapes that can be represented by split shape mode information may depend on the number of coding units into which the coding unit is to be split. Referring to FIG. 17, the image decoding apparatus 100 may split a coding unit having a non-square shape up to three, according to an embodiment. Also, the image decoding apparatus 100 may split a coding unit into two coding units. In this case, split shape mode information may be expressed as (10)b. The image decoding apparatus 100 may split a coding unit into three coding units. In this case, split shape mode information may be expressed as (11)b. The image decoding apparatus 100 may determine not to split a coding unit. In this case, split shape mode information may be expressed as (0)b. That is, the image decoding apparatus 100 may use Variable Length Coding (VLC), instead of Fixed Length Coding (FLC), in order to use a binary code representing split shape mode information.

According to an embodiment, referring to FIG. 17, a binary code of split shape mode information representing that a coding unit is not split may be expressed as (0)b. In the case in which a binary code of split shape mode information representing that a coding unit is not split is set to (00)b, a binary code of split shape mode information of 2 bits may need to be all used although there is no split shape mode information set to (01)b. However, in the case in which three split shapes are used for a coding unit having a non-square shape, as shown in FIG. 17, the image decoding apparatus 100 can determine that a coding unit is not split by using a binary code (0)b of 1 bit as split shape mode information, thereby efficiently using a bitstream. However, split shapes of a coding unit having a non-square shape, which are represented by split shape mode information, should be not interpreted to be limited to three shapes shown in FIG. 17, and should be interpreted to be various shapes including the above-described embodiments.

Figure 18:
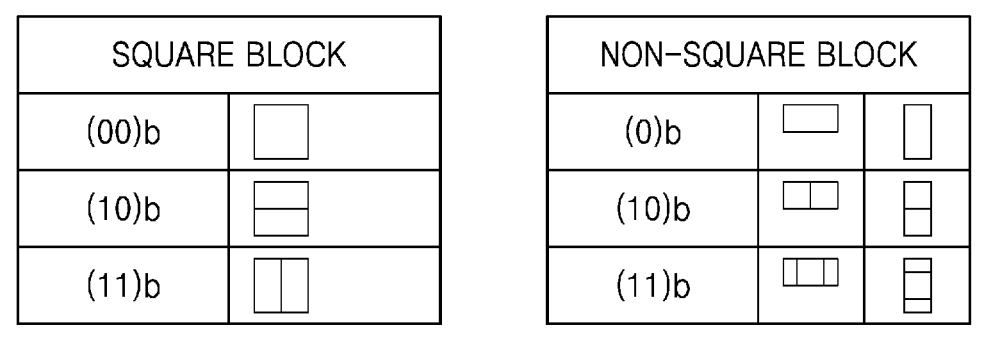

FIG. 18 illustrates other shapes of coding units that can be determined based on split shape mode information that can be represented with a binary code, according to an embodiment.

Referring to FIG. 18, the image decoding apparatus 100 may split a coding unit having a square shape in the horizontal direction or the vertical direction, and a coding unit having a non-square shape in the horizontal direction or the vertical direction, based on split shape mode information. That is, the split shape mode information may indicate splitting a coding unit having a square shape in one direction. In this case, a binary code of split shape mode information representing that a coding unit having a square shape is not split may be expressed as (0)b. In the case in which a binary code of split shape mode information representing that a coding unit is not split is set to (00)b, a binary code of split shape mode information of 2 bits may need to be all used although there is no split shape mode information set to (01)b. However, in the case in which three split shapes are used for a coding unit having a square shape, as shown in FIG. 18, the image decoding apparatus 100 can determine that a coding unit is not split by using a binary code (0)b of 1 bit as split shape mode information, thereby efficiently using a bitstream. However, split shapes of a coding unit having a square shape, which are represented by split shape mode information, should be not interpreted to be limited to three shapes shown in FIG. 18, and should be interpreted to be various shapes including the above-described embodiments.

According to an embodiment, block shape information or split shape mode information may be expressed by using a binary code, and the block shape information or split shape mode information may be generated directly as a bitstream. Also, block shape information or split shape mode information that can be expressed with a binary code may be used as an input binary code in context adaptive binary arithmetic coding (CABAC), instead of being generated directly as a bitstream.

A process in which the image decoding apparatus 100 obtains a syntax for block shape information or split shape mode information through CABAC, according to an embodiment, will be described. The image decoding apparatus 100 may obtain a bitstream including a binary code for the syntax through the bitstream obtainer 110. The image decoding apparatus 100 may de-binarize a bin string included in the obtained bitstream to detect a syntax element representing block shape information or split shape mode information. According to an embodiment, the image decoding apparatus 100 may obtain a group of binary bin strings corresponding to a syntax element to be decoded, and decode the individual bins by using probability information. The image decoding apparatus 100 may repeat the operation until a bin string configured with the decoded bins is identical to one of previously obtained bin strings. The image decoding apparatus 100 may perform de-binarization on the bin string to determine a syntax element.

According to an embodiment, the image decoding apparatus 100 may perform a decoding process of adaptive binary arithmetic coding to determine a syntax for the bin string, and the image decoding apparatus 100 may update a probability model for the bins obtained through the bitstream obtainer 110. Referring to FIG. 17, the bitstream obtainer 110 of the image decoding apparatus 100 may obtain a bitstream that represents a binary code representing split shape mode information, according to an embodiment. The image decoding apparatus 100 may determine a syntax for the split shape mode information by using the obtained binary code having a size of 1 or 2 bits. The image decoding apparatus 100 may update a probability for each bit of the binary code of 2 bits, in order to determine the syntax for the split shape mode information. That is, the image decoding apparatus 100 may update, according to which one of 0 or 1 a value of a first bin of the binary code of 2 bits is, a probability that the next bin will have a value of 0 or 1 upon decoding.

According to an embodiment, in the process of determining the syntax, the image decoding apparatus 100 may update probabilities for the bins that are used in a process of decoding the bins of the bin string for the syntax, and the image decoding apparatus 100 may determine that a specific bit of the bin string has the same probability, without updating a probability of the specific bit.

Referring to FIG. 17, in a process of determining a syntax by using a bin string representing split shape mode information for a coding unit having a non-square shape, the image decoding apparatus 100 may determine a syntax for the split shape mode information by using a bin having a value of 0 in the case in which the coding unit having the non-square shape is not split. That is, when block shape information represents that a current coding unit has a non-square shape, a first bin of the bin string for the split shape mode information may be 0 in the case in which the coding unit having the non-square shape is not split, and may be 1 in the case in which the coding unit is split into two or three coding units. Accordingly, a probability that the first bin of the bin string of the split shape mode information for the coding unit having the non-square shape will be 0 may be ⅓, and a probability that the first bin will be 1 may be ⅔. Because split shape mode information representing that a coding unit having a non-square shape is not split can be expressed with a bin string of 1 bit having a value of 0, as described above, the image decoding apparatus 100 may determine, only in the case in which the first bin of the split shape mode information is 1, whether a second bin is 0 or 1 to determine the syntax for the split shape mode information. According to an embodiment, when the first bin for the split shape mode information is 1, the image decoding apparatus 100 may determine that a probability that the second bin will be 0 is equal to a probability that the second bin will be 1, and decode the second bin.

Accordingly, the image decoding apparatus 100 may use, in the process of determining the bins of the bin string for the split shape mode information, various probabilities for the individual bins. According to an embodiment, the image decoding apparatus 100 may determine different probabilities of bins for split shape mode information according to an extension direction of a non-square block. According to an embodiment, the image decoding apparatus 100 may determine different probabilities of bins for split shape mode information according to a width of a current coding unit or a length of a longer side of the current coding unit. According to an embodiment, the image decoding apparatus 100 may determine different probabilities of bins for split shape mode information according to at least one of a shape of a current coding unit and a length of a longer side of the current coding unit.

According to an embodiment, the image decoding apparatus 100 may determine that probabilities of bins for split shape mode information are the same with respect to coding units that are equal to or larger than a preset size. For example, the image decoding apparatus 100 may determine that probabilities of bins for split shape mode information are the same with respect to coding units of which lengths of longer sides are equal to or greater than 64 samples.

The image decoding apparatus 100 according to an embodiment may determine initial probability for bins constructing a bin string of split shape mode information based on a slice type (for example, an I slice, a P slice, or a B slice).

Figure 19:
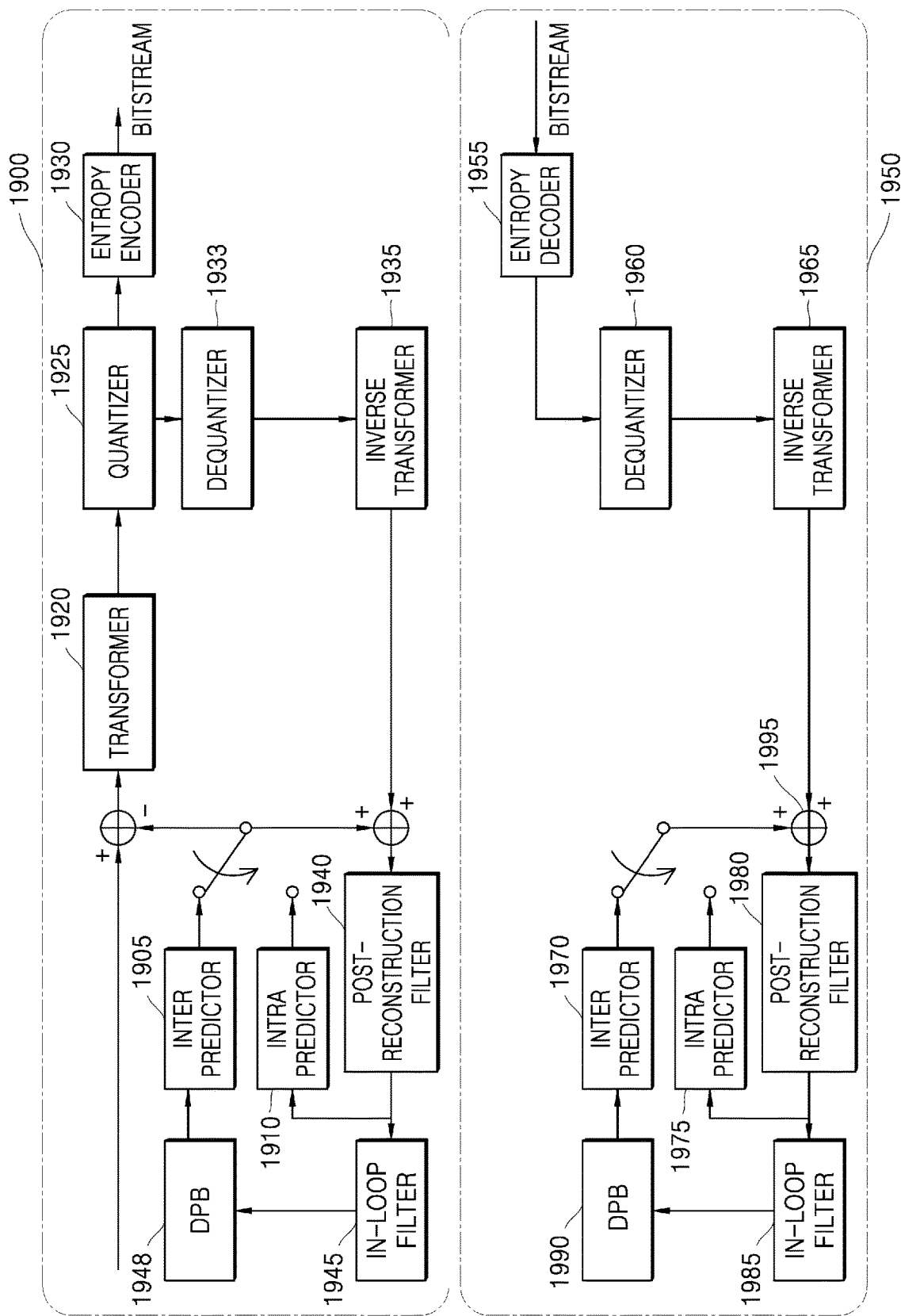
FIG. 19 is a block diagram of an image encoding and decoding system.

FIG. 19 is a block diagram of an image encoding and decoding system.

An encoder 1900 of an image encoding and decoding system may transmit an encoded bitstream of an image, and a decoder 1950 may receive the bitstream, decode the bitstream, and output a reconstructed image. The decoder 1950 may have a configuration that is similar to the image decoding apparatus 100.

In the encoder 1900, an inter predictor 1905 may generate, when a prediction mode of a current block is an inter prediction mode, motion information of the current block, the motion information indicating a reference block of a reference picture being temporally adjacent to a current picture. The inter predictor 1905 may determine prediction samples of the current block by using samples of reference blocks. An intra predictor 1910 may determine intra prediction information representing directions in which neighboring samples being similar to the current block are located and a method of determining prediction samples, to determine prediction samples of the current block by using neighboring samples being spatially adjacent to the current block.

The inter predictor 1905 may determine reference samples that are used for predicting the current block, from among samples stored in a Decoded Picture Buffer (DPB) 1948 and reconstructed in advance.

A transformer 1920 may perform transformation on residual sample values obtained by subtracting the prediction samples generated by the inter predictor 1905 or the intra predictor 1910 from original samples of the current block, and output transform coefficients. A quantizer 1925 may quantize the transform coefficients output from the transformer 1920, and output the quantized transform coefficients. An entropy encoder 1930 may encode the quantized transform coefficients to residual syntax elements including level values, and output the residual syntax elements in a form of a bitstream.

The quantized transform coefficients output from the quantizer 1925 may be subjected to dequantization and inverse-transformation through a dequantizer 1933 and an inverse transformer 1935 so that the residual sample values may be again generated.

An adder 1915 may add the residual sample values with the prediction sample values to output reconstructed sample values. A post-reconstruction filter 1940 may perform post-reconstruction filtering on the reconstructed sample values, and the reconstructed sample values updated through the post-reconstruction filtering may be used as reference sample values for intra prediction that is to be performed by the intra predictor 1910. The post-reconstruction filter 1940 may perform Hadamard transform domain filtering or bilateral filtering on the reconstructed sample values.

An in-loop filter 1945 may perform at least one of deblocking filtering and adaptive loop filtering on the reconstructed sample values updated through the post-reconstruction filtering. The reconstructed sample values updated through filtering by the in-loop filter 1945 may be stored in the DPB 1948, and may be used as reference sample values for inter prediction that is to be performed by the inter predictor 1905.

An entropy decoder 1955 of the decoder 1950 may perform entropy decoding on a received bitstream to parse residual syntax elements including level values. Quantized transform coefficients may be reconstructed from the residual syntax elements. A dequantizer 1960 may perform dequantization on the quantized transform coefficients to output transform coefficients, and an inverse transformer 1965 may perform inverse transformation on the transform coefficients to output residual sample values.

An inter predictor 1970 of the decoder 1950 may determine a reference picture being temporally adjacent to a current picture by using motion information of a current block parsed by the entropy decoder 1955, and determine reference blocks in the reference picture. The inter predictor 1970 may determine prediction samples of the current block by using samples of the reference blocks. An intra predictor 1975 of the decoder 1950 may determine reference samples being spatially adjacent to the current block by using intra prediction information and the motion information of the current block parsed by the entropy decoder 1955, and determine prediction samples of the current block by using the neighboring reference samples.

The inter predictor 1970 may determine reference samples that are to be used for predicting the current block, from among samples stored in a DPB 1990 and reconstructed in advance.

An adder 1995 of the decoder 1950 may add the residual sample values with the prediction sample values to output reconstructed sample values of the current block. A post-reconstruction filtering portion 1980 of the decoder 1950 may perform Hadamard transform domain filtering or bilateral filtering on the reconstructed sample values. The reconstructed sample values updated through the filtering of the post-reconstruction filtering portion 1980 may be used as reference sample values for intra prediction that is to be performed by the intra predictor 1975.

An in-loop filter 1985 of the decoder 1950 may perform at least one of deblocking filtering and adaptive loop filtering on the reconstructed sample values updated through the post-reconstruction filtering. The reconstructed sample values updated through the filtering by the in-loop filter 1985 may be stored in the DPB 1990, and used as reference sample values for inter prediction that is to be performed by the inter predictor 1970.

Various embodiments described above describe operations related to an image decoding method that is performed by the image decoding apparatus 100. Hereinafter, operations of the image encoding apparatus 200 that performs an image encoding method corresponding to a reverse order of the image decoding method will be described through various embodiments.

Figure 2:
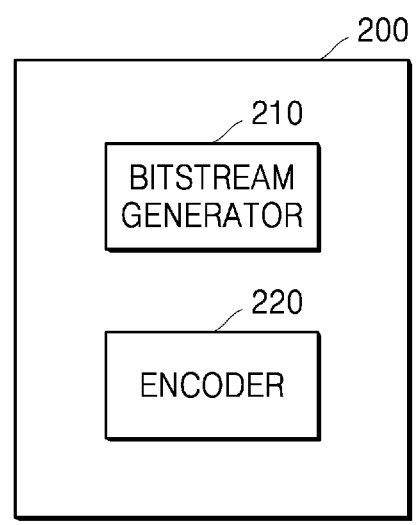
FIG. 2 is a block diagram of an image encoding apparatus according to an embodiment.

FIG. 2 is a block diagram of the image encoding apparatus 200 capable of encoding an image based on at least one of block shape information and split shape mode information, according to an embodiment.

The image encoding apparatus 200 may include an encoder 220 and a bitstream generator 210. The encoder 220 may receive an input image and encode the input image. The encoder 220 may encode the input image to obtain at least one syntax element. The syntax element may include at least one of a skip flag, a prediction mode, a motion vector difference, a motion vector prediction method (or index), a transform quantized coefficient, a coded block pattern, a coded block flag, an intra prediction mode, a direct flag, a merge flag, a delta QP, a reference index, a prediction direction, and a transform index. The encoder 220 may determine a context model based on block shape information including at least one of a shape, a direction, a ratio of a height and a width, or a size of a coding unit.

The bitstream generator 210 may generate a bitstream based on an encoded input image. For example, the bitstream generator 210 may generate a bitstream by performing entropy encoding on a syntax element based on a context model. Also, the image encoding apparatus 200 may transmit the bitstream to the image decoding apparatus 100.

According to an embodiment, the encoder 220 of the image encoding apparatus 200 may determine a shape of a coding unit. For example, a coding unit may have a square shape or a non-square shape, and information representing such a shape may be included in block shape information.

According to an embodiment, the encoder 220 may determine a shape into which a coding unit is to be split. The encoder 220 may determine a shape of at least one coding unit included in a coding unit, and the bitstream generator 210 may generate a bitstream including split shape mode information including information about the shape of the coding unit.

According to an embodiment, the encoder 220 may determine whether or not to split a coding unit. When the encoder 220 determines that a coding unit includes only one coding unit or that a coding unit is not split, the bitstream generator 210 may generate a bitstream including split shape mode information representing that the coding unit is not split. Also, the encoder 220 may split a coding unit into a plurality of coding units included in the coding unit, and the bitstream generator 210 may generate a bitstream including split shape mode information representing that a coding unit is to be split into a plurality of coding units.

According to an embodiment, information representing the number of coding units into which a coding unit is split or a direction in which the coding unit is split may be included in the split shape mode information. For example, the split shape mode information may represent splitting in at least one direction of a vertical direction and a horizontal direction or may represent non-splitting.

The image encoding apparatus 200 may determine split shape mode information based on a split shape mode of a coding unit. The image encoding apparatus 200 may determine a context model based on at least one of a shape, a direction, a ratio of a width and a height, or a size of the coding unit. Also, the image encoding apparatus 200 may generate information about a split shape mode for splitting the coding unit as a bitstream based on the context model.

To determine the context model, the image encoding apparatus 200 may obtain an arrangement for corresponding at least one of a shape, a direction, a ratio of a width and a height, or a size of the coding unit to an index for the context model. The image encoding apparatus 200 may obtain the index for the context model based on at least one of the shape, the direction, the ratio of the width and the height, or the size of the coding unit, from the arrangement. The image encoding apparatus 200 may determine the context model based on the index for the context model.

To determine the context model, the image encoding apparatus 200 may determine the context model further based on block shape information including at least one of a shape, a direction, a ratio of a width and a height, or a size of a surrounding coding unit being adjacent to the coding unit. Also, the surrounding coding unit may include at least one of coding units located to the left-lower side, left side, left-upper side, upper side, right-upper side, right side, or right-lower side of the coding unit.

Also, to determine the context model, the image encoding apparatus 200 may compare a length of a width of the upper surrounding coding unit with a length of the width of the coding unit. Also, the image encoding apparatus 200 may compare lengths of heights of the left and right surrounding coding units with a length of the height of the coding unit. Also, the image encoding apparatus 200 may determine the context model based on results of the comparisons.

Operations of the image encoding apparatus 200 include content that is similar to those of the image decoding apparatus 100 described above with reference to FIGS. 3 to 19, and therefore, detailed descriptions thereof will be omitted.

Figure 20:
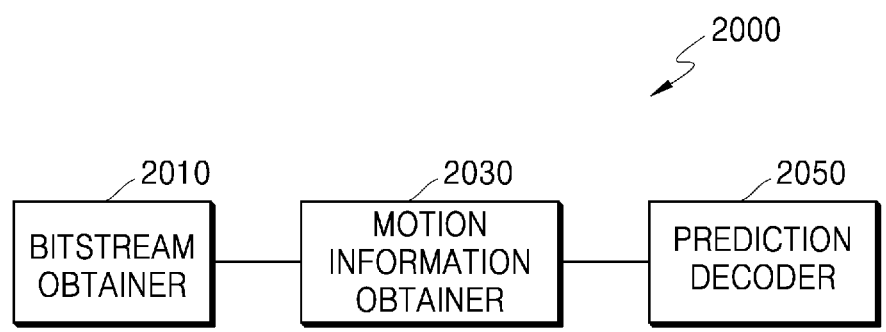
FIG. 20 is a block diagram illustrating a configuration of an image decoding apparatus according to an embodiment.

FIG. 20 is a block diagram illustrating a configuration of an image decoding apparatus 2000 according to an embodiment.

Referring to FIG. 20, the image decoding apparatus 2000 may include a bitstream obtainer 2010, a motion information obtainer 2030, and a prediction decoder 2050.

The bitstream obtainer 2010 illustrated in FIG. 20 may correspond to the bitstream obtainer 110 illustrated in FIG. 1, and the motion information obtainer 2030 and the prediction decoder 2050 may correspond to the decoder 120 illustrated in FIG. 1.

The bitstream obtainer 2010, the motion information obtainer 2030, and the prediction decoder 2050, according to an embodiment, may be implemented as at least one processor. The image decoding apparatus 2000 may include at least one memory (not shown) storing input/output data of the bitstream obtainer 2010, the motion information obtainer 2030, and the prediction decoder 2050. Also, the image decoding apparatus 2000 may include a memory controller (not shown) that controls data input/outputs to/from the memory (not shown).

The bitstream obtainer 2010 may obtain a bitstream generated as a result of encoding of an image. The bitstream obtainer 2010 may obtain syntax elements for decoding the image from the bitstream. Binary values corresponding to the syntax elements may be included in the bitstream according to a hierarchical structure of the image. The bitstream obtainer 2010 may obtain the syntax elements by performing entropy decoding on the binary values included in the bitstream.

The bitstream may include information about a prediction mode of a current block in a current picture. The current block may mean a block of a largest coding unit, a coding unit, or a transform unit, split from the current picture that is to be decoded.

The prediction mode of the current block may include an intra prediction mode or an inter prediction mode. As described above, the inter prediction mode may be a mode for reconstructing a current block from a reference block in a reference picture indicated by motion information of the current block.

The motion information may include a prediction direction, a reference picture index, and a motion vector.

The prediction direction may be any one of a list 0 direction, a list 1 direction, or a bi-direction. That a prediction direction is a list 0 direction means that a picture included in a reference picture list 0 is used as a reference picture of a list 0 direction, and that a prediction direction is a list 1 direction means that a picture included in a reference picture list 1 is used as a reference picture of a list 1 direction. Also, that a prediction direction is a bi direction means that a picture included in the reference picture list 0 is used as a reference picture of a list 0 direction and a picture included in the reference picture list 1 is used as a reference picture of a list 1 direction.

The reference picture index may indicate a picture that is used as a reference picture of the current block among pictures included in the reference picture list 0 and/or the reference picture list 1. According to a reference picture index of the list 0 direction, a picture that is used as a reference picture of the list 0 direction may be specified from among pictures included in the reference picture list 0. Also, according to a reference picture index of the list 1 direction, a picture that is used as a reference picture of the list 1 direction may be specified from among pictures included in the reference picture list 1.

The motion vector may specify a location of a reference block in the reference picture. A motion vector of the list 0 direction means a motion vector indicating a reference block in a reference picture of the list 0 direction, and a motion vector of the list 1 direction means a motion vector indicating a reference block in a reference picture of the list 1 direction.

When the prediction direction of the current block is the list 0 direction, motion information of the current block may include at least one of information indicating that the prediction direction of the current block is the list 0 direction, a reference picture index of the list 0 direction, and a motion vector of the list 0 direction. Also, when the prediction direction of the current block is the list 1 direction, motion information of the current block may include at least one of information indicating that the prediction direction of the current block is the list 1 direction, a reference picture index of the list 1 direction, and a motion vector of the list 1 direction. Also, when the prediction direction of the current block is the bi-direction, motion information of the current block may include at least one of information indicating that the prediction direction of the current block is the bi-direction, a reference picture index of the list 0 direction, a reference picture index of the list 1 direction, a motion vector of the list 0 direction, and a motion vector of the list 1 direction.

A merge mode (or a direct mode) which is one of inter prediction modes may use, as motion information of a current block, motion information of a previous block decoded earlier than the current block. By including only information indicating a previous block in a bitstream, instead of including motion information of a current block in the bitstream, a bit rate may be reduced.

Generally, in a candidate list including motion information of neighboring blocks as candidates, the number of the candidates may have been limited in advance, and the motion information of the neighboring blocks may have low similarity to motion information of the current block. Accordingly, although an optimal candidate is selected from the candidate list, motion information of the selected candidate may be different from motion information of the current block. In this case, the quality of a reconstructed block may be inevitably lowered.

According to an embodiment of the disclosure, a candidate list including motion information of neighboring blocks as candidates may be established, the motion information of the neighboring blocks may change according to predefined criterion, and the changed motion information of the neighboring blocks may be used as motion information of the current block. That is, according to the disclosure, instead that motion information included in a candidate list is used as it is, the motion information in the candidate list may change according to predefined criterion such that a difference between a reconstructed block and an original block is minimized.

When a prediction mode of a current block is a mode of deriving motion information of a current block by using motion information of a neighboring block, the bitstream obtainer 2010 may obtain change information indicating whether or not to change motion information of a neighboring block from a bitstream. The change information may represent whether motion information of a neighboring block needs to change, and how to change the motion information of the neighboring block when the motion information of the neighboring block needs to change.

According to an embodiment of the disclosure, when information obtained from an upper level of a current block, for example, a sequence parameter set, a picture parameter set, a video parameter set, a slice header, a slice segment header, a tile header, or a tile group header of a bitstream represents that a change mode is not applied, the bitstream obtainer 2010 may not obtain change information of the current block from the bitstream, and, when the corresponding information represents that the change mode is applicable, the bitstream obtainer 2010 may obtain change information of the current block from the bitstream.

According to an embodiment of the disclosure, when a size of a current block is smaller than or equal to a preset size although information obtained from an upper level of the current block represents that the change mode is applicable, the bitstream obtainer 2010 may not obtain change information from the bitstream. The reason may be because, when a size of a current block is small, obtaining motion information of the current block by changing motion information of a neighboring block may result in a small degree of quality improvement in comparison with complexity. A size of a current block may be calculated by multiplying a width of the current block by a height of the current block or by summing the width of the current block and the height of the current block.

When the change information indicates a change of motion information of a neighboring block, the motion information obtainer 2030 may obtain motion information of the current block by changing the motion information of the neighboring block. In contrast, when the change information indicates an unchange of motion information of a neighboring block, the motion information obtainer 2030 may obtain motion information of the current block without changing the motion information of the neighboring block. Although change information indicates a change, motion information of a neighboring block, more specifically, at least one of a prediction direction, a reference picture, and a motion vector may not change, which will be described below. Also, although change information indicates an unchange, motion information of a neighboring block, more specifically, a motion vector may change according to a differential motion vector obtained from a bitstream.

Before a method of changing motion information of a neighboring block is described, neighboring blocks spatially or temporally related to a current block will be described.

Figure 21:
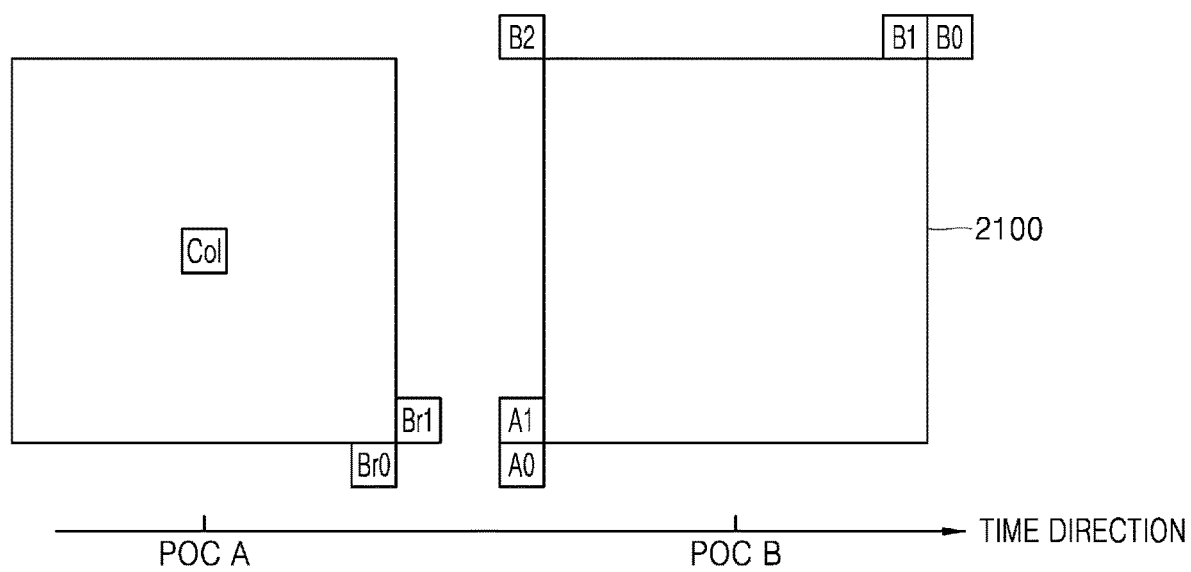
FIG. 21 is an exemplary view illustrating locations of neighboring blocks temporally or spatially related to a current block.

FIG. 21 is an exemplary view illustrating locations of neighboring blocks temporally or spatially related to a current block 2100.

Referring to FIG. 21, the neighboring blocks of the current block 2100 may include spatial blocks A0, A1, B0, B1, and B2 spatially related to the current block 2100, and temporal blocks Col, Br0, and Br1 temporally related to the current block 2100.

The spatial blocks may include at least one of a left lower corner block A0, a left lower block A1, a right upper corner block B0, a right upper block B1, and a left upper corner block B2 of the current block 2100. As shown in FIG. 21, the left lower block A1 may be located above the left lower corner block A0, and the right upper block B1 may be located to the left side of the right upper corner block B0.

The temporal blocks may include at least one of the block Col located at the same point as the current block 2100 in a collocated picture having a Picture Order Count (POC) that is different from a POC of a current picture including the current block 2100, and the blocks Br0 and Br1 being spatially adjacent to the block Col located at the same point. The blocks Br0 and Br1 may be located to the right lower side of the block Col located at the same point as the current block 2100. The block Br1 may be located to the right upper side of the block Br0. The block Col located at the same point as the current block 2100 may be a block including a pixel corresponding to a center pixel in the current block 2100 among pixels included in the collocated picture.

Locations of the temporal blocks and spatial blocks illustrated in FIG. 22 may be an example, and, according to an implementation example, locations and numbers of the temporal blocks and spatial blocks may change variously.

The motion information obtainer 2030 may determine availability of neighboring blocks according to a preset order, and include motion information of the neighboring blocks in a candidate list sequentially according to a result of the determining. The motion information obtainer 2030 may determine that intra-predicted neighboring blocks are unavailable.

When a prediction mode of a current block is a mode of deriving motion information of a current block by using motion information of a neighboring block, the motion information obtainer 2030 may select motion information of a certain neighboring block from a candidate list, and determine whether the motion information of the neighboring block needs to change and how to change the motion information of the neighboring block, based on change information.

When the change information indicates a change, the motion information of the neighboring block may change differently according to a type of an upper block (for example, a picture, a tile, a slice, a largest coding unit, etc.) including the current block. For example, when the upper block is a block (for example, a bi-predictive (B) slice) capable of using both the reference picture list 0 and the reference picture list 1, change information may represent which direction a prediction direction of a neighboring block needs to change to. As another example, when the upper block is a block (for example, a predictive (P) slice) capable of using only the reference picture list 0, change information may represent how to change a reference picture and/or a motion vector of a neighboring block because a prediction direction of a current block cannot be selected as a prediction direction that is different from a prediction direction of the neighboring block.

Hereinafter, a method of obtaining motion information of a current block based on change information when an upper block is a block capable of using both the reference picture list 0 and the reference picture list 1 will be described.

I. Case in which an Upper Block is a Block Capable of Using Both the Reference Picture List 0 and the Reference Picture List 1

FIG. 22 is an exemplary table representing which directions prediction directions of neighboring blocks change to according to values indicated by change information, when an upper block is a block capable of using both the reference picture list 0 and the reference picture list 1.

Referring to FIG. 22, when change information mmvd_group_idx has a value of 0, motion information of a neighboring block may not change. That is, a prediction direction and a reference picture of the neighboring block may be determined to be a prediction direction and a reference picture of a current block. Also, by applying a differential motion vector which will be described below to a motion vector of the neighboring block, a motion vector of the current block may be obtained. When no change information mmvd_group_idx is included in a bitstream, motion information of a neighboring block may not change. That is, a prediction direction and a reference picture of a neighboring block may be determined to be a prediction direction and a reference picture of a current block. Also, by applying a differential motion vector to a motion vector of the neighboring block, a motion vector of the current block may be obtained.

When change information mmvd_group_idx has a value of 1 or 2, motion information of a neighboring block may change.

More specifically, when a prediction direction of a neighboring block is the list 0 direction and change information mmvd_group_idx has a value of 1, a prediction direction of a current block may be determined to be the bi-direction, and, when change information mmvd_group_idx has a value of 2, a prediction direction of the current block may be determined to be the list 1 direction.

Also, when a prediction direction of a neighboring block is the list 1 direction and change information mmvd_group_idx has a value of 1, a prediction direction of a current block may be determined to be the bi-direction, and, when change information mmvd_group_idx has a value of 2, a prediction direction of the current block may be determined to be the list 0 direction.

Also, when a prediction direction of a neighboring block is the bi-direction and change information mmvd_group_idx has a value of 1, a prediction direction of a current block may be determined to be the list 0 direction, and, when change information mmvd_group_idx has a value of 2, a prediction direction of a current block may be determined to be the list 1 direction.

Changed prediction directions of a neighboring block according to values of change information mmvd_group_idx, as illustrated in FIG. 22, may be determined variously.

Hereinafter, a method of selecting a reference picture of a current block when a prediction direction of a neighboring block changes will be described.

1. Case in which a Prediction Direction of a Neighboring Block is the Bi-Direction and a Prediction Direction of a Current Block is a Uni-Direction When a prediction direction of a neighboring block is the bi-direction and a prediction direction of a current block is the list 0 direction, a reference picture of the list 0 direction of the neighboring block may be selected as a reference picture of the list 0 direction of the current block. A reference picture of the list 1 direction of the neighboring block may be not used for inter prediction of the current block.

When a prediction direction of a neighboring block is the bi-direction and a prediction direction of a current block is the list 1 direction, a reference picture of the list 1 direction of the neighboring block may be selected as a reference picture of the list 1 direction of the current block. A reference picture of the list 0 direction of the neighboring block may be not used for inter prediction of the current block.

2. Case in which a Prediction Direction of a Neighboring Block is the List 0 Direction and a Prediction Direction of a Current Block is the List 1 Direction Any one of pictures included in the reference picture list 1 may be selected as a reference picture of the list 1 direction of the current block, based on a distance between a current picture and a reference picture of the list 0 direction of the neighboring block. The distance between the pictures may be a difference between POCs of the two pictures. A POC may be an eigen value of a picture, representing an output order of the picture.

According to an embodiment, the motion information obtainer 2030 may select, as a reference picture of the list 1 direction of the current block, a picture in the reference picture list 1, spaced from the current picture by the distance between the current picture and the reference picture of the list 0 direction of the neighboring block. When a distance between a current picture and a reference picture of the list 0 direction of a neighboring block is equal to a distance between the current picture and a reference picture of the list 1 direction of a current block, a process of scaling a motion vector, which will be described below, may be omitted.

Referring to FIG. 23, when a POC of a current picture is 5 and a POC of a reference picture of the list 0 direction of a neighboring block is 3, a picture of POC 7 among pictures included in the reference picture list 1 may be selected as a reference picture of the list 1 direction of a current block. When a picture spaced from the current picture by the distance between the current picture and the reference picture of the list 0 direction of the neighboring block is not included in the reference picture list 1, the motion information obtainer 2030 may select a picture having an index of a smallest value (for example, 0) among the pictures in the reference picture list 1, as a reference picture of the list 1 direction of the current block.

According to another embodiment, when the number of pictures included in the reference picture list 1 is greater than n (n is a natural number that is greater than or equal to 1, and for example, n is 1), and a distance between a current picture and a reference picture of the list 0 direction of a neighboring block is equal to a distance between the current picture and a picture having an index of n in the reference picture list 1, the motion information obtainer 2030 may select the picture having the index of n, included in the reference picture list 1, as a reference picture of the list 1 direction of a current block. When the number of pictures included in the reference picture list 1 is not greater than 1, the motion information obtainer 2030 may select a picture having an index of 0 in the reference picture list 1 as a reference picture of the list 1 direction of the current block. Also, when the distance between the current picture and the reference picture of the list 0 direction of the neighboring block is not equal to the distance between the current picture and the picture having the index of n in the reference picture list 1 although the number of the pictures included in the reference picture list 1 is greater than n, the motion information obtainer 2030 may select a picture having an index of 0, included in the reference picture list 1, as a reference picture of the list 1 direction of the current block. Because it is unnecessary to check all POCs of the pictures included in the reference picture list 1, a process of selecting a reference picture may be simplified. Before the motion information obtainer 2030 determines whether the distance between the current picture and the reference picture of the list 0 direction of the neighboring block is equal to the distance between the current picture and the picture having the index of n in the reference picture list 1, the motion information obtainer 2030 may determine whether the number of the pictures included in the reference picture list 1 is greater than n. The reason may be because, when the number of the pictures included in the reference picture list 1 is n, the picture having the index of n cannot be included in the reference picture list 1. In other words, when the number of the pictures included in the reference picture list 1 is n, the pictures included in the reference picture list 1 may have indexes of 0 to n−1.

3. Case in which a Prediction Direction of a Neighboring Block is the List 1 Direction, and a Prediction Direction of a Current Block is the List 0 Direction Any one of pictures included in the reference picture list 0 may be selected as a reference picture of the list 0 direction of the current block based on a distance between a current picture and a reference picture of the list 1 direction of the neighboring block.

According to an embodiment, the motion information obtainer 2030 may select, as a reference picture of the list 0 direction of the current block, a picture in the reference picture list 0, spaced from the current picture by the distance between the current picture and the reference picture of the list 1 direction of the neighboring block.

Referring to FIG. 23, when a POC of a current picture is 5 and a POC of a reference picture of the list 1 direction of a neighboring block is 7, a picture of POC 3 among pictures included in the reference picture list 0 may be selected as a reference picture of the list 0 direction of a current block. When a picture spaced from the current picture by the distance between the current picture and the reference picture of the list 1 direction of the neighboring block is not included in the reference picture list 0, the motion information obtainer 2030 may select a picture having an index of a smallest value (for example, 0) among the pictures included in the reference picture list 0, as a reference picture of the list 0 direction of the current block.

According to another embodiment, when the number of pictures included in the reference picture list 0 is n (n is a natural number that is greater than or equal to 1, and for example, n is 1), and a distance between a current picture and a picture of the list 1 direction of a neighboring block is equal to a distance between the current picture and a picture having an index of n included in the reference picture list 0, the motion information obtainer 2030 may select the picture having the index of n and included in the reference picture list 0 as a reference picture of the list 0 direction of the current block. When the number of the pictures included in the reference picture list 0 is not greater than n, the motion information obtainer 2030 may select a picture having an index of 0 in the reference picture list 0 as a reference picture of the list 0 direction of the current block. Also, when the distance between the current picture and the reference picture of the list 1 direction of the neighboring block is not equal to the distance between the current picture and the picture having the index of n in the reference picture list 0 although the number of the pictures included in the reference picture list 0 is greater than n, the motion information obtainer 2030 may select a picture having an index of 0 in the reference picture list 0 as a reference picture of the list 0 direction of the current block. In this case, because it is unnecessary to check all POCs of the pictures included in the reference picture list 0, a process of selecting a reference picture may be simplified. Before the motion information obtainer 2030 determines whether the distance between the current picture and the reference picture of the list 1 direction of the neighboring block is equal to the distance between the current picture and the picture having the index of n in the reference picture list 0, the motion information obtainer 2030 may determine whether the number of the pictures included in the reference picture list 0 is greater than n. The reason may be because, when the number of the pictures included in the reference picture list 0 is n or less, the picture having the index of n cannot be included in the reference picture list 0.

4. Case in which a Prediction Direction of a Neighboring Block is the List 0 Direction and a Prediction Direction of a Current Block is the Bi-Direction A reference picture of the list 0 direction of the neighboring block may be selected as a reference picture of the list 0 direction of the current block. Also, any one of pictures included in a reference picture list 1 may be selected as a reference picture of the list 1 direction of the current block based on a distance between a current picture and a reference picture of the list 0 direction of the neighboring block. A method of selecting, as a reference picture of the list 1 direction of a current block, any one of pictures included in the reference picture list 1 based on a distance between a current picture and a reference picture of the list 0 direction of a neighboring block has been described above in "2. Case in which a prediction direction of a neighboring block is the list 0 direction and a prediction direction of a current block is the list 1 direction", and therefore, detailed descriptions thereof will be omitted.

5. Case in which a Prediction Direction of a Neighboring Block is the List 1 Direction and a Prediction Direction of a Current Block is the Bi-Direction A reference picture of the list 1 direction of the neighboring block may be selected as a reference picture of the list 1 direction of the current block. Also, any one of pictures included in the reference picture list 0 may be selected as a reference picture of the list 0 direction of the current block based on a distance between a current picture and the reference picture of the list 1 direction of the neighboring block. A method of selecting any one of pictures included in the reference picture list 0 as a reference picture of the list 0 direction of a current block based on a distance between a current picture and a reference picture of the list 1 direction of a neighboring block has been described above in "3. Case in which a prediction direction of a neighboring block is the list 1 direction, and a prediction direction of a current block is the list 0 direction", and therefore, detailed descriptions thereof will be omitted.

When the reference picture of the current block is identical to the reference picture of the neighboring block, a differential motion vector may be applied to a motion vector of the neighboring block, thereby obtaining a motion vector of the current block. More specifically, when no change information is included in a bitstream or when change information indicates an unchange, a differential motion vector may be applied to a motion vector of a neighboring block, thereby obtaining a motion vector of a current block. When a prediction direction of a neighboring block is the bi-direction and a prediction direction of a current block is the list 0 direction or the list 1 direction, a differential motion vector may be applied to a motion vector of the list 0 direction or a motion vector of the list 1 direction of the neighboring block, thereby obtaining a motion vector of the list 0 direction or the list 1 direction of the current block.

When the reference picture of the current block is not identical to the reference picture of the neighboring block, a motion vector of the neighboring block may be scaled, and a differential motion vector may be applied to the scaled motion vector, thereby obtaining a motion vector of the current block. For example, when a prediction direction of a neighboring block is the list 0 direction, and a prediction direction of a current block is the list 1 direction or the bi-direction, a motion vector of the list 0 direction of the neighboring block may be scaled, and a differential motion vector may be applied to the scaled motion vector, thereby obtaining a motion vector of the list 1 direction of the current block. Also, when a prediction direction of a neighboring block is the list 1 direction, and a prediction direction of a current block is the list 0 direction or the bi-direction, a motion vector of the list 1 direction of the neighboring block may be scaled, and a differential motion vector may be applied to the scaled motion vector, thereby obtaining a motion vector of the list 0 direction of the current block.

Hereinafter, a process of scaling a motion vector of a neighboring block will be described.

The motion information obtainer 2030 may multiply a ratio of a distance between a current picture and a reference picture of a neighboring block and a distance between the current picture and a reference picture of a current block by a motion vector of the neighboring block, thereby scaling the motion vector of the neighboring block. By applying a differential motion vector to the scaled motion vector, a motion vector of the current block may be obtained.

The motion information obtainer 2030 may convert a sign of the scaled motion vector according to a positional relationship between the reference picture of the neighboring block, the current picture, and the reference picture of the current block, which will be described with reference to FIGS. 24 and 25.

Figure 24:
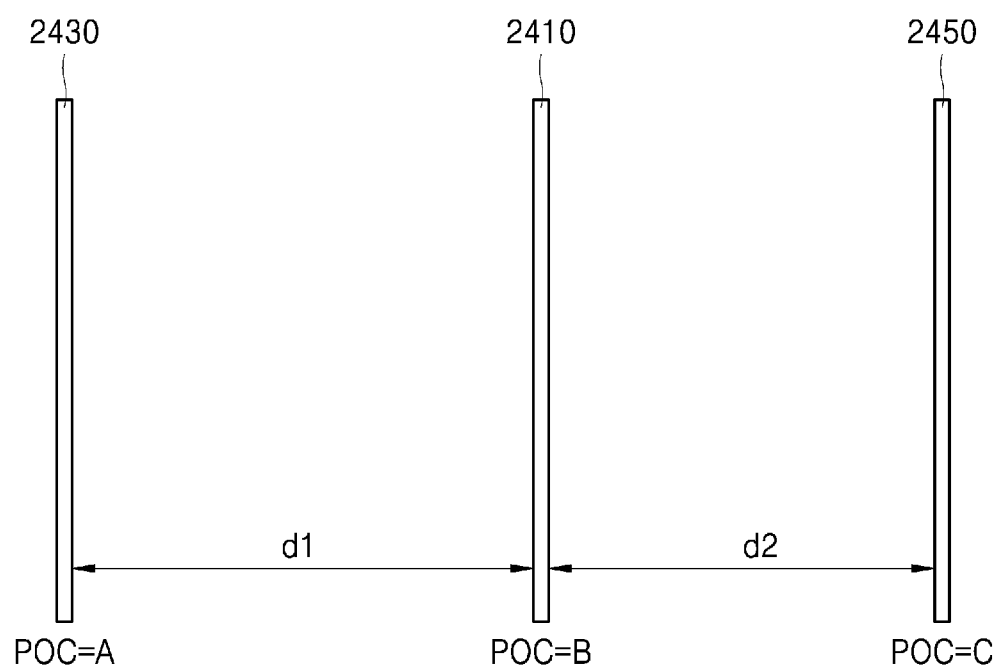
FIG. 24 illustrates a positional relationship between a reference picture of a neighboring block, a current picture, and a reference picture of a current block.
Figure 25:
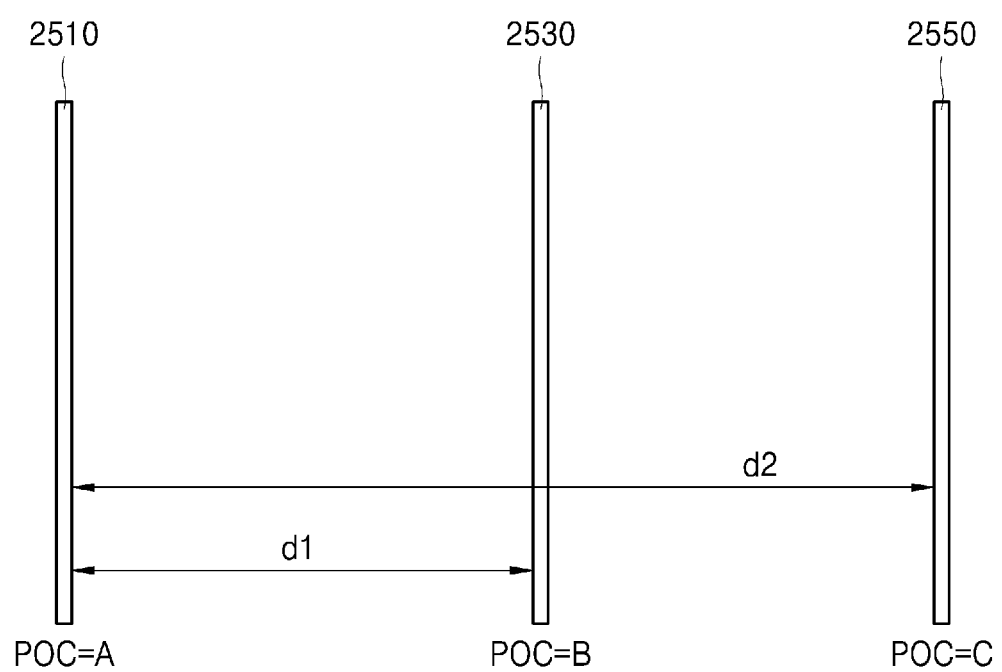
FIG. 25 illustrates a positional relationship between a reference picture of a neighboring block, a current picture, and a reference picture of a current block.

FIGS. 24 and 25 illustrate a positional relationship between a reference picture of a neighboring block, a current picture, and a reference picture of a current block.

In FIGS. 24 and 25, a distance between a current picture 2410 or 2510 and a reference picture 2430 or 2530 of a neighboring block is referred to as d1, and a distance between the current picture 2410 or 2510 and a reference picture 2450 or 2550 of a current block is referred to as d2. A distance between two pictures may mean a difference between POC values of the two pictures.

Referring to FIG. 24, the current picture 2410 may have a POC of B, and the reference picture 2430 of the neighboring block and the reference picture 2450 of the current block may have a POC of A and a POC of C, respectively. When the POC B has a value between the POC A and the POC C, a motion vector of the neighboring block may be scaled according to a ratio of d1 and d2, and a sign of the motion vector may be converted to the opposite sign. That is, as illustrated in FIG. 24, when the current picture 2410 is located between the reference picture 2450 of the current block and the reference picture 2430 of the neighboring block, a scaled motion vector of the neighboring block may be converted to the opposite sign. When d1 and d2 have the same value, only the sign of the motion vector of the neighboring block may be converted to the opposite sign.

Then, referring to FIG. 25, a current picture 2510 has a POC of A, and a reference picture 2530 of a neighboring block and a reference picture 2550 of a current block have a POC of B and a POC of C, respectively. When the POC A is smaller than the POC B and the POC C and POC A is greater than the POC B and POC C, a motion vector of the neighboring block may be scaled according to a ratio of d1 and d2, and a sign of the motion vector may be maintained as it is. That is, as illustrated in FIG. 25, when the reference picture 2550 of the current block is different from the reference picture 2530 of the neighboring block, and a POC of the current picture 2510 is earlier than POCs of the reference picture 2550 of the current block and the reference picture 2530 of the neighboring block, or the POC of the current picture 2510 follows the POCs of the reference picture 2550 of the current block and the reference picture 2530 of the neighboring block, a sign of a scaled motion vector of the neighboring block may be maintained as it is.

The motion information obtainer 2030 may apply a differential motion vector to the motion vector of the neighboring block or the scaled motion vector of the neighboring block, thereby obtaining a motion vector of the current block.

According to an embodiment, the differential motion vector may be calculated from variation distance information and variation direction information obtained from a bitstream. The bitstream obtainer 2010 may obtain variation distance information and variation direction information from a bitstream, and the motion information obtainer 2030 may apply a differential motion vector calculated based on the variation distance information and variation direction information to the motion vector of the neighboring block or the scaled motion vector of the neighboring block.

The variation distance information may represent a distance of the differential motion vector from the origin. Also, the variation distance information may represent a magnitude of the differential motion vector. Herein, the variation distance may be a distance in a sub pel unit. For example, when a reference picture is interpolated to have a sub pixel of a ¼ pixel unit and variation distance information represents a variation distance of 2, this may mean that a differential motion vector has a magnitude of a 2/4 pixel unit.

The variation direction information may represent a direction of the differential motion vector from the origin. Alternatively, the variation direction information may represent a sign of the differential motion vector.

Figure 26:
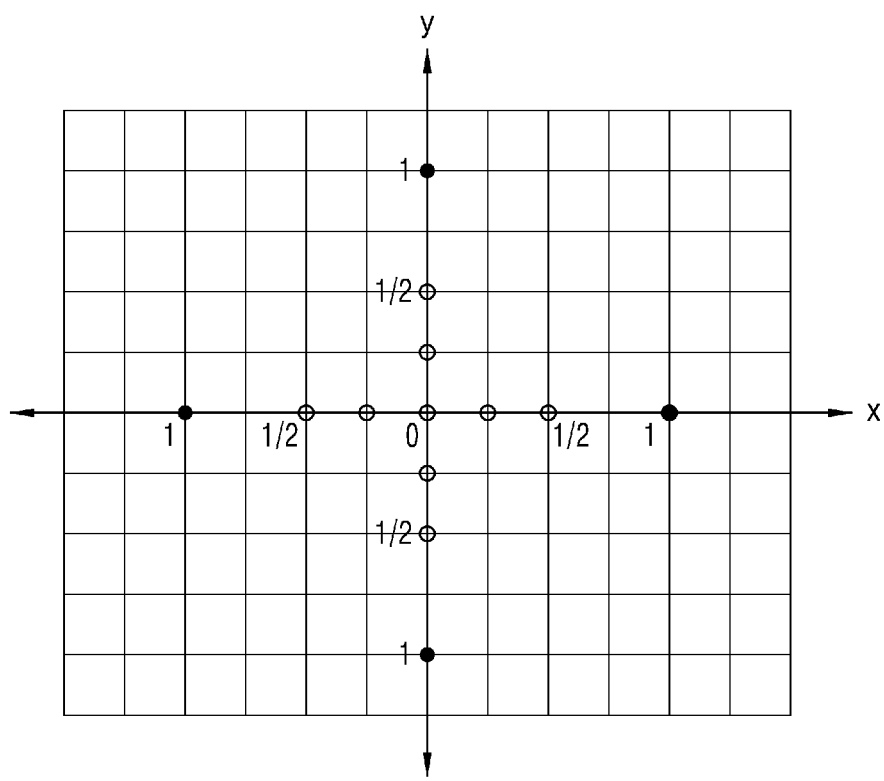
FIG. 26 illustrates differential motion vectors displayed on a coordinate plane.

FIG. 26 illustrates differential motion vectors displayed on a coordinate plane.

A differential motion vector may have various values according to a variation distance and a variation direction from the origin. For example, when a variation distance is 1 and a variation direction is a +x axis direction, a differential motion vector may be (1, 0), and, when a variation distance is 1 and a variation direction is a −x axis direction, a differential motion vector may be (−1, 0). Also, when a variation distance is 2 and a variation direction is a +y axis direction, a differential motion vector may be (0, 2), and, when a variation distance is 2 and a variation direction is a −y axis direction, a differential motion vector may be (0, −2).

FIG. 27 is an exemplary table representing variation distances corresponding to values of variation distance information, and FIG. 28 is an exemplary table representing variation directions corresponding to values of variation direction information.

Referring to FIG. 27, as a value indicated by variation distance information mmvd_distance_idx increases, a variation distance may increase in a log scale. That is, when a value indicated by variation distance information mmvd_distance_idx is n, a variation distance may be 2$^n$.

Referring to FIG. 28, a sign of a differential motion vector may be determined according to a value indicated by variation direction information mmvd_direction_idx. When a value indicated by variation direction information mmvd_direction_idx is 0, a differential motion vector may have a + sign in an x-axis direction, and, when a value indicated by variation direction information mmvd_direction_idx is 1, a differential motion vector may have a − sign in the x-axis direction. Also, when a value indicated by variation direction information mmvd_direction_idx is 2, a differential motion vector may have a + sign in a y-axis direction, and when a value indicated by variation direction information mmvd_direction_idx is 3, a differential motion vector may have a − sign in the y-axis direction.

The variation distances according to the values indicated by the variation distance information, as illustrated in FIG. 27, and the variation directions according to the values indicated by the variation direction information, as illustrated in FIG. 28, may be determined variously according to implementation examples.

According to an embodiment, when a prediction direction of a current block is the bi-direction, a differential motion vector derived from variation distance information and variation direction information may be scaled and then applied to a motion vector of the list 0 direction or a motion vector of the list 1 direction. More specifically, when a distance between a current picture and a reference picture of the list 0 direction of a current block is greater than a distance between the current picture and a reference picture of the list 1 direction of the current block, a differential motion vector may be scaled and then applied to a motion vector of the list 0 direction, and the differential motion vector may be applied to a motion vector of the list 1 direction without being scaled. In contrast, when a distance between a current picture and a reference picture of the list 1 direction of a current block is greater than a distance between the current picture and a reference picture of the list 0 direction of the current block, a differential motion vector may be scaled and then applied to a motion vector of the list 1 direction, and the differential motion vector may be applied to a motion vector of the list 0 direction without being scaled.

A differential motion vector may be scaled based on a ratio of a distance between a current picture and a reference picture of the list 0 direction and a distance between the current picture and a reference picture of the list 1 direction. For example, when a distance between a current picture and a reference picture of the list 0 direction is d0 and a distance between the current picture and a reference picture of the list 1 direction is d1, a differential motion vector may be multiplied by a value corresponding to a ratio of d0 and d1. When a POC of a current picture has a value between a POC of a reference picture of the list 0 direction and a POC of a reference picture of the list 1 direction, a sign of a non-scaled differential motion vector may be opposite to that of a scaled differential motion vector. When a distance d0 between a current picture and a reference picture of the list 0 direction is equal to a distance d1 between the current picture and a reference picture of the list 1 direction, and a POC of the current picture has a value between a POC of the reference picture of the list 0 direction and a POC of the reference picture of the list 1 direction, a differential motion vector derived from variation distance information and variation direction information may be applied to a motion vector of the list 0 direction, a differential motion vector of which a sign has been converted to the opposite sign may be applied to a motion vector of the list 1 direction.

According to an embodiment, scaling of a differential motion vector may be expressed as Equation 1 below.

$$mMvdL = \text{Clip3}(-32767, 32767, ((distScaleFactor * mMvdL + 16) \gg 5))$$ [Equation 1]

In Equation 1, distScaleFactor is a ratio of a distance between a current picture and a reference picture of the list 0 direction and a distance between the current picture and a reference picture of the list 1 direction, and may be calculated according to Equation 2 below.

$$distScaleFactor = (\text{Abs}(currPocDiffL1) \ll 5)/\text{Abs}(currPocDiffL0) \quad \text{[Equation 2]}$$

In Equation 2, currPocDiffL1 is a difference between a POC of the current picture and a POC of the reference picture of the list 1 direction, and currPocDiffL0 represents a difference between the POC of the current picture and a POC of the reference picture of the list 0 direction.

In Equation 1, a upper limit and a lower limit of clipping operation are set to 32767 and −32767, respectively, and 32767 is a greatest number capable of being expressed with a number portion of 15 bits and a sign portion of 1 bit. An actual lower limit that is expressed with the number portion of 15 bits and the sign portion of 1 bit should be −32768. However, when a differential motion vector is determined to be −32768 which is a lower limit through clipping operation and a POC of a current picture has a value between a POC of a reference picture of the list 0 direction and a POC of a reference picture of the list 1 direction, a sign of −32768 should be converted to the opposite sign. In this case, 32768 may exceed 32767 which is an upper limit capable of being expressed with a number portion of 15 bits and a sign portion of 1 bit. Accordingly, in Equation 1, a lower limit of clipping operation is set to −32767. According to an implementation example, a lower limit of clipping operation of Equation 1 may be set to −32768.

Meanwhile, a method of obtaining motion information of a current block by considering change information when a type of an upper block of the current block can use only the reference picture list 0 will be described.

II. Case in which an Upper Block is a Block Capable of Using the Reference Picture List 0

When an upper block is a block (for example, a predictive (P) slice) capable of using only the reference picture list 0, a prediction direction of a current block may be determined to be the list 0 direction. Change information represents how to determine a reference picture of a current block, which will be described with reference to FIG. 29.

FIG. 29 is a table representing a method of selecting a reference picture of a current block according to a value indicated by change information and the number of pictures included in a reference picture list.

Referring to FIG. 29, when change information mmvd_group_idx is 0, that is, when change information indicates an unchange of motion information of a neighboring block, a reference picture ref_idx_curr of a neighboring block may be determined to be a reference picture ref_idx of a current block. Also, a differential motion vector may be applied to a motion vector of the neighboring block, thereby obtaining a motion vector of the current block.

When change information mmvd_group_idx is 1 or 2, that is, when change information indicates a change of motion information of a neighboring block, a reference picture of a current block may be adaptively selected according to the number of pictures included in the reference picture list 0.

More specifically, when change information mmvd_group_idx is 1 and the number Active reference number of pictures included in the reference picture list 0 is 1, a reference picture ref_idx of a current block may be selected to be identical to a reference picture ref_idx_curr of a neighboring block. When the number Active reference number of pictures included in the reference picture list 0 is not 1 (for example, 2 or 3), the reference picture ref_idx of the current block may be selected to be different from the reference picture ref_idx_curr of the neighboring block. For example, when the number Active reference number of pictures included in the reference picture list 0 is 2 and any one of the two pictures is a reference picture of a neighboring block, the remaining one may be selected as the reference picture ref_idx of the current block. In FIG. 29, when the number of pictures included in the reference picture list 0 is not 1 (for example, 2 or 3), a reference picture ref_idx of a current block may be determined to be !ref_idx_curr. According to a not operator, when a reference picture ref_idx_curr of a neighboring block is a picture of index 0, a reference picture ref_idx of a current block may be selected as a picture of index 1, and, when a reference picture ref_idx_curr of a neighboring block is a picture having an index except for index 0, the reference picture ref_idx of the current block may be selected as a picture of index 0.

Then, when change information is 2 and the number Active reference number of pictures included in the reference picture list 0 is less than 3 (for example, 2), the reference picture ref_idx of the current block may be selected to be identical to the reference picture ref_idx_curr of the neighboring block. When change information is 1 and the number Active reference number of pictures included in the reference picture list 0 is 2, a reference picture ref_idx of a current block may be selected to be different from a reference picture ref_idx_curr of a neighboring block. Therefore, when change information is 2, the reference picture ref_idx of the current block may be selected to be identical to the reference picture ref_idx_curr of the neighboring block.

When change information is 2, the number Active reference number of pictures included in the reference picture list 0 is 3 or more, and an index of a reference picture ref_idx_curr of a neighboring block is 2 or smaller, a reference picture ref_idx of a current block may be selected as a picture having an index of 2 among the pictures included in the reference picture list 0. That is, the reference picture ref_idx of the current block may be selected to be different from the reference picture ref_idx_curr of the neighboring block.

When change information is 2, the number Active reference number of pictures included in the reference picture list 0 is 3 or more, and an index of a reference picture ref_idx_curr of a neighboring block is 2 or greater, a reference picture ref_idx of a current block may be selected as a picture having an index of 1 from among the pictures included in the reference picture list 0. That is, when an index of a reference picture ref_idx_curr of a neighboring block is 2, 3, 4, etc., a reference picture ref_idx of a current block may be selected as a picture having an index of 1.

When change information indicates a change, and a picture that is different from a reference picture of a neighboring block is included in the reference picture list 0, a reference picture of a current block may be preferentially selected to be different from the reference picture of the neighboring block. Meanwhile, when no picture that is different from a reference picture of a neighboring block is included in the reference picture list 0, the reference picture of the neighboring block may be selected as a reference picture of a current block.

When change information indicates a change, and a reference picture of a current block selected according to the change information is different from a reference picture of a neighboring block, a motion vector of the neighboring block may be scaled, and a differential motion vector may be applied to the scaled motion vector, thereby obtaining a motion vector of the current block. A method of scaling a motion vector of a neighboring block by considering a ratio of a distance between a current picture and a reference picture of a current block and a distance between the current picture and a reference picture of a neighboring block when the reference picture of the current block is different from the reference picture of the neighboring block has been described above, and therefore, detailed descriptions thereof will be omitted.

When change information indicates a change, and a reference picture of a current block selected according to the change information is identical to a reference picture of a neighboring block, the motion information obtainer 2030 may apply an offset to a motion vector of the neighboring block for a distinction from a case in which change information indicates an unchange, and then apply a differential motion vector to the motion vector to which the offset has been applied.

A method of changing a motion vector of a neighboring block by applying an offset to the motion vector of the neighboring block when change information indicates a change and a reference picture of a current block is identical to a reference picture of the neighboring block will be described with reference to FIG. 30.

Figure 30:
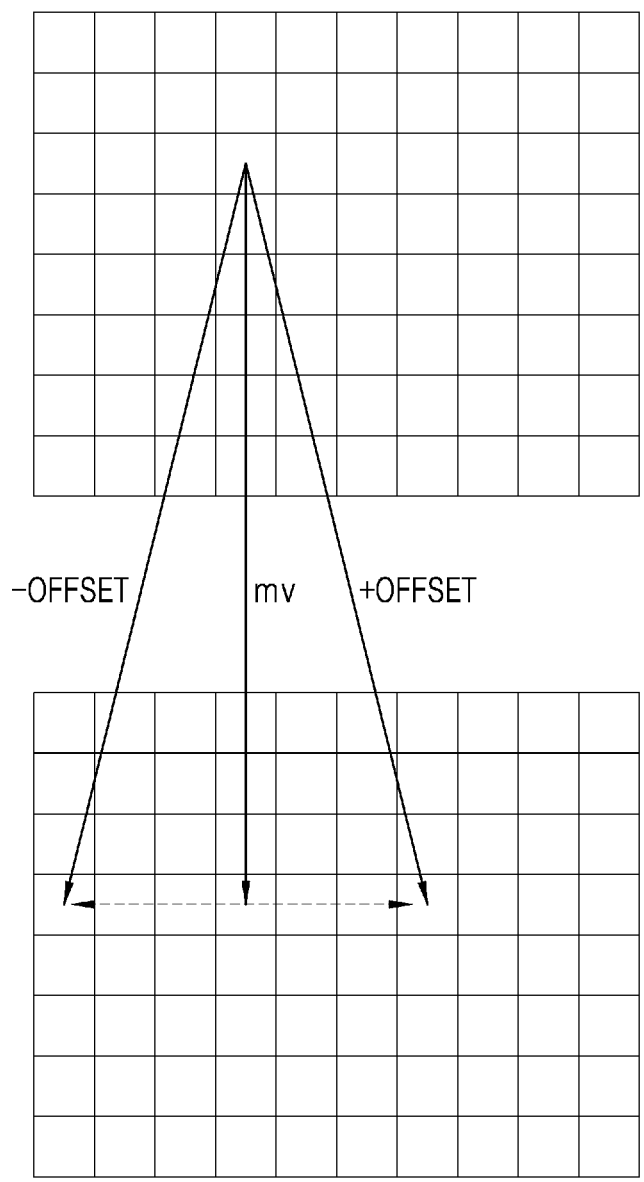
FIG. 30 is a view for describing a method of changing a motion vector of a neighboring block, when a reference picture of the neighboring block is identical to a reference picture of a current block.

FIG. 30 is a view for describing a method of changing a motion vector of a neighboring block, when a reference picture of the neighboring block is identical to a reference picture of a current block.

According to an embodiment, the motion information obtainer 2030 may change a motion vector my of a neighboring block by adding a preset offset to at least one of an x component and a y component of the motion vector my of the neighboring block. The offset may be a predefined real number.

According to an embodiment, the offset may be an odd number, for example, 3. As described above, as values indicated by variation distance information mmvd_distance_idx increase, a variation distance may increase in a log scale. In this case, the variation distance may have a value of 2". When an offset is set to an odd number, a result obtained by adding any differential motion vector to a motion vector of a neighboring block, to which no offset has been applied will be different from a result obtained by adding a differential motion vector to a motion vector of a neighboring block, to which the offset has been applied. That is, by applying an offset of an odd number, candidates capable of being selected as a motion vector of a current block may be diversified.

As illustrated in FIG. 30, the motion information obtainer 2030 may apply an offset of +3 or −3 to an x component of a motion vector my of a neighboring block. Applying an offset of +3 or −3 to an x component of a motion vector my of a neighboring block may mean moving the motion vector of the neighboring block by a ¾ pixel unit when a reference picture is interpolated to a ¼ pixel unit. According to an implementation example, the motion information obtainer 2030 may apply an offset of +3 or −3 to a y component of a motion vector my of a neighboring block, or apply the offset of +3 or −3 to an x component and y component of the motion vector my of the neighboring block.

When the number of pictures included in the reference picture list 0 is 1 and change information has a value of 1, the motion information obtainer 2030 may add +3 to an x component of a motion vector of a neighboring block, and, when change information has a value of 2, the motion information obtainer 2030 may add −3 to the x component of the motion vector of the neighboring block.

Also, because a reference picture of a current block is selected to be different from a reference picture of a neighboring block when the number of pictures included in the reference picture list 0 is 2 and change information has a value of 1, the motion information obtainer 2030 may scale a motion vector of the neighboring block. When change information has a value of 2, the motion information obtainer 2030 may add +3 to the x component of the motion vector of the neighboring block.

When the number of pictures included in the reference picture list 0 is 3 or more, and change information is 1 or 2, the motion information obtainer 2030 may scale the motion vector of the neighboring block because the reference picture of the neighboring block is different from a reference picture of a current block.

The motion information obtainer 2030 may scale a motion vector of a neighboring block, or apply an offset to the motion vector of the neighboring block and then apply a differential motion vector, according to the number of pictures included in the reference picture list 0 or a value indicated by change information, thereby obtaining a motion vector of a current block.

After motion information of the current block is obtained, the prediction decoder 2050 may inter-predict the current block according to the motion information of the current block. The prediction decoder 2050 may select, as a reference picture of a current block, a picture indicated by a reference picture index from among pictures included in a reference picture list corresponding to a prediction direction of the current block, and obtain a prediction block of the current block from a reference block in a reference picture indicated by a motion vector of the current block.

The prediction block of the current block may be determined to be a reconstructed block of the current block, and, according to an implementation example, when residual data is included in a bitstream, the residual data may be applied to the prediction block to obtain a reconstructed block of the current block.

Meanwhile, as described above, when a size of the current block is smaller than or equal to a preset size although information obtained from an upper level of the current block represents that a change mode is applicable, the bitstream obtainer 2010 may not obtain change information from a bitstream. In this case, when a prediction direction of a neighboring block is the bi-direction, the motion information obtainer 2030 may determine a prediction direction of the current block to be the list 0 direction (or list 1 direction), in order to prevent bi-directional prediction of a small block. Accordingly, the motion information obtainer 2030 may determine a reference picture (or a reference picture of the list 1 direction of the neighboring block) of the list 0 direction of the neighboring block to be a reference picture of the current block, and apply a differential motion vector to a motion vector (a motion vector of the list 1 direction of the neighboring block) of the list 0 direction of the neighboring block to obtain a motion vector of the current block. That is, according to an embodiment, when a size of a current block is small, the current block may be uni-directionally predicted although a prediction direction of a neighboring block is the bi-direction.

According to another embodiment, when a size of a current block is smaller than or equal to a preset size, the motion information obtainer 2030 may include only motion information of a uni-directionally predicted neighboring block in a candidate list, while scanning neighboring blocks related to the current block according to a predefined order.

According to another embodiment, when a size of a current block is smaller than or equal to a preset size, the motion information obtainer 2030 may add, when adding motion information of a bi-directionally predicted neighboring block among neighboring blocks related to the current block in a candidate list, only motion information (for example, a flag representing whether a prediction direction of the neighboring block is the list 0 direction, a reference picture index of the list 0 direction of the neighboring block, and a motion vector of the list 0 direction of the neighboring block) of the list 0 direction of the corresponding neighboring block in the candidate list.

Figure 31:
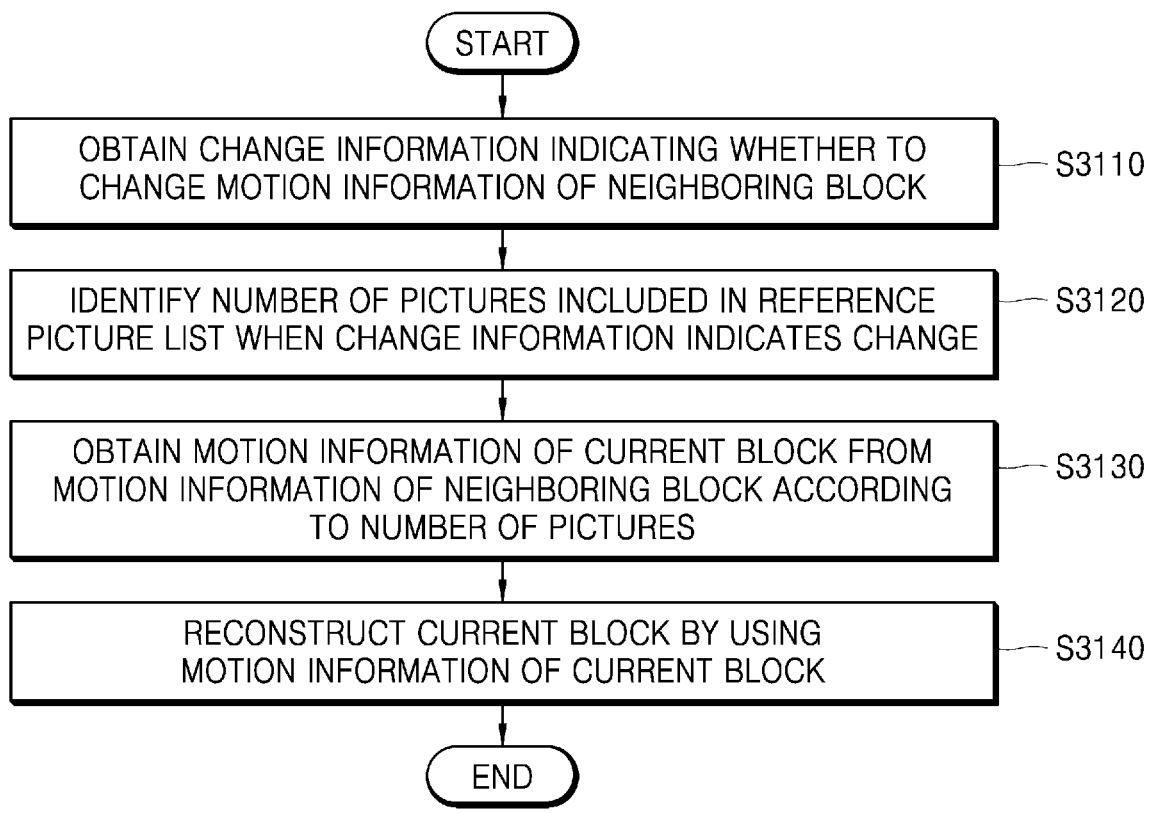
FIG. 31 is a flowchart representing a method of decoding motion information, according to an embodiment.

FIG. 31 is a flowchart representing a method of decoding motion information, according to an embodiment.

In operation S3110, an image decoding apparatus 2000 may obtain change information indicating a change or an unchange of motion information of a neighboring block temporally or spatially related to a current block from a bitstream.

According to an embodiment, when information obtained from an upper level of a current block, for example, a sequence parameter set, a picture parameter set, a video parameter set, a slice header, a slice segment header, a tile header, or a tile group header of a bitstream represents that a change mode is not applicable, the image decoding apparatus 2000 may not obtain change information of the current block from the bitstream, and, when the corresponding information represents that the change mode is applicable, the image decoding apparatus 2000 may obtain change information of the current block from the bitstream.

According to an embodiment, when a size of the current block is smaller than or equal to a preset size although the information obtained from the upper level of the current block represents that the change mode is applicable, the image decoding apparatus 2000 may not obtain change information from the bitstream. In this case, when a prediction direction of the neighboring block is the bi-direction, the image decoding apparatus 2000 may determine a prediction direction of the current block to be the list 0 direction (or the list 1 direction). Also, the image decoding apparatus 2000 may determine a reference picture (or a reference picture of the list 1 direction of the neighboring block) of the list 0 direction of the neighboring block to be a reference picture of the current block, and apply a differential motion vector to a motion vector (or a motion vector of the list 1 direction of the neighboring block) of the list 0 direction of the neighboring block to obtain a motion vector of the current block.

In operation S3120, when change information indicates a change of motion information and an upper block of the current block can use a reference picture list, in other words, when the upper block of the current block cannot use two reference picture lists, the image decoding apparatus 2000 may identify the number of pictures included in the reference picture list.

In operation S3130, the image decoding apparatus 2000 may obtain motion information of the current block from motion information of the neighboring block according to the number of pictures included in the reference picture list.

More specifically, the image decoding apparatus 2000 may select a reference picture of the neighboring block or a picture which is different from the reference picture of the neighboring block, as a reference picture of the current block, according to the number of pictures in the reference picture list. Also, when the reference picture of the neighboring block is selected as a reference picture of the current block, an offset may be applied to at least one of an x component and a y component of a motion vector of the neighboring block to obtain a motion vector of the current block. The image decoding apparatus 2000 may apply a differential motion vector to the motion vector to which the offset has been applied to obtain a motion vector of the current block.

When the number of the pictures included in the reference picture list is 1, the image decoding apparatus 2000 may select the reference picture of the neighboring block as a reference picture of the current block. When the change information indicates a change of a first type (for example, when the change information has a value of 1), the image decoding apparatus 2000 may apply an offset of a + sign to the motion vector of the neighboring block. When the change information indicates a change of a second type (for example, when the change information has a value of 2), the image decoding apparatus 2000 may apply an offset of a − sign to the motion vector of the neighboring block.

When the number of the pictures in the reference picture list is 2 and the change information indicates the change of the first type, the image decoding apparatus 2000 may determine a reference picture of the current block to be different from the reference picture of the neighboring block, and scale the motion vector of the neighboring block. When the number of the pictures in the reference picture list is 2 and the change information indicates the change of the second type, the image decoding apparatus 2000 may determine a reference picture of the current block to be identical to the reference picture of the neighboring block, and apply an offset to at least one of an x component and a y component of the motion vector of the neighboring block.

When the number of the pictures in the reference picture list is 3 or more, and the change information indicates the change of the first type or the change of the second type, the image decoding apparatus 2000 may determine a reference picture of the current block to be different from the reference picture of the neighboring block, and scale the motion vector of the neighboring block. At this time, a reference picture of the current block selected when the change information indicates the change of the first type may be different from a reference picture of the current block selected when the change information indicates the change of the second type.

The image decoding apparatus 2000 may apply a differential motion vector to the motion vector of the neighboring block, the scaled motion vector of the neighboring block, or the motion vector of the neighboring block to which the offset has been applied, to obtain a motion vector of the current block.

In operation S3140, the image decoding apparatus 2000 may reconstruct the current block by using motion information of the current block.

The image decoding apparatus 2000 may select a picture indicated by a reference picture index from among pictures included in a reference picture list corresponding to a prediction direction of the current block, as a reference picture of the current block, and obtain a prediction block of the current block from a reference block in a reference picture indicated by the motion vector of the current block.

According to an embodiment, the prediction block of the current block may be determined to be a reconstructed block of the current block, and, according to an implementation example, when residual data is included in a bitstream, the residual data may be applied to the prediction block, thereby obtaining a reconstructed block of the current block.

Figure 32:
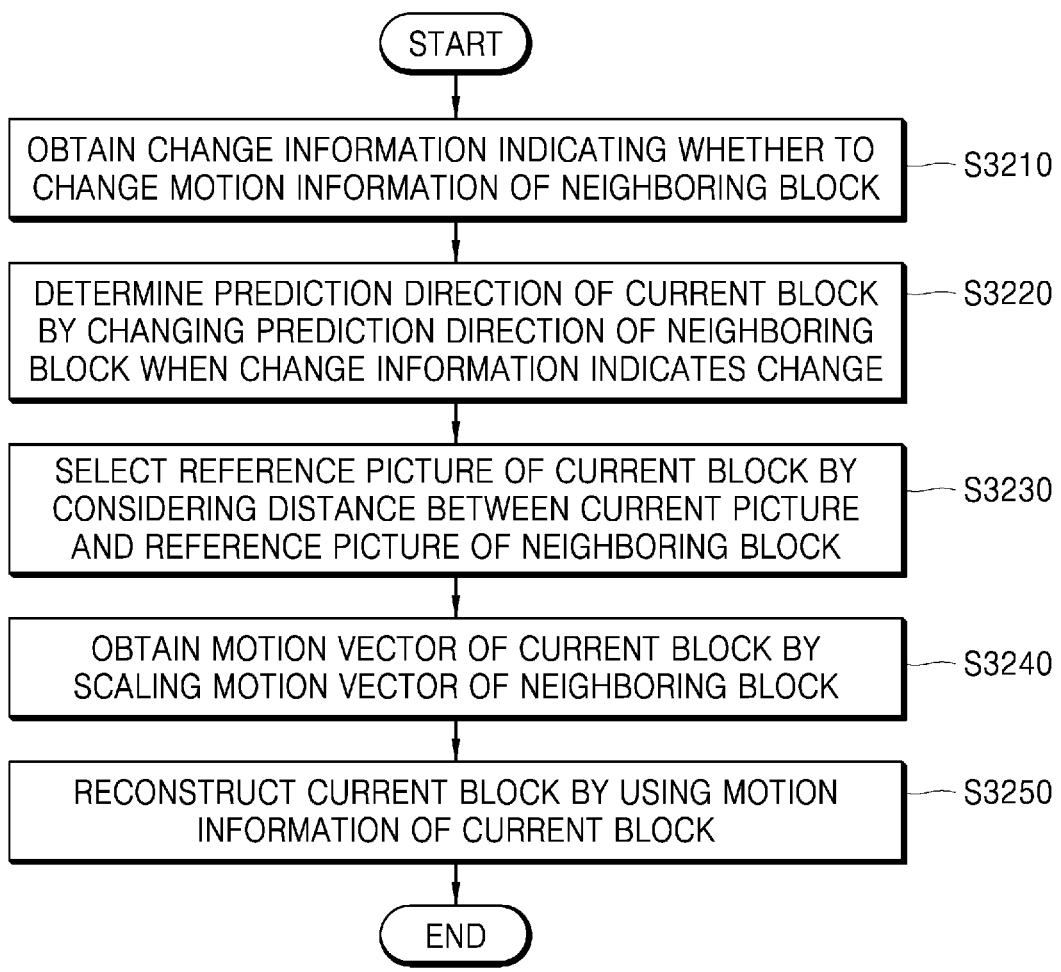
FIG. 32 is a flowchart representing a method of decoding motion information, according to another embodiment.

FIG. 32 is a flowchart representing a method of decoding motion information, according to another embodiment.

In operation S3210, the image decoding apparatus 2000 may obtain change information indicating a change or an unchanged of motion information of a neighboring block temporally or spatially related to a current block from a bitstream.

According to an embodiment, when information obtained from an upper level of a current block, for example, a sequence parameter set, a picture parameter set, a video parameter set, a slice header, a slice segment header, a tile header, or a tile group header of a bitstream represents that the change mode is not applied, the image decoding apparatus 2000 may not obtain change information of the current block from the bitstream, and, when the corresponding information represents that a change mode is not applicable, the image decoding apparatus 2000 may not obtain change information of the current block from the bitstream, and, when the corresponding information represents that the change mode is applicable, the image decoding apparatus 2000 may obtain change information of the current block from the bitstream.

According to an embodiment, when a size of a current block is smaller than or equal to a preset size although information obtained from the upper level of the current block represents that the change mode is applicable, the image decoding apparatus 2000 may not obtain change information from the bitstream. In this case, when a prediction direction of a neighboring block is the bi-direction, the image decoding apparatus 2000 may determine a prediction direction of the current block to be the list 0 direction (or list 1 direction). Also, the image decoding apparatus 2000 may determine a reference picture (or a reference picture of the list 1 direction of the neighboring block) of the list 0 direction of the neighboring block to be a reference picture of the current block, and apply a differential motion vector to a motion vector (a motion vector of the list 1 direction of the neighboring block) of the list 0 direction of the neighboring block to obtain a motion vector of the current block.

In operation S3220, when the change information indicates a change of motion information and the upper block of the current block can use two reference picture lists, the image decoding apparatus 2000 may change a prediction direction of the neighboring block and determine the changed prediction direction to be a prediction direction of the current block.

According to an embodiment, the image decoding apparatus 2000 may determine a changed prediction direction of the current block from the prediction direction of the neighboring block by considering a value indicated by the change information and the prediction direction of the neighboring block. More specifically, when the prediction direction of the neighboring block is the list 0 direction or the list 1 direction, and the change information has a value of 1, the prediction direction of the current block may be determined to be the bi-direction. When the prediction direction of the neighboring block is the list 0 direction, and the change information has a value of 2, the prediction direction of the current block may be determined to be the list 1 direction. When the prediction direction of the neighboring block is the list 1 direction and the change information has a value of 2, the prediction direction of the current block may be determined to be the list 0 direction. Also, when the prediction direction of the neighboring block is the bi-direction and the change information has a value of 1, the prediction direction of the current block may be determined to be the list 0 direction, and when the change information has a value of 2, the prediction direction of the current block may be determined to be the list 1 direction.

In operation S3230, when the prediction direction of the neighboring block is a first uni-direction being any one of the list 0 direction and the list 1 direction, and the prediction direction of the current block is a second uni-direction being the other one of the list 0 direction and the list 1 direction or the bi-direction, the image decoding apparatus 2000 may select a reference picture of the second uni-direction of the current block from a second reference picture list corresponding to the second uni-direction by considering a distance between a current picture and a reference picture of the first uni-direction of a neighboring block included in the first reference picture list corresponding to the first uni-direction. A method of selecting a reference picture of the second uni-direction of a current block has been described above in '2. Case in which a prediction direction of a neighboring block is the list 0 direction and a prediction direction of a current block is the list 1 direction', '3. Case in which a prediction direction of a neighboring block is the list 1 direction, and a prediction direction of a current block is the list 0 direction', '4. Case in which a prediction direction of a neighboring block is the list 0 direction, and a prediction direction of a current block is the bi-direction', and '5. Case in which a prediction direction of a neighboring block is the list 1 direction, and a prediction direction of a current block is the bi-direction', and therefore, detailed descriptions thereof will be omitted.

When the prediction direction of the neighboring block is the bi-direction, and the prediction direction of the current block is the list 0 direction, the image decoding apparatus 2000 may select a reference picture of the list 0 direction of the neighboring block as a reference picture of the list 0 direction of the current block, and, when the prediction direction of the current block is the list 1 direction, the image decoding apparatus 2000 may select a reference picture of the list 1 direction of the neighboring block as a reference picture of the list 1 direction of the current block.

In operation S3240, the image decoding apparatus 2000 may scale the motion vector of the neighboring block to obtain a motion vector of the current block.

When the prediction direction of the neighboring block is the first uni-direction, and the prediction direction of the current block is the second uni-direction, the image decoding apparatus 2000 may scale the motion vector of the first uni-direction of the neighboring block according to a ratio of a distance between the current picture and the reference picture of the first uni-direction of the neighboring block and a distance between the current picture and the reference picture in the second uni-direction of the current block. The image decoding apparatus 2000 may apply a differential motion vector to the scaled motion vector to obtain a motion vector of the second uni-direction of the current block.

When the prediction direction of the neighboring block is the first uni-direction, and the prediction direction of the current block is the bi-direction, the image decoding apparatus 2000 may scale the motion vector of the first uni-direction of the neighboring block according to the ratio of the distance between the current picture and the reference picture of the first uni-direction of the neighboring block and the distance between the current picture and the reference picture of the second uni-direction of the current block, thereby obtaining a motion vector of the second uni-direction of the current block. The image decoding apparatus

2000 may scale the motion vector of the first uni-direction of the neighboring block, and apply a differential motion vector to the scaled result to obtain a motion vector of the second uni-direction of the current block. Also, the image decoding apparatus 2000 may apply the differential motion vector to the motion vector of the first uni-direction of the neighboring block without scaling the motion vector of the first uni-direction of the neighboring block, thereby obtaining a motion vector of the first uni-direction of the current block.

When the prediction direction of the neighboring block is the bi-direction, and the prediction direction of the current block is the list 0 direction, the image decoding apparatus 2000 may apply a differential motion vector to the motion vector of the list 0 direction of the neighboring block to obtain a motion vector of the list 0 direction of the current block. Also, when the prediction direction of the neighboring block is the bi-direction, and the prediction direction of the current block is the list 1 direction, the image decoding apparatus 2000 may apply a differential motion vector to the motion vector of the list 1 direction of the neighboring block to obtain a motion vector of the list 1 direction of the current block.

In operation S3250, the image decoding apparatus 2000 may reconstruct the current block by using motion information of the current block.

The image decoding apparatus 2000 may select a picture indicated by a reference picture index from among pictures included in a reference picture list corresponding to the prediction direction of the current block, as a reference picture of the current block, and obtain a prediction direction of the current block from a reference block in a reference picture indicated by the motion vector of the current block.

According to an embodiment, the prediction block of the current block may be determined to be a reconstructed block of the current block, and, according to an implementation example, when residual data is included in a bitstream, the residual data may be applied to the prediction direction, thereby obtaining a reconstructed block of the current block.

Figure 33:
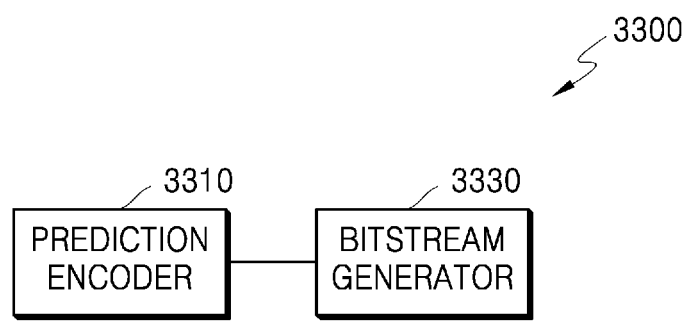
FIG. 33 is a block diagram illustrating an image encoding apparatus according to an embodiment.

FIG. 33 is a block diagram illustrating an image encoding apparatus 3300 according to an embodiment.

Referring to FIG. 33, the image encoding apparatus 3300 may include a prediction encoder 3310 and a bitstream generator 3330. The prediction encoder 3310 may correspond to the encoder 220 of FIG. 2, and the bitstream generator 3330 may correspond to the bitstream generator 210 of FIG. 2.

The prediction encoder 3310 and the bitstream generator 3330 according to an embodiment may be implemented as at least one processor. The image encoding apparatus 3300 may include at least one memory (not shown) storing input/output data of the prediction encoder 3310 and the bitstream generator 3330. Also, the image encoding apparatus 3300 may include a memory controller (not shown) for controlling data inputs/outputs to/from the memory (not shown).

The prediction encoder 3310 may encode an image according to a prediction mode, and the bitstream generator 3330 may generate a bitstream including information generated as a result of the encoding on the image.

The prediction encoder 3310 may determine a prediction mode of a current block in a current image. When the prediction mode of the current block is determined to be an inter prediction mode, the bitstream generator 3330 may include information representing motion information of the current block in the bitstream.

When the prediction mode of the current block is a mode of deriving motion information of a current block from motion information of a neighboring block, the prediction encoder 3310 may establish a candidate list including, as candidates, motion information of neighboring blocks temporally or spatially related to the current block. The prediction encoder 3310 may select any one piece from among motion information included in the candidate list to derive motion information of the current block.

The prediction encoder 3310 may determine whether a change mode is applicable with respect to lower blocks included in an upper block (for example, a picture sequence, a picture, video, a slice, a slice segment, or a tile) of the current block. When the change mode is applicable with respect to the lower blocks included in the upper block, the prediction encoder 3310 may determine whether to change motion information of a neighboring block, in order to derive motion information of the current block.

When a size of the current block is smaller than or equal to a preset size although the change mode is applicable with respect to the lower blocks included in the upper block, the prediction encoder 3310 may determine an unchange of the motion information of the neighboring block.

When the prediction encoder 3310 determines an unchange of the motion information of the neighboring block, the prediction encoder 3310 may obtain, as a differential motion vector, a difference between a motion vector of the neighboring block and a motion vector of the current block. Also, the bitstream generator 3330 may generate a bitstream including change information indicating the unchange of the motion information of the neighboring block, information indicating any one of the candidates included in the candidate list, and information indicating the differential motion vector.

When a size of the current block is smaller than or equal to a preset size, the prediction encoder 3310 may obtain the difference between the motion vector of the neighboring block and the motion vector of the current block, as the differential motion vector. Also, the bitstream generator 3330 may generate a bitstream including information indicating any one of the candidates included in the candidate list and information indicating the differential motion vector.

When the prediction encoder 3310 determines a change of the motion vector of the neighboring block, the prediction encoder 3310 may determine how to change the motion information of the neighboring block by considering whether the number of reference picture lists which the upper block including the current block can use is 1 or 2.

As described above, when the upper block can use only the reference picture list 0, the prediction encoder 3310 may select a reference picture of the current block by considering the number of pictures included in the reference picture list 0.

Also, when the upper block can use the reference picture list 0 and the reference picture list 1, the prediction encoder 3310 may determine which direction a prediction direction of the neighboring block will change to, and select a reference picture of the current block by considering the prediction direction of the neighboring block, the direction changed from the prediction direction of the neighboring block, and the reference picture of the neighboring block.

A method of selecting a reference picture of a current block when the upper block can use only the reference picture list 0 and when the upper block can use the reference picture list 0 and the reference picture list 1 has been described in detail in the above description about the image decoding apparatus 2000, and therefore, descriptions thereof will be omitted.

When the upper block can use only the reference picture list 0 and the reference picture of the current block is identical to the reference picture of the neighboring block, the prediction encoder 3310 may apply an offset to at least one of an x component and a y component of the motion vector of the neighboring block.

When the upper block can use only the reference picture list 0 and the reference picture of the current block is different from the reference picture of the neighboring block, the prediction encoder 3310 may scale the motion vector of the neighboring block according to a ratio of a distance between the current picture and the reference picture of the neighboring block and a distance between the current picture and the reference picture of the current block.

Also, when the upper block can use the reference picture list 0 and the reference picture list 1, and the reference picture of the current block is different from the reference picture of the neighboring block, the prediction encoder 3310 may scale the motion vector of the neighboring block according to a ratio of a distance between the current picture and the reference picture of the neighboring block and a distance between the current picture and the reference picture of the current picture.

The prediction encoder 3310 may obtain a differential motion vector which is a difference between the motion vector of the current block and the motion vector of the neighboring block, the scaled motion vector of the neighboring block, or the motion vector of the neighboring block to which the offset has been applied.

The bitstream generator 3330 may generate a bitstream which is motion information of the current block, the bitstream including information representing the neighboring block, change information representing whether motion information of the neighboring block needs to change and how to change the motion information of the neighboring block when the motion information of the neighboring block needs to change, and information representing a differential motion vector. When a size of the current block is smaller than or equal to a preset size, the change information may be not included in the bitstream.

According to an embodiment, the information representing the differential motion vector may include variation distance information and variation direction information.

Figure 34:
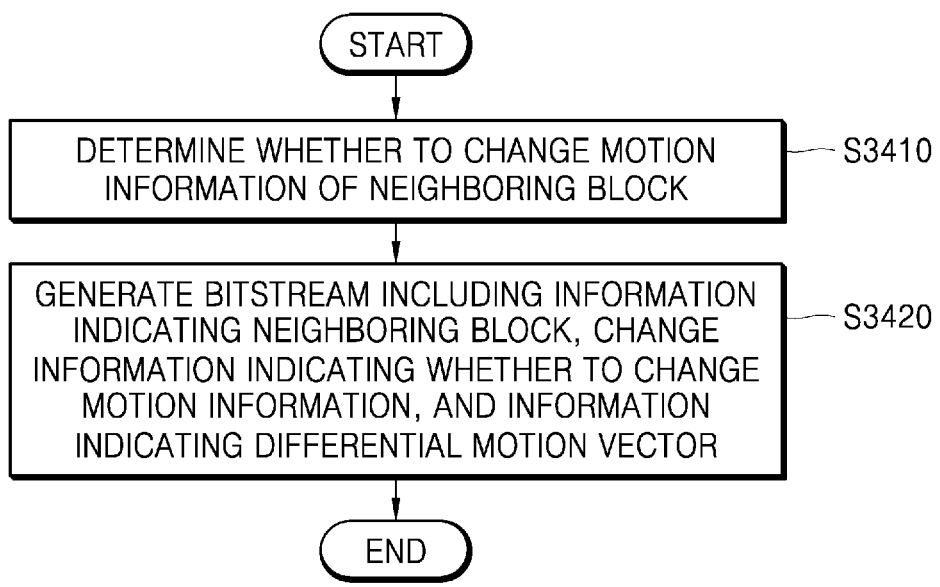
FIG. 34 is a flowchart illustrating a method of encoding motion information, according to an embodiment.

FIG. 34 is a flowchart illustrating a method of encoding motion information, according to an embodiment.

In operation S3410, the image encoding apparatus 3300 may determine whether motion information of a neighboring block temporally or spatially related to a current block needs to change, in order to derive a motion vector of the current block.

According to an embodiment, the image encoding apparatus 3300 may determine whether a change mode is applicable in an upper level of the current block, for example, a picture sequence, a picture video, a slice, a slice segment, or a tile, and, when the image encoding apparatus 3300 determines that the change mode is applicable in the upper level, the image encoding apparatus 3300 may determine whether the motion information of the neighboring block needs to change in order to obtain motion information of the current block.

According to an embodiment, when a size of the current block is smaller than or equal to a preset size although the image encoding apparatus 3300 determines that the change mode is applicable in the upper level of the current block, the image encoding apparatus 3300 may determine an unchange of the motion information of the neighboring block.

In operation S3420, the image encoding apparatus 3300 may generate a bitstream including information indicating a neighboring block that is used to derive motion information of the current block among neighboring blocks, information representing a change or an unchanged of motion information of the neighboring block, and information indicating a differential motion vector.

When the change mode is determined to be non-applicable in the upper level or when a size of the current block is smaller than or equal to a preset size, the change information may be not included in the bitstream.

The image encoding apparatus 3300 may obtain, as a differential motion vector, a difference between a motion vector of the current block and a motion vector of the neighboring block, a scaled motion vector of the neighboring block, or a motion vector of the neighboring block to which an offset has been applied. The image encoding apparatus 3300 may include variation distance information and variation direction information representing the differential motion vector in the bitstream.

A method of deriving motion information of a current block from motion information of a neighboring block according to the number of reference picture lists that can be used by an upper block including the current block when change information indicating a change is generated has been described above, and therefore, detailed descriptions thereof will be omitted.

FIGS. 35 to 38 are views illustrating a process of obtaining motion information of a current block according to an embodiment.

Referring to FIG. 35, in operation S3510, a motion vector mvL0 of the list 0 direction of a neighboring block may be set to a motion vector mMvL0 of the list 0 direction of a current block, and a motion vector mvL1 of the list 1 direction of a neighboring block may be set to a motion vector mMvL1 of the list 1 direction of the current block.

Although not illustrated in FIG. 35, a reference picture index of the list 0 direction of the neighboring block and a reference picture index of the list 1 direction of the neighboring block may be set to a reference picture index refIdx0 of the list 0 direction of the current block and a reference picture index refIdxL1 of the list 1 direction of the current block, respectively. Also, a value of a flag representing whether a prediction direction of the neighboring block is the list 0 direction and a value of a flag representing whether a prediction direction of the neighboring block is the list 1 direction may be set to a value of predFlagL0 representing whether a prediction direction of the current block is the list 0 direction and a value of predFlagL1 representing whether a prediction direction of the current block is the list 1 direction, respectively.

At least one of mMvL0, mMvL1, refIdxL0, refIdxL1, predFlagL0, and predFlagL1 may be updated according to change information, which will be examined below.

In operation S3520, when a value of change information mmvd_group_idx is 1, and both predFlagl0 representing whether a prediction direction of the current block is the list 0 direction and predFlagL1 representing whether a prediction direction of the current block is the list 1 direction are 1 (that is, when a prediction direction of the neighboring block is the bi-direction), a reference picture index refIdx1 of the list 1 direction of the current block may be determined to be 1, predFlagL1 may be determined to be 0, and a motion vector (mMvL1[0], mMvL1[1]) of the list 1 direction of the current block may be determined to be 0. That is, when a value of change information mmvd_group_idx is 1 and a prediction direction of the neighboring block is the bi-direction, motion information of the list 1 direction of the neighboring block may be not used for inter-prediction of the current block.

In operation S3530, when a value of change information mmvd_group_idx is 2, and both predFlagL0 and predFlagL1 of the current block are 1 (that is, when a prediction direction of the neighboring block is the bi-direction), a reference picture index refIdx0 of the list 0 direction of the current block may be determined to be −1, predFlagL0 may be determined to be 0, and a motion vector (mMvL0[0], mMvL0[1]) of the list 0 direction of the current block may be determined to be 0. That is, when a value of change information mmvd_group_idx is 2 and a prediction direction of the neighboring block is the bi-direction, motion information of the list 0 direction of the neighboring block may be not used for inter-prediction of the current block.

Then, referring to FIG. 36, in operation S3610, when a value of change information mmvd_group_idx is 1 and a slice including a current block is a B slice, and predFlagL0 of the current block is 1 (that is, when a prediction direction of a neighboring block is the list 0 direction), predFlagL1 of the current block may be set to 1. That is, a prediction direction of the neighboring block, which is the list 0 direction, may change to the bi-direction, and a prediction direction of the current block may be determined to be the bi-direction.

In operation S3620, when the number NumRefIdxActive[1] of pictures included in the reference picture list 1 is greater than 1, and a distance DiffPicOrderCnt between a current picture currPic and a picture RefPicList[1] having an index of 1 in the reference picture list 1 is equal to a distance DiffPicOrderCnT between the current picture currPic and a reference picture RefPicList0[refIdxL0] of the current block included in the reference picture list 0, a reference picture index refIdxL1 of the list 1 direction of the current block may be selected as 1. When the number NumRefIdxActive[1] of pictures included in the reference picture list 1 is not greater than 1, or when a distance DiffPicOrderCnt between the current picture currPic and a picture RefPicList1[1] having an index of 1 in the reference picture list 1 is not equal to a distance DiffPicOrderCnt between the current picture currPic and a reference picture RefPicList0[refIdxL0] of the current block included in the reference picture list 0, a reference picture index refIdxL1 of the list 1 direction of the current block may be selected as 0. DiffPicOrderCnt(picA, picB) may be an operator meaning a difference (that is, POC (picA)−POC (picB)) between POCs of a picture A and a picture B.

In operation S3630, a distance currPocDiffL0 between the current picture and the reference picture RefPicList0[refIdxL0] of the current block included in the reference picture list 0, and a distance currPocDiffL1 between the current picture and the reference picture RefPicList1[refIdxL1] of the current block included in the reference picture list 1 may be obtained. The reference picture RefPicList0[refIdxL0] of the current block included in the reference picture list 0 may be identical to a reference picture of a neighboring block included in the reference picture list 0.

According to a ratio between currPocDiffL0 and currPocDiffL1, a scaling factor distScaleFactor may be obtained, and a motion vector (mMVl0[0], mMvL0[1]) of the list 0 direction of the current block may be scaled according to the scaling factor distScaleFactor, thereby obtaining a motion vector (mMvL1[0], mMvL1[1]) of the list 1 direction of the current block. The motion vector (mMvL0[0], mMvL0[1]) of the list 0 direction of the current block may be identical to the motion vector of the list 0 direction of the neighboring block. That is, the motion vector of the list 0 direction of the current block may be obtained without scaling the motion vector of the list 0 direction of the neighboring block, and the motion vector of the list 1 direction of the current block may be obtained by scaling the motion vector of the list 0 direction of the neighboring block.

In operation S3640, when a value of the change information mmvd_group_idx is 1, the slice including the current block is a P slice, and the prediction direction of the current block is the list 0 direction (predFlagL0=1), the number NumRefIdxActive[0] of pictures included in the reference picture list 0 may be checked. When the number NumRefIdxActive[0] of the pictures included in the reference picture list 0 is 1, a reference picture index refIdxL0 (that is, a reference picture index of the list 0 direction of the neighboring block) of the list 0 direction of the current block may be assigned to targetrefIdxL0, and, when the number NumRefIdxActive[0] of the pictures included in the reference picture list 0 is not 1, a reference picture index refIdxL0 (that is, an index !refIdxL0 which is different from the reference picture index of the list 0 direction of the current block may be assigned to targetrefIdxL0. targetrefIdxL0 may be an intermediate variable for deriving a reference picture index of the list 0 direction of the current block.

In operation S3650, when targetrefIdx0 is identical to the reference picture index refIdxL0 of the list 0 direction of the current block, an x component mMvL0[0] (identical to an x component of the motion vector of the list 0 direction of the neighboring block) of the motion vector of the list 0 direction of the current block may be added with 3 to update the x component mMvL0[0] of the motion vector of the list 0 direction of the current block, and a y component mMvL0[1] of the motion vector of the list 0 direction of the current block may be maintained as it is.

When targetrefIdxL0 is not identical to the reference picture index refIdx0 of the list 0 direction of the current block, a distance currPocDiffL0 between the current picture currPic and the reference picture RefPicList0[refIdxL0] of the current block included in the reference picture list 0 and a distance currPocDiffL1 between the current picture currPic and a picture RefPicList0[targetrefIdxL0] indicated by targetrefIdxL0 in the reference picture list 0 may be obtained. Also, a scaling factor distScaleFactor may be obtained according to a ratio between currPocDiffL0 and currPocDiffL1. The motion vector (mMvL0[0], mMvL0[1]) of the list 0 direction of the current block (identical to the motion vector of the list 0 direction of the neighboring block) may be scaled according to the scaling factor distScaleFactor, and thus updated.

In operation S3660, targetrefIdxL0 may be set to a reference picture index refIdxL0 of the list 0 direction of the current block.

In operation S3670, when a value of change information mmvd_group_idx is 1 and a prediction direction of the current block is the list 1 direction (predFlagL1=1, predFlagL0=0), predFlagL0 may be set to 1. That is, a prediction direction of a neighboring block in which predFlagL0 is 0 and predFlagL1 is 1 may change to the bi-direction in which both predFlagL0 and predFlagL1 are 1, and the prediction direction of the current block may change to the bi-direction.

In operation S3680, when the number NumRefIdxActive[0] of pictures included in the reference picture list 0 is greater than 1 and a distance DiffPicOrderCnt between the current picture currPic and a picture RefPicList0[1] having an index of 1 in the reference picture list 0 is equal to a distance DiffPicOrderCnt between the current picture currPic and the reference picture RefPicList1[refIdxL1] of the current block included in the reference picture list 1, 1 may be selected as a reference picture index refIdxL0 of the list 0 direction of the current block. When the number NumRefIdxActive[0] of pictures included in the reference picture list 0 is not greater than 1, or when the distance DiffPicOrderCnt between the current picture currPic and the picture RefPicList0[1] having the index of 1 in the reference picture list 0 is not equal to the distance DiffPicOrderCnt between the current picture currPic and the reference picture RefPicList1[refIdxL1] of the current block included in the reference picture list 1, 0 may be selected as a reference picture index refIdxL0 of the list 0 direction of the current block.

In operation S3690, the distance currPocDiffL0 between the current picture and the reference picture RefPicList0[refIdxL0] of the current block included in the reference picture list 0, and the distance currPocDiffL1 between the current picture and the reference picture RefPicList1[refIdxL1] of the current block included in the reference picture list 1 may be obtained. The reference picture RefPicList1[refIdxL1] of the current block included in the reference picture list 1 may be identical to a reference picture of a neighboring block included in the reference picture list 1.

A scaling factor distScaleFactor may be obtained according to a ratio between currPocDiffL0 and currPocDiffL1, and a motion vector (mMvL1[0], mMvL1[1]) of the list 1 direction of the current block may be scaled according to the scaling factor distScaleFactor to obtain a motion vector (mMvL0[0], mMvL0[1]) of the list 0 direction of the current block. The motion vector (mMvL0[0], mMvL0[1]) of the list 1 direction of the current block may be identical to the motion vector of the list 1 direction of the neighboring block. That is, the motion vector of the list 1 direction of the current block may be obtained without scaling the motion vector of the list 1 direction of the neighboring block, and the motion vector of the list 0 direction of the current block may be obtained by scaling the motion vector of the list 1 direction of the neighboring block.

Then, referring to FIG. 37, in operation S3710, when a value of change information mmvd_group_idx is 2, a slice including a current block is a B slice, and predFlagL0 of the current block is 1 (that is, when a prediction direction of a neighboring block is the list 0 direction), predFlagL1 of the current block may be set to 1.

In operation S3720, when the number NumRefIdxActive[1] of pictures included in the reference picture list 1 is greater than 1, and a distance DiffPicOrderCnt between a current picture currPic and a picture RefPicList1[1] having an index of 1 in the reference picture list 1 is equal to a distance DiffPicOrderCnt between the current picture currPic and a reference picture RefPicList0[refIdxL0] of a current block included in the reference picture list 0, a reference picture index refIdxL1 of the list 1 direction of the current block may be selected as 1. When the number NumRefIdxActive[1] of pictures included in the reference picture list 1 is not greater than 1, or when the distance DiffPicOrderCnt between the current picture currPic and the picture RefPicList1[1] having the index of 1 in the reference picture list 1 is not equal to the distance DiffPicOrderCnt between the current picture currPic and the reference picture RefPicList0[refIdxL0] of the current block included in the reference picture list 0, the reference picture index refIdxL1 of the list 1 direction of the current block may be selected as 0.

In operation S3730, a distance currPocDiffL0 between the current picture and the reference picture RefPicList0[refIdxL0] of the current block included in the reference picture list 0, and a distance currPocDiffL1 between the current picture and a reference picture RefPicList1 [refIdxL1] of the current block included in the reference picture list 1 may be obtained. The reference picture RefPicList0[refIdxL0] of the current block included in the reference picture list 0 may be identical to a reference picture of a neighboring block included in the reference picture list 0.

A scaling factor distScaleFactor may be obtained according to a ratio between currPocDiffL0 and currPocDiffL1, and a motion vector (mMvL0[0], mMvL0[1]) of the list 0 direction of the current block may be scaled according to the scaling factor distScaleFactor to obtain a motion vector (mMvL1[0], mMvL1[1]) of the list 0 direction of the current block. The motion vector(mMvL1[0], mMvL1[1]) of the list 0 direction of the current block may be identical to a motion vector of the list 0 direction of a neighboring block.

In operation S3740, a reference picture index refIdxL0 of the list 0 direction of a current block may be set to −1, and predFlagL0 representing whether a prediction direction of the current block is the list 0 direction and the motion vector (mMvL0[0], mMvL0[1]) of the list 0 direction of the current block may be set to 0. Accordingly, only motion information of the list 1 direction of the current block may be used for inter-prediction of the current block.

In operation S3750, when a value of change information is 2, a slice including the current block is a P slice, a prediction direction of the current block is the list 0 direction (predFlagL0=1), the number NumRefIdxActive[0] of pictures included in the reference picture list 0 may be checked. When the number NumRefIdxActive[0] of pictures included in the reference picture list 0 is less than 3, the reference picture index refIdxL0 (that is, a reference picture index of the list 0 direction of the neighboring block) of the list 0 direction of the current block may be assigned to targetrefIdxL0. When the number NumRefIdxActive[0] of pictures included in the reference picture list 0 is 3 or more, 2 may be assigned to targetrefIdxL0 when the reference picture index refIdxL0 (that is, the reference picture index of the list 0 direction of the neighboring block) of the list 0 direction of the current block is smaller than 2, and, when the reference picture index refIdxL0 of the list 0 direction of the current block is not smaller than 2, 1 may be assigned to targetrefIdxL0. targetrefIdxL0 may be an intermediate variable for deriving the reference picture index of the list 0 direction of the current block.

In operation S3760, when targetrefIdxL0 is identical to the reference picture index refIdxL0 of the list 0 direction of the current block, an x component mMvL0[0] (identical to an x component of the motion vector of the list 0 direction of the neighboring block) of the motion vector of the list 0 direction of the current block may be updated by subtracting 3 from the x component mMvL0[0], and a y component mMvL0[1] of the motion vector of the list 0 direction of the current block may be maintained as it is.

When targetrefIdxL0 is not identical to the reference picture index refIdxL0 of the list 0 direction of the current block, a distance currPocDiffL0 between the current picture currPic and the reference picture RefPicList0[refIdxL0] of the current block included in the reference picture list 0, and a distance currPocDiffL1 between the current picture currPic and a picture RefPicList0[targetrefIdxL0] indicated by targetrefIdxL0 in the reference picture list 0 may be obtained. Then, a scaling factor distScaleFactor may be obtained according to a ratio between currPocDiffL0 and curr- PocDiffL1. The motion vector (mMvL0[0], mMvL0[1]) (identical to the motion vector of the list 0 direction of the neighboring block) of the list 0 direction of the current block may be scaled according to the scaling factor distScaleFactor, thereby updating the motion vector (mMvL0[0], mMvL0[1]) of the list 0 direction of the current block.

In operation S3770, targetrefIdxL0 may be set to a reference picture refIdxL0 of the list 0 direction of the current block.

In operation S3780, when a value of change information mmvd_group_idx is 2, and a prediction direction of the current block is the list 1 direction (predFlagL1=1 and predFlagL0=0), predFlagL0 may be set to 1.

In operation S3790, when the number NumRefIdxActive[0] of pictures included in the reference picture list 0 is greater than 1, and a distance DiffPicOrderCnt between the current picture currPic and a picture RefPicList0[1] having an index of 1 in the reference picture list 0 is equal to a distance DiffPicOrderCnt between the current picture currPic and a reference picture RefPicList1[refIdxL1] of the current block included in the reference picture list 1, 1 may be selected as a reference picture index refIdxL0 of the list 0 direction of the current block. When the number NumRefIdxActive[0] of pictures included in the reference picture list 0 is not greater than 1, or when a distance DiffPicOrderCnt between the current picture currPic and a picture RefPicList0[1] having an index of 1 in the reference picture list 0 is not equal to a distance DiffPicOrderCnt between the current picture currPic and a reference picture RefPicList1[refIdxL1] of the current block included in the reference picture list 1, 0 may be selected as a reference picture index refIdxL0 of the list 0 direction of the current block.

In operation S3795, a distance currPocDiffL0 between the current picture and the reference picture RefPicList0[refIdxL0] of the current block included in the reference picture list 0, and a distance currPocDiffL1 between the current picture and the reference picture RefPicList1[refIdxL1] of the current block included in the reference picture list 1 may be obtained. The reference picture RefPicList1[refIdxL1] of the current block included in the reference picture list 1 may be identical to the reference picture of the neighboring block included in the reference picture list 1.

A scaling factor distScaleFactor may be obtained according to a ratio between currPocDiffL0 and currPocDiffL1, and the motion vector (mMvL1[0], mMvL1[1]) of the list 1 direction of the current block may be scaled according to the scaling factor distScaleFactor, thereby obtaining a motion vector (mMvL0[0], mMvL0[1]) of the list 0 direction of the current block. The motion vector (mMvL0[0], mMvL0[1]) of the list 1 direction of the current block may be identical to the motion vector of the list 1 direction of a neighboring block.

The reference picture index refIdxL1 of the list 1 direction of the current block may be set to −1, and predFlagL1 representing whether a prediction direction of the current block is the list 1 direction and a motion vector (mMvL1[0], mMvL1[1]) of the list 1 direction of the current block may be set to 0. Accordingly, only motion information of the list 0 direction of the current block may be used for inter prediction of the current block.

FIG. 38 illustrates a process of applying a differential motion vector to a motion vector of a current block.

In operation S3810, when both predFlagL0 and predFlagL1 are 1 (that is, when a prediction direction of a current block is the bi-direction), a distance currPocDiffL0 between a current picture currPic and a reference picture RefPicList0[refIdxL0] of a current block in the reference picture list 0, and a distance currPocDiffL1 between the current picture currPic and a reference picture RefPicList1[refIdxL1] of the current block in the reference picture list 1 may be obtained.

MmvdOffset may be a value calculated from variation distance information and variation direction information included in a bitstream, and, when an absolute value Abs(currPocDiffL0) of CurrPocDiffL0 is equal to an absolute value Abs(currPocDiffL1) of currPocDiffL1, both a differential motion vector mMvdL0 of the list 0 direction of the current block and a differential motion vector mMVdL1 of the list 1 direction of the current block may be set to MmvdOffset.

In operation S3820, when Abs(currPocDiffL0) is greater than Abs(currPocDiffL1), a differential motion vector mMvdL1 of the list 1 direction of the current block may be set to MmvdOffset. Also, a scaling factor distScaleFactor corresponding to a ratio between Abs(currPocDiffL0) and Abs(currPocDiffL1) may be obtained, and a differential motion vector mMvdL1 of the list 1 direction of the current block may be scaled according to the scaling factor distScaleFactor, thereby obtaining a differential motion vector mMvdL0 of the list 0 direction of the current block.

In operation S3830, when Abs(currPocDiffL0) is smaller than Abs(currPocDiffL1), a differential motion vector mMvdL0 of the list 0 direction of the current block may be set to MmvdOffset. Then, a scaling factor distScaleFactor corresponding to a ratio between Abs(currPocDiffL0) and Abs(currPocDiffL1) may be obtained, and a differential motion vector mMvdL0 of the list 0 direction of the current block may be scaled according to the scaling factor, thereby obtaining a differential motion vector mMvdL1 of the list 1 direction of the current block.

In operation S3840, when a value resulting from multiplying currPocDiffL0 by currPocDiffL1 is smaller than 0, that is, when a POC of a current picture has a value between a POC of a reference picture of a current block in the reference picture list 1 and a POC of a reference picture of the current block in the reference picture list 0, a sign of a differential motion vector mMvdL1 of the list 1 direction may be converted to the opposite sign.

In operation S3850, when a prediction direction of the current block is the list 0 direction, a differential motion vector mMvdL0 of the list 0 direction may be set to MmvdOffset, and, when the prediction direction of the current block is the list 1 direction, a differential motion vector mMvdL1 of the list 1 direction may be set to MmvdOffset.

In operation S3860, the differential motion vector mMvdL0 of the list 0 direction may be added to the motion vector mMvL0 of the list 0 direction of the current block, thereby updating the motion vector mMvL0 of the list 0 direction of the current block. Then, the differential motion vector mMvdL1 of the list 1 direction may be added to the motion vector mMvL1 of the list 1 direction of the current block, thereby updating the motion vector mMvL1 of the list 1 direction of the current block. As described above, when the prediction direction of the current block is the list 0 direction, both the motion vector mMvL1 of the list 1 direction of the current block and the differential motion vector mMvdL1 of the list 1 direction may have a value of 0, and, when the prediction direction of the current block is the list 1 direction, the motion vector mMvL0 of the list 0 direction of the current block and the differential motion vector mMvdL0 of the list 0 direction may have a value of 0.

Meanwhile, the embodiments of the disclosure may be written as programs that are executable on a computer, and the programs may be stored in a medium.

The medium may continuously store the computer-executable programs, or temporarily store the computer-executable programs for execution or downloading. Also, the medium may be any one of various recording media or storage media in which a single piece or plurality of pieces of hardware are combined, and the medium or the computer program product is not limited to those directly connected to a certain computer system, but may be distributed on a network. Examples of the medium include magnetic media (e.g., a hard disk, a floppy disk, and a magnetic tape), optical recording media (e.g., compact disc-read only memory (CD-ROM) and a digital versatile disc (DVD)), magneto-optical media (e.g., a floptical disk), read only memory (ROM), random access memory (RAM), a flash memory, etc., which are configured to store program instructions. Also, other examples of the medium include recording media and storage media managed by application stores distributing applications or by websites, servers, and the like supplying or distributing other various types of software.

So far, the technical idea of the disclosure has been described in detail based on the preferred embodiments, however, the technical idea of the disclosure is not limited to the above-described embodiments, and various modifications and changes are possible within the scope of the technical idea of the disclosure by persons of ordinary skill in the art.

The invention claimed is:

1. A method, performed by a decoding apparatus, of decoding motion information, the method comprising:
   obtaining, from a bitstream, information indicating whether to change motion information of a neighboring block to determine a prediction direction of a current block;
   when the information indicates the change of the motion information of the neighboring block, a slice comprising the current block is a bi-predictive slice, and a prediction direction of the neighboring block is a list 0 direction, determining the prediction direction of the current block as either a bi-direction or a list 1 direction;
   selecting a reference picture of the current block from a first reference picture list based on the determined prediction direction of the current block;
   obtaining a motion vector of the current block by scaling a motion vector of the neighboring block; and
   reconstructing the current block by using the reference picture of the current block and the motion vector of the current block,
   wherein when the information indicates the change of the motion information of the neighboring block, and the slice comprising the current block is not the bi-predictive slice, the motion vector of the current block is obtained by applying an offset to the motion vector of the neighboring block.

2. An apparatus of decoding motion information, the apparatus comprising:
   a bitstream obtainer configured to obtain, from a bitstream, information indicating whether to change motion information of a neighboring block to determine a prediction direction of a current block;
   a motion information obtainer configured to, when the information indicates the change of the motion information of the neighboring block, a slice comprising the current block is a bi-predictive slice, and a prediction direction of the neighboring block is a list 0 direction, determine the prediction direction of the current block as either a bi-direction or a list 1 direction, select a reference picture of the current block from a first reference picture list based on the determined prediction direction of the current block, and obtain a motion vector of the current block by scaling a motion vector of the neighboring block; and
   a prediction decoder configured to reconstruct the current block by using the reference picture of the current block and the motion vector of the current block,
   wherein when the information indicates the change of the motion information of the neighboring block, and the slice comprising the current block is not the bi-predictive slice, the motion vector of the current block is obtained by applying an offset to the motion vector of the neighboring block.

3. A method, performed by an encoding apparatus, of encoding motion information, the method comprising:
   determining whether to change motion information of a neighboring block to determine a prediction direction of a current block;
   when it is determined to change the motion information of the neighboring block, a slice comprising the current block is a bi-predictive slice, and a prediction direction of the neighboring block is a list 0 direction, determining the prediction direction of the current block as either a bi-direction or a list 1 direction;
   selecting a reference picture of the current block from a first reference picture list based on the determined prediction direction of the current block;
   obtaining a motion vector of the current block by scaling a motion vector of the neighboring block;
   encoding the current block by using the reference picture of the current block and the motion vector of the current block; and
   generating a bitstream comprising information indicating whether to change the motion information of the neighboring block,
   wherein when it is determined to change the motion information of the neighboring block, and the slice comprising the current block is not the bi-predictive slice, the motion vector of the current block is obtained by applying an offset to the motion vector of the neighboring block.

4. A non-transitory computer-readable medium for recording a bitstream, the bitstream comprising:
   information indicating whether to change motion information of a neighboring block to determine a prediction direction of a current block,
   wherein when the information indicates the change of the motion information of the neighboring block, a slice comprising the current block is a bi-predictive slice, and a prediction direction of the neighboring block is a list 0 direction, the prediction direction of the current block is determined as either a bi-direction or a list 1 direction,
   wherein a reference picture of the current block is selected from a first reference picture list based on the determined prediction direction of the current block,
   wherein a motion vector of the current block is obtained by scaling a motion vector of the neighboring block,
   wherein the current block is encoded by using the reference picture of the current block and the motion vector of the current block, and
   wherein when the information indicates the change of the motion information of the neighboring block, and the slice comprising the current block is not the bi-predictive slice, the motion vector of the current block is obtained by applying an offset to the motion vector of the neighboring block.

* * * * *